US010324237B2

(12) United States Patent
Soljacic et al.

(10) Patent No.: US 10,324,237 B2
(45) Date of Patent: Jun. 18, 2019

(54) TRANSPARENT DISPLAYS WITH SCATTERING NANOPARTICLES AND THIN FILMS FOR ENHANCED SCATTERING

(71) Applicant: Massachusetts Institute of Technology, Cambridge, MA (US)

(72) Inventors: Marin Soljacic, Belmont, MA (US); Bo Zhen, Cambridge, MA (US); Emma Anquillare, Boston, MA (US); Yi Yang, Cambridge, MA (US); Chia Wei Hsu, Middletown, CT (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 154 days.

(21) Appl. No.: 15/476,199

(22) Filed: Mar. 31, 2017

(65) Prior Publication Data

US 2017/0299149 A1 Oct. 19, 2017

Related U.S. Application Data

(60) Provisional application No. 62/316,617, filed on Apr. 1, 2016.

(51) Int. Cl.
*G02B 5/02* (2006.01)
*G02B 5/00* (2006.01)

(52) U.S. Cl.
CPC ............ *G02B 5/0226* (2013.01); *G02B 5/00* (2013.01)

(58) Field of Classification Search
CPC ............ F21V 9/16; G02B 5/0026; G02B 5/00
See application file for complete search history.

(56) References Cited

U.S. PATENT DOCUMENTS

| 4,870,485 A | 9/1989 | Downing et al. |
| 5,764,403 A | 6/1998 | Downing |
| 6,897,999 B1 | 5/2005 | Bass et al. |
| 6,986,581 B2 | 1/2006 | Sun et al. |
| 7,090,355 B2 | 8/2006 | Liu et al. |
| 7,136,031 B2 | 11/2006 | Lee et al. |
| 7,182,467 B2 | 2/2007 | Liu et al. |

(Continued)

FOREIGN PATENT DOCUMENTS

| CN | 101872068 A | 10/2010 |
| KR | 10-2008/0082783 | 9/2008 |

(Continued)

OTHER PUBLICATIONS

Meinardi, F. et al., Large-area luminescent solar concentrators based on 'Stokes-shift-engineered' nanocrystals in a mass-polymerized PMMA matrix. *Nature Photonics*, vol. 8, Apr. 13, 2014, pp. 392-399.

(Continued)

*Primary Examiner* — Joseph L Williams
(74) *Attorney, Agent, or Firm* — Smith Baluch LLP

(57) ABSTRACT

A transparent display includes nanoparticles having wavelength-selective scattering (e.g., resonant scattering) to preferentially scatter light at one or more discrete wavelengths so as to create images. The nanoparticles transmit light at other wavelengths to maintain a high transparency of the display. The nanoparticles are disposed in proximity to a thin film, which can enhance the scattering the process by reflecting light back to the nanoparticles for re-scattering or increasing the quality factor of the resonant scattering.

32 Claims, 42 Drawing Sheets

(56) References Cited

U.S. PATENT DOCUMENTS

| | | | |
|---|---|---|---|
| 7,213,923 | B2 | 5/2007 | Liu et al. |
| 7,452,082 | B2 | 11/2008 | Sun et al. |
| 7,537,346 | B2 | 5/2009 | Liu et al. |
| 7,587,120 | B2 | 9/2009 | Koo et al. |
| 8,123,365 | B2 | 2/2012 | Quach et al. |
| 8,187,726 | B2 | 5/2012 | Sasaki et al. |
| 8,294,993 | B2 | 10/2012 | Niesten |
| 8,525,829 | B2 | 9/2013 | Smithwick et al. |
| 8,651,678 | B2 | 2/2014 | Lanman et al. |
| 8,681,174 | B2 | 3/2014 | Nam et al. |
| 8,803,947 | B2 | 8/2014 | Cho et al. |
| 8,920,685 | B2 | 12/2014 | Jang et al. |
| 8,923,686 | B2 | 12/2014 | Krishnaswamy |
| 9,139,737 | B1 | 9/2015 | Shah et al. |
| 9,335,027 | B2 | 5/2016 | Hsu et al. |
| 9,458,989 | B2 | 10/2016 | Hsu et al. |
| 9,677,741 | B2 | 6/2017 | Hsu et al. |
| 2004/0232826 | A1 | 11/2004 | Liu et al. |
| 2005/0040562 | A1 | 2/2005 | Stenmann et al. |
| 2005/0094266 | A1 | 5/2005 | Liu et al. |
| 2005/0231652 | A1 | 10/2005 | Liu et al. |
| 2005/0231692 | A1 | 10/2005 | Sun et al. |
| 2006/0197922 | A1 | 9/2006 | Liu et al. |
| 2007/0065665 | A1 | 3/2007 | Sato et al. |
| 2008/0043301 | A1 | 2/2008 | Lewis |
| 2010/0253492 | A1 | 10/2010 | Seder et al. |
| 2010/0253594 | A1 | 10/2010 | Szczerba et al. |
| 2011/0171789 | A1 | 7/2011 | Korgel et al. |
| 2011/0235359 | A1 | 9/2011 | Liu et al. |
| 2012/0019923 | A1 | 1/2012 | Niesten et al. |
| 2012/0064134 | A1 | 3/2012 | Bourke et al. |
| 2012/0110551 | A1 | 5/2012 | Fink et al. |
| 2012/0234460 | A1 | 9/2012 | Zhang et al. |
| 2012/0320291 | A1 | 12/2012 | Yang et al. |
| 2014/0185282 | A1 | 7/2014 | Hsu et al. |
| 2017/0184849 | A1 | 6/2017 | Hsu et al. |

FOREIGN PATENT DOCUMENTS

| | | |
|---|---|---|
| KR | 10-2009/0120171 | 11/2009 |
| KR | 10-2011/0132137 | 12/2011 |
| KR | 10-2012/0061539 | 6/2012 |
| WO | WO 2005/043232 A2 | 5/2005 |
| WO | WO 2005/043233 A2 | 5/2005 |
| WO | WO 2005/103814 A2 | 11/2005 |
| WO | WO 2006/094262 A2 | 9/2006 |
| WO | WO 2006/094262 A3 | 9/2006 |
| WO | WO 2008/111949 A2 | 9/2008 |
| WO | WO 2012/016047 A1 | 2/2012 |

OTHER PUBLICATIONS

Moitra, P., Realization of an all-dielectric zero-index optical metamaterial, Nature Photonics, vol. 7, (Oct. 2013), pp. 791-795.
Monticone, F. et al., Multilayered Plasmonic Covers for Comblike Scattering Response and Optical Tagging, Physical Review Letters, 110, 113901 (2013), 5 pages.
Murray, C. B. et al., Synthesis and Characterization of Monodisperse Nanocrystals and Close-Packed Nanocrystal Assemblies, Annual Review of Materials Science, vol. 30, pp. 545-610 (Aug. 2000).
Non-Final Office Action dated Jul. 14, 2016 from U.S. Appl. No. 15/090,348, 5 pages.
Non-Final Office Action dated Jun. 13, 2017 from U.S. Appl. No. 15/237,800, 5 pages.
Non-Final Office Action dated Mar. 24, 2015 from U.S. Appl. No. 14/067,471, 6 pages.
Notice of Allowance dated Apr. 13, 2017 from U.S. Appl. No. 15/090,348, 7 pages.
Notice of Allowance dated Jan. 20, 2016 from U.S. Appl. No. 14/067,471, 8 pages.
Notice of Allowance dated Oct. 26, 2015 from U.S. Appl. No. 14/067,471, 7 pages.
Pitarke, J. M. et al., Theory of surface plasmons and surface-plasmon polaritons, Rep. Prog. Phys. 70 (2007), pp. 1-87.
ProDisplay—Projector Screens and Films, LED/LCD Displays, Touch Screens link, (2015), http://prodisplay.com/, retrieved on Dec. 18, 2015, 6 pages.
Regan, E.C. et al., Coherent Photon Scattering and Direct Imaging of the Iso-frequency Contours in Large-area Photonic Crystal Slabs, arXiv:1512.04147v1, (Dec. 2015), 5 pages.
Schilling, J., The quest for zero refractive index, Nature Photonics, vol. 5, (Aug. 2011), pp. 449-451.
Seh, Z. W. et al., Janus Au—$TiO_2$ Photocatalysts with Strong Localization of Plasmonic Near-Fields for Efficient Visible-Light Hydrogen Generation, Adv. Mater. 24 (2012), pp. 2310-2314.
Seh, Z. W. et al., Synthesis and multiple reuse of eccentric Au@$TiO_2$ nanostructures as catalysts, Chem. Commun. 47 (2011), pp. 6689-6691.
Silveirinha, M. G., Trapping light in open plasmonic nanostructures, Physical Review A 89, (2014), 023813, 10 pages.
Simonutti, R. et al., Nanoparticles confer tailored optical properties on plastics. SPIE, Newsroom, Aug. 18, 2014, pp. 1-3.
SpyeGlass, SpyeGrey, SpyeFrost, SypeClear Installation link, http://www.spyeglass.com/Spyeglass-clear.html, (2015), retrieved on Dec. 18, 2015, 1 page.
"SplitView" technology for the E Class: One screen for two programs, Separate Info for driver and front-seat passenger, Bosch Press Release, May 2013, 2 pages.
Stuart, D.A. et al., Refractive index sensitive, plasmon resonant scattering, and surface enhanced Raman scattering nanoparticles and arrays as biological sensing platforms, Plasmonics in Biology and Medicine, Proc. of SPIE, vol. 5327 (2004), pp. 60-73.
Sun, T. et al., Full color, high contrast front projection on black emissive display, Proc. of SPIE, vol. 8254. Downloaded from http://proceedings.spiedigitallibrary.org/ on Sep. 26, 2013, 13 pages.
Vodnik, V. et al., Thermal and Optical Properties of Silver-poly(methylmethacrylate) Nanocomposites Prepared by in situ radical polymerization, European Polymer Journal, vol. 46, Issue 2, pp. 137-144 (Feb. 2010).
Wan, W. et al., Directional light-guide devices with continuously variable spatial frequency sub-micron grating structures for autostereoscopic display applications, Proc. SPIE 9271, Holography, Diffractive Optics, and Applications VI, 927126 (Nov. 11, 2014).
Wang, F. et al., Simultaneous phase and size control of upconversion nanocrystals through lanthanide doping, vol. 463 (2010), pp. 1061-1065.
Wang, F. et al., Tunable Upconversion Emissions from Lanthanide-doped Monodisperse β-$NaYF_4$ Nanoparticles, Spectroscopy Letters: An International Journal for Rapid Communication, 43:5, (2010), pp. 400-405.
Wood, V. et al., Electroluminescence from Nanoscale Materials via Field-Driven Ionization, Nano. Lett. (2011) 11, pp. 2927-2932.
Wu, Y. et al., Intrinsic Optical Properties and Enhanced Plasmonic Response of Epitaxial Silver, Adv. Mater. (2014), 5 pages.
Xu, K. et al., Dual-objective STORM reveals three-dimensional filament organization in the actin cytoskeleton, Nature Methods, vol. 9, No. 2 (2012), 6 pages.
Xu, Z. et al., Ultraviolet Communications: Potential and State-of-the-Art, IEEE Communications Magazine (May 2008), pp. 67-73.
Yang, Y. et al., Optically Thin Metallic Films for High-Radiative-Efficiency Plasmonics, Nano Lett. (2016) 16, pp. 4110-4117.
Zhang, F. et al., Formation of Hollow Upconversion Rare-Earth Fluoride Nanospheres; Nanoscale Kirkendall Effect During Ion Exchange; Chem. Mater. 2009, 21, 5237-5243; Received Jul. 21, 2009. Revised Manuscript.
Zhang, S. et al., Enhancing the emission directionality of organic light-emitting diodes by using photonic microstructures, Appl. Phys. Lett. 103, 213302 (2013).
Zhen, B. et al., Spawning rings of exceptional points out of the Dirac cones, Nature, vol. 525, Sep. 17, 2015, pp. 354-358.
Zhou, M. et al., Extraordinary Large Optical Cross Section for Localized Single Nanoresonator, Physical Review Letters, Jul. 10, 2015, pp. 023903-1-023903-5.

(56) References Cited

OTHER PUBLICATIONS

International Search Report and Written Opinion dated Oct. 24, 2017 for International Application No. PCT/US17/25409, 14 pages.
Althues, H. et al., Functional inorganic nanofillers for transparent polymers. *Chem. Soc. Rev.*, vol. 36, 2007, pp. 1454-1465.
Arsenault, A.C. et al., Photonic-crystal full-colour displays. *Nature Photonics*, vol. 1, Aug. 2007, pp. 468-472.
Chatterjee, U. et al., Dispersion of Functionalized Silver Nanoparticles in Polymer Matrices: Stability. Characterization, and Physical Properties, Polymer Composites, vol. 30, Issue 6, pp. 827-834 (Jun. 2009).
Cheng, F. et al., Structural color printing based on plasmonic metasurfaces of perfect light absorption, Scientific Reports, Jun. 5, 2015, 10 pages.
Choi, S. et al., Emissive Transparent Luminescent Layer Using Shape Controlled YBO3:EU$^{3+}$ Nanophosphors Prepared by Solvothermal Reactions, Electrochemical and Solid-State Letters, 15(5) 2012, pp. J19-J23.
Chou, J.B. et al., Design of Wide-Angle Selective Absorbers/Emitters with Dielectric Filled Metallic Photonic Crystals for Thermophotovoltaic Applications. *Optics Express*, vol. 22, No. 51, pp. A144-A154, (published Dec. 17, 2013).
Colombo, A. et al., Nanoparticle-doped large area PMMA plates with controlled optical diffusion. *J. Mater. Chem. C.*, vol. 1, Mar. 8, 2013, pp. 2927-2934.
Colombo, A. et al., Nanoparticle-doped large area PMMA plates with controlled optical diffusion. Electronic Supplementary Material (ESI) for *J. Mater. Chem. C.*, Mar. 8, 2013, pp. 1-5.
Display Search, The 27$^{th}$ DisplaySearch Japan (Jul. 2014), 8 pages.
Dodgson, A.A., 3D without the glasses. *Nature*, vol. 495, Mar. 21, 2013, pp. 316-317.
Engheta, N., Pursuing Near-Zero Response, Science, vol. 340, Apr. 19, 2013, pp. 286-287.
Enrichi, F., Luminescent Amino-functionalized or Erbium-doped Silica Spheres for Biological Applications, Ann. N.Y. Acad. Sci. 1130 (2008), pp. 262-266.
European Search Report dated Sep. 16, 2016 from European Application No. 13870062.0, 9 pages.
Fattal, D. et al., A multi-directional backlight for a wide-angle, glasses-free three-dimensional display. *Nature*, vol. 495, Mar. 21, 2013, pp. 348-351.
Final Office Action dated Jan. 3, 2017 from U.S. Appl. No. 15/090,348, 4 pages.
Forestiere, C. et al., Theory of coupled plasmon modes and Fano-like resonances in subwavelength metal structures, Physical Review B 88 (2013), 155411, 12 pages.
Geng, J. Three-dimensional display technologies, Advances in Optics and Photonics vol. 5, Issue 4, pp. 456-535 (2013).
Goebel, J. et al., Synthesis of tailored Au@TiO2core-shell nanoparticles forphotocatalytic reforming of ethanol, Catal. Today (2013), 6 pages.
Graham-Rowe, D., Tunable structural colour, Out of the Lab, Nature Photonics, vol. 3, Oct. 2009, pp. 551-553.
Hamann, R. E., et al., Coupled-mode theory for general free-space resonant scattering of waves, Physical Review A, vol. 75, (2007), pp. 053801-1-053801-5.
Head-up display link, from Wikipedia, the free encyclopedia, (2015) https://en.wikipedia.om/wiki/Head-up_display, retrieved on Dec. 18, 2015, 5 pages.
Hinklin, T.R. et al., Transparent, Polycrystalline Upconverting nanoceramics: Towards 3-D Displays. Advanced Materials, vol. 20, 2008, pp. 1270-1273.
HoloProTM link, http://www.holopro.com/, (Jan. 2015), retrieved on Dec. 18, 2015, 3 pages.
Hong, K. et al., Full-color lens-array holographic optical element for three-dimensional optical see-through augmented reality, Optics Letters vol. 39, Issue 1, pp. 127-130 (2014).
Hsu, C.-W. et al., Transparent Displays Enabled by Resonant Nanoparticle Scattering, Optical Society of America (2014), 2 pages.
Hsu, C.-W. et al., Observation of trapped light within the radiation continuum, Nature 499, pp. 188-191 (Jul. 11, 2013).
Hsu, W. Literature survey for nanoparticle scattering, (2012), 7 pages.
Huang, X. et al., Dirac cones induced by accidental degeneracy in photonic crystals and zero-refractive-index materials, Nature Materials, vol. 10, (Aug. 2011), pp. 582-586.
International Search Report and Written Opinion of the International Search Authority in related PCT Application No. PCT/US2013/078234, dated Jun. 11, 2014, 14 pages.
International Search Report and Written Opinion of the International Search Authority in related PCT Application No. PCT/US2013/078233 dated Apr. 18, 2014, 12 pages.
Kim, H. et al., Structural colour printing using a magnetically tunable and lithographically fixable photonic crystal, Nature Photonics, vol. 3, Sep. 2009, pp. 534-540.
Kimoto—Projection Screen Films link, http://www.kimototech.com/projection_screen_films.html, (2015), retrieved on Dec. 18, 2015, 2 pages.
Lee, J.-H. et al., Optimal projector configuration design for 300-Mpixel multi-projection 3D display, Optics Express vol. 21, Issue 22, pp. 26820-26835 (2013).
Li, A. et al., Ultrahigh Enhancement of Electromagnetic Fields by Exciting Localized with Extended Surface Plasmons, arxiv.org/pdf/1507.00311 (2015), 28 pages.
Li, Y. et al., On-chip zero-index metamaterials, Nature Photonics, vol. 9, (Nov. 2015), pp. 738-743.
Loget, G. et al., Bulk synthesis of Janus objects and asymmetric patchy particle, J. Mater. Chem. (2012) 22, 15457, 19 pages.
Lu, Y. J., et al., All-Color Plasmonic Nanolasers with Ultralow Threshholds: Autotuning Mechanism for Single-Mode Lasing, Nano Letters, vol. 14, (2014), pp. 4381-4388.
Mai, H.X., et al., Highly Efficient Multicolor Up-Conversion Emissions and Their Mechanisms of Monodisperse NaYF4:Yb,Er Core and Core/Shell-Structured Nanocrystals; J. Phys. Chem. C. C 2007,111, 13721-13729; In Final Form: Jul. 6, 2007.

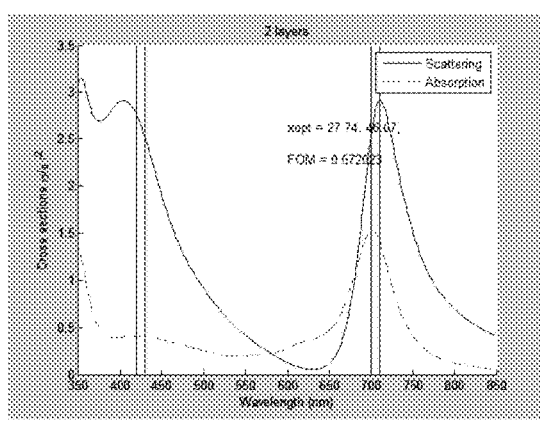 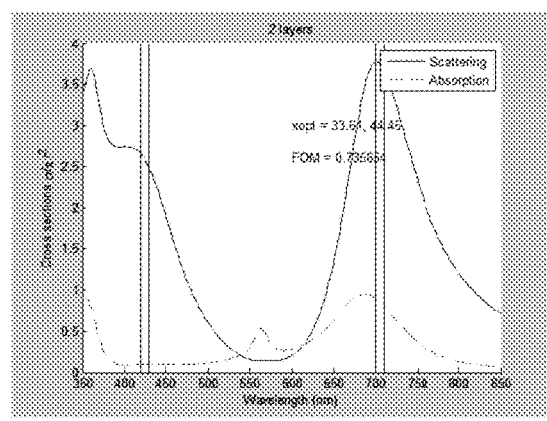
FIG. 4C  FIG. 4D

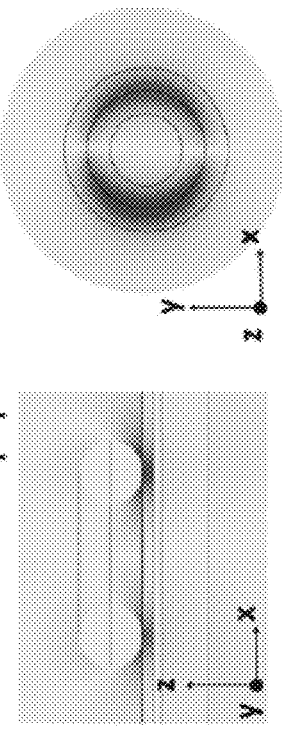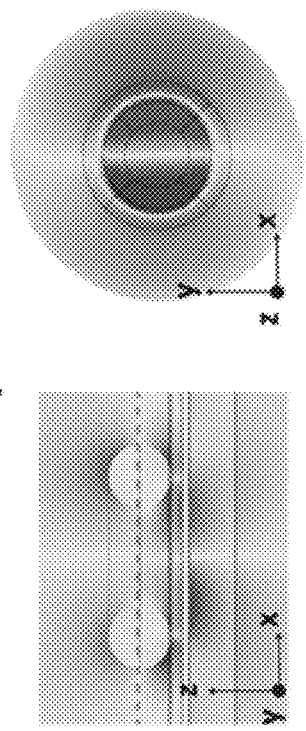
FIG. 9A
FIG. 9B

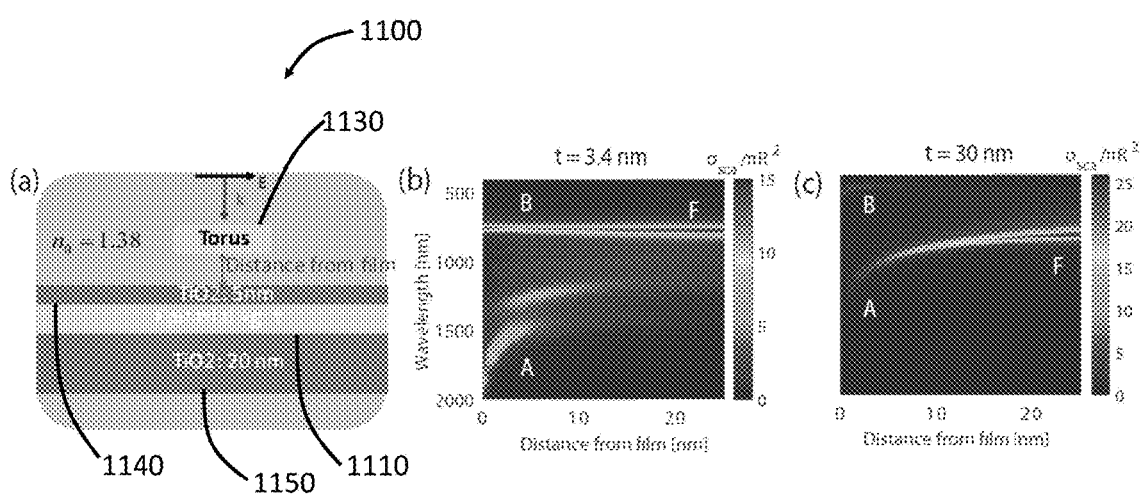
FIG. 11A     FIG. 11B     FIG. 11C

(C)
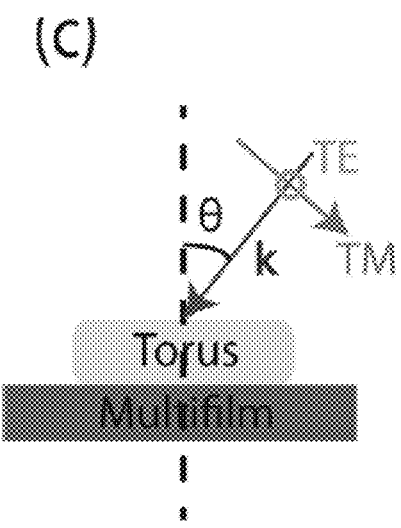 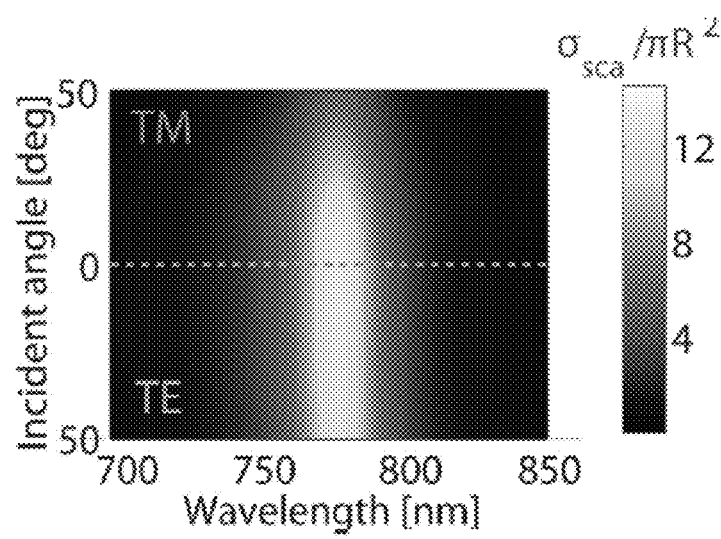
FIG. 12C  FIG. 12D

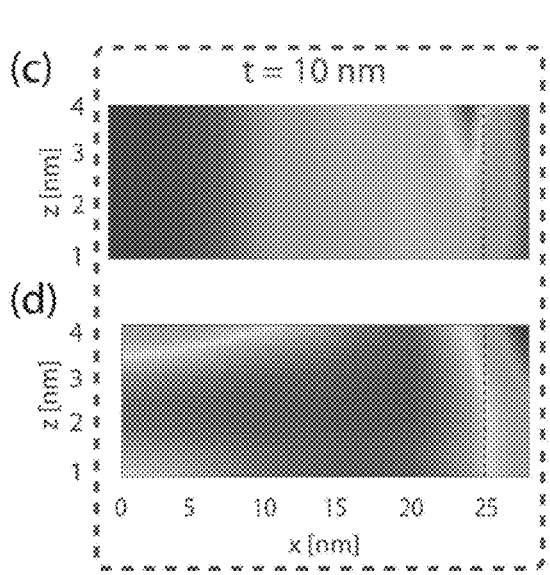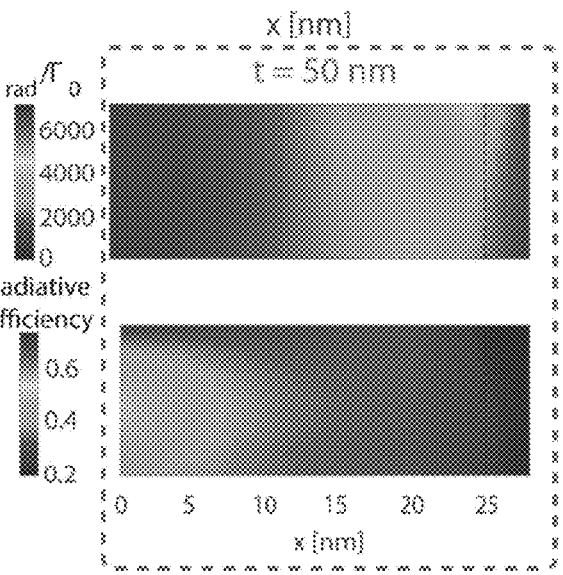
FIG. 18A  FIG. 18B
FIG. 18C  FIG. 18D

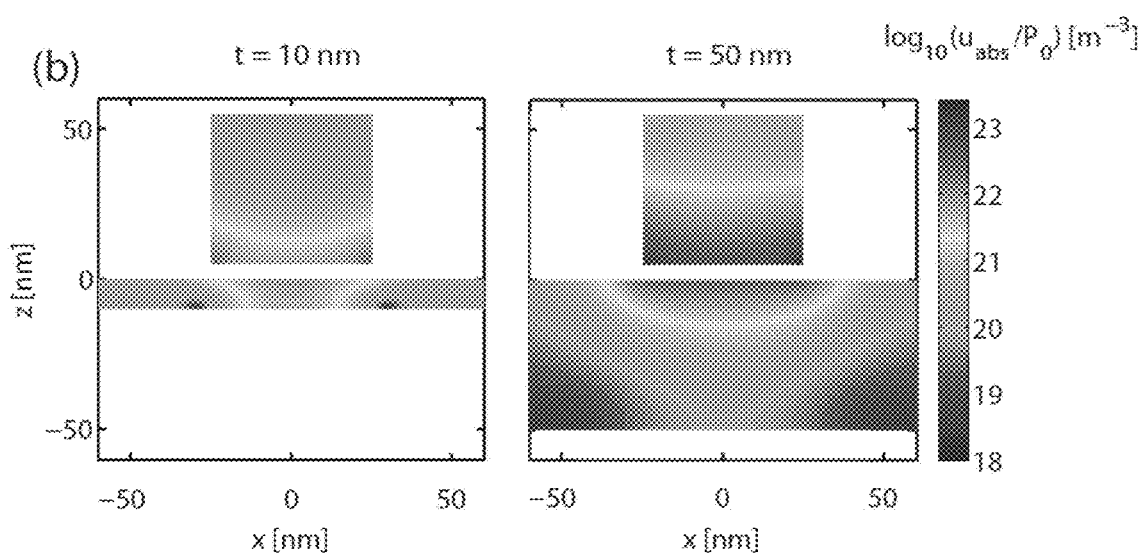
FIG. 21A  FIG. 21B

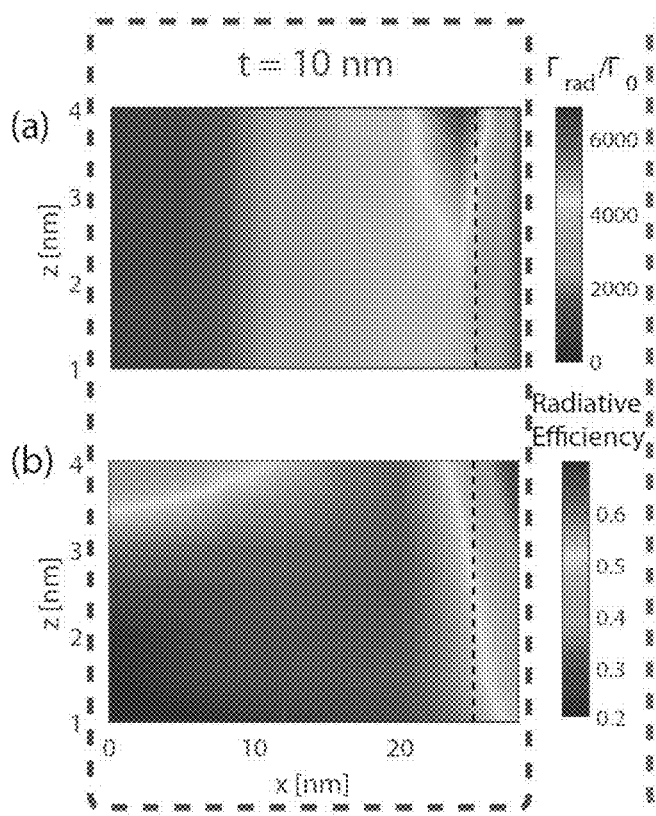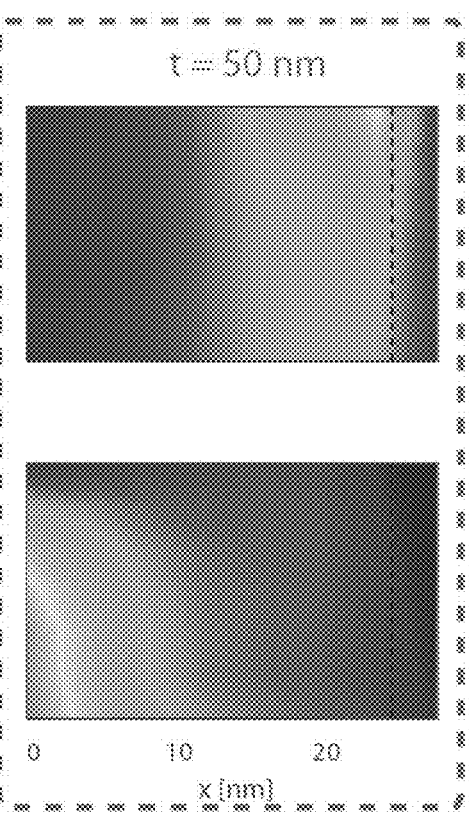
FIG. 22A  FIG. 22B
FIG. 22C  FIG. 22D

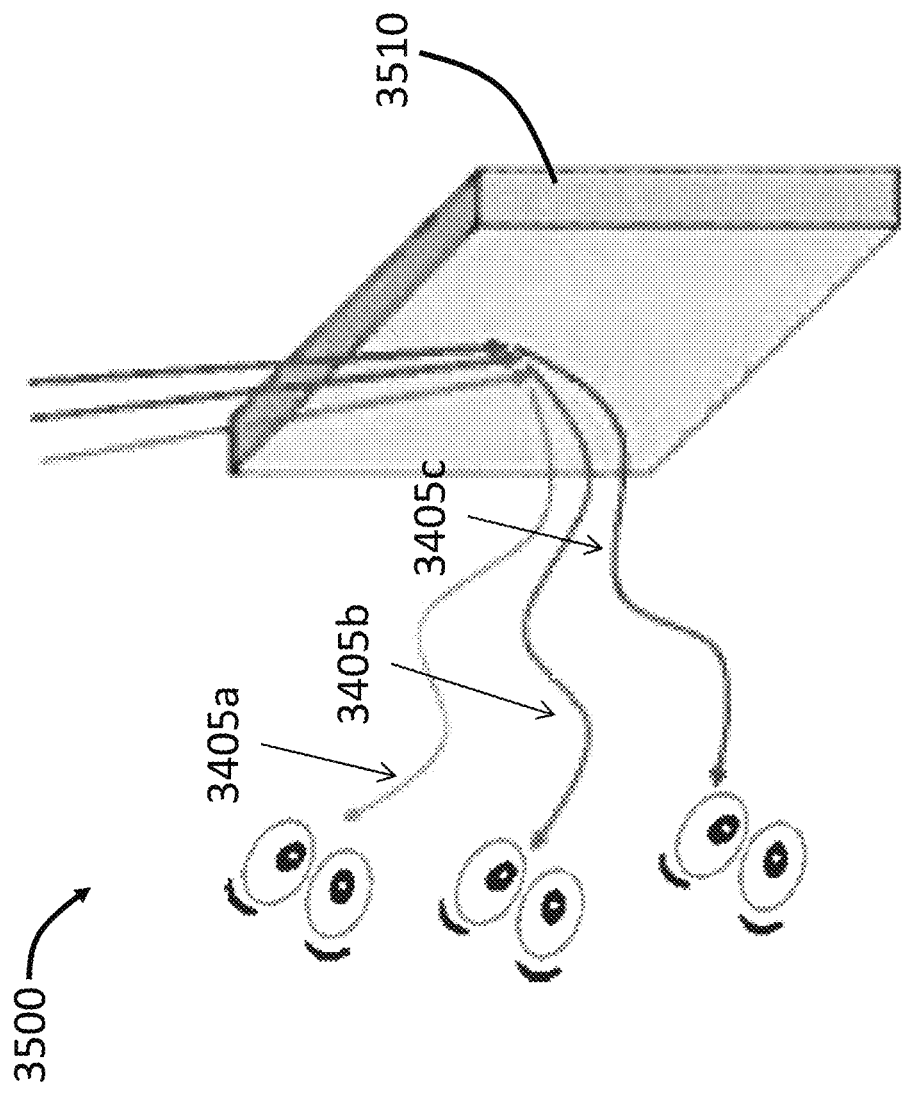

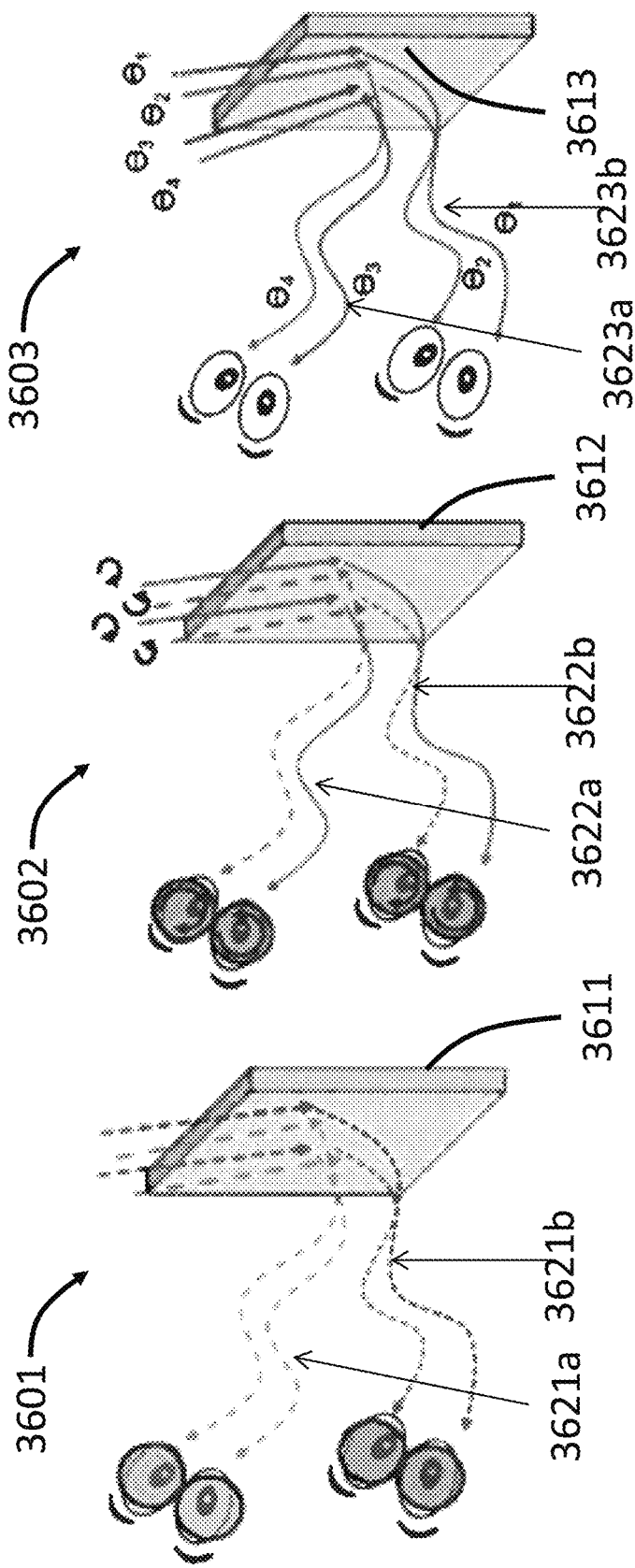

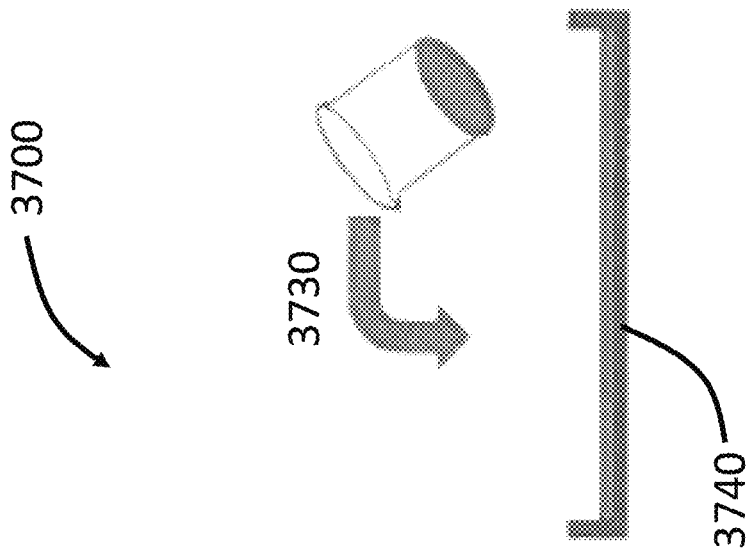
FIG. 37C
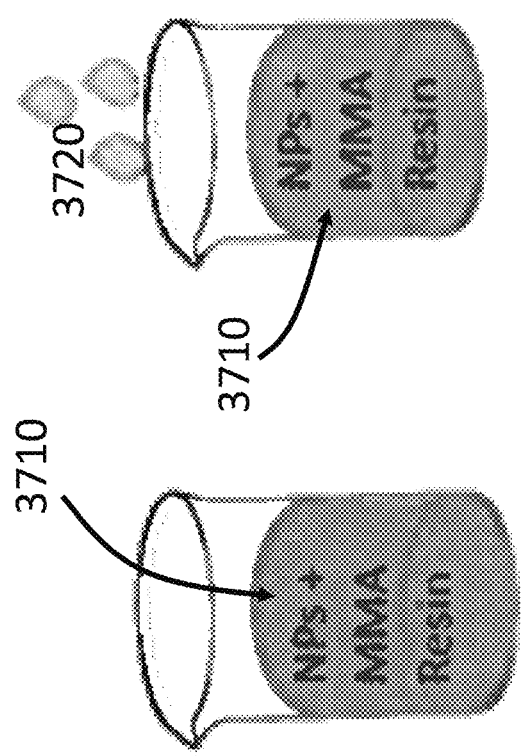
FIG. 37B
FIG. 37A

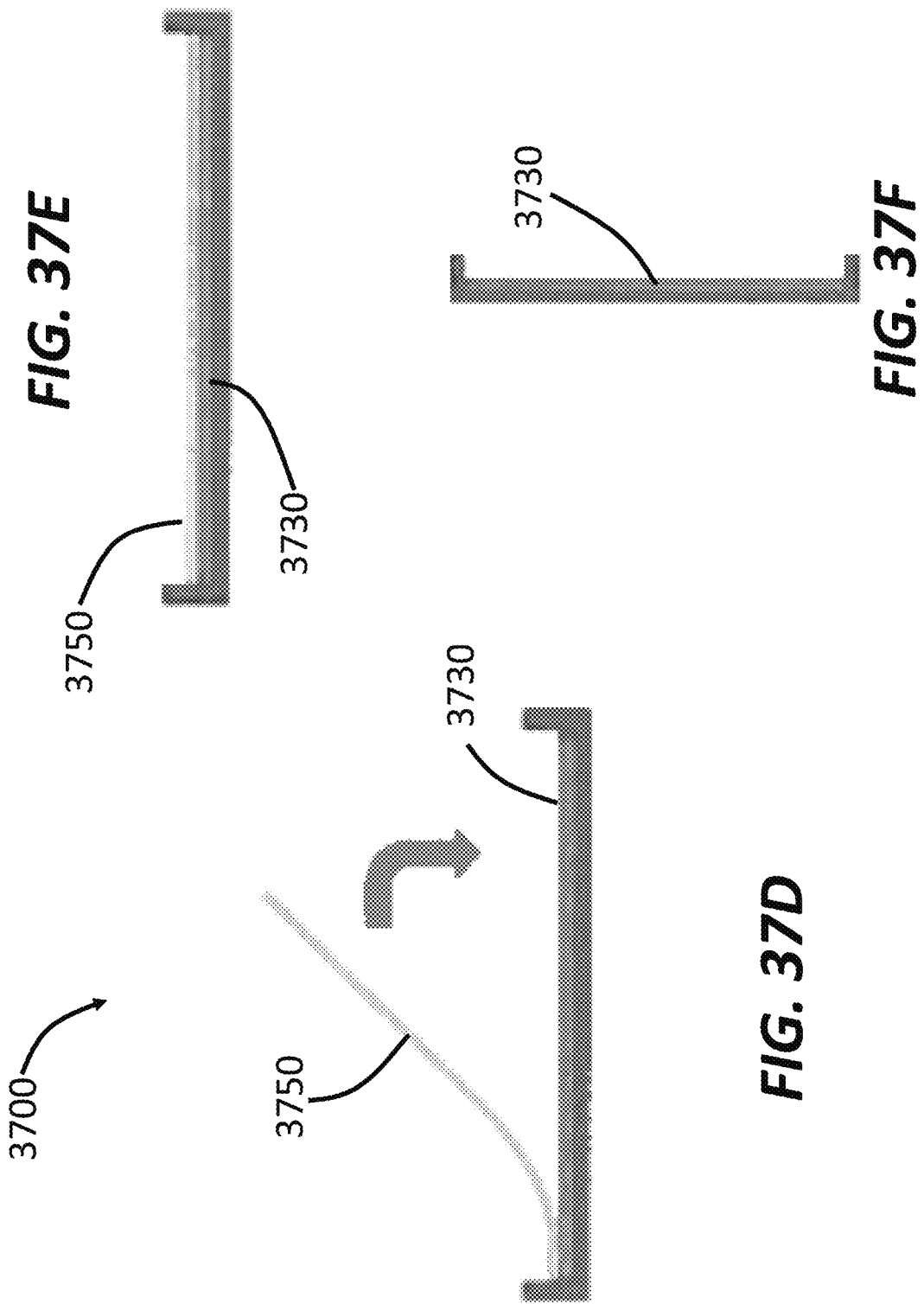

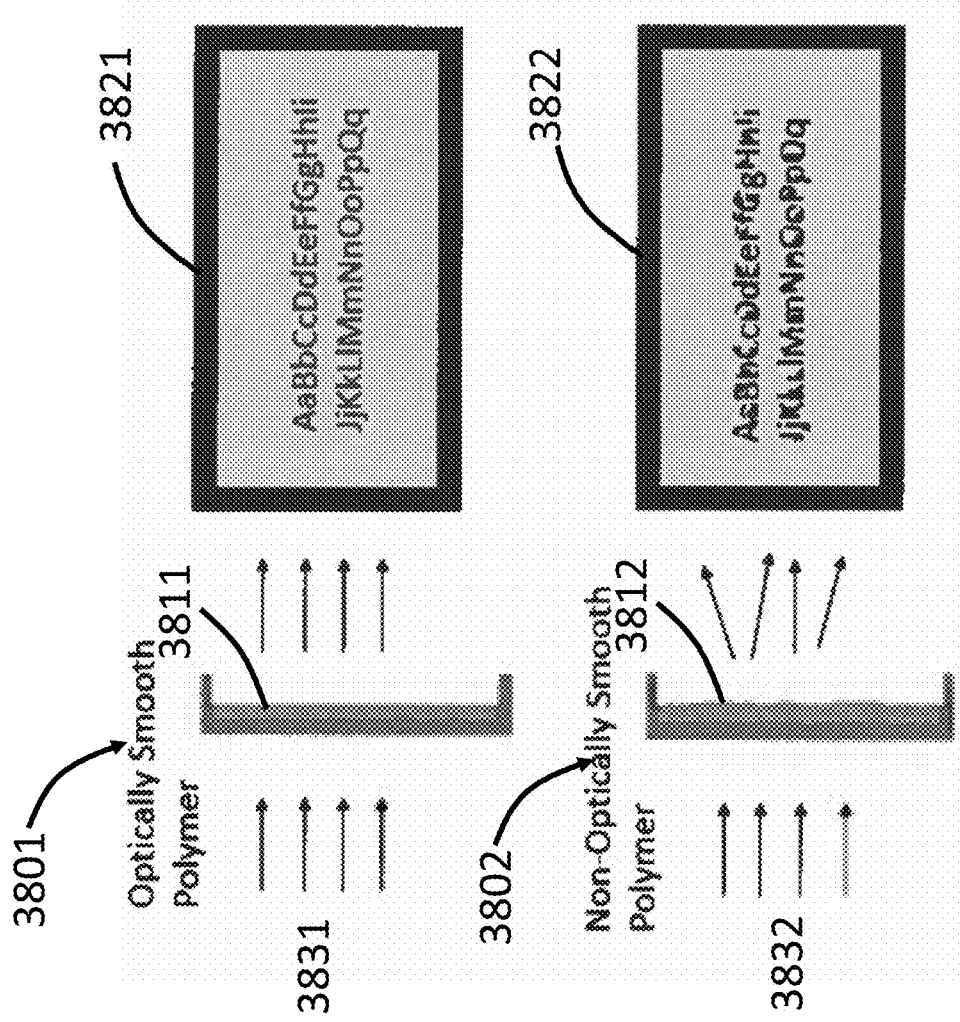

TRANSPARENT DISPLAYS WITH SCATTERING NANOPARTICLES AND THIN FILMS FOR ENHANCED SCATTERING

CROSS-REFERENCES TO RELATED APPLICATIONS

This application claims priority to U.S. Application No. 62/316,617, filed Apr. 1, 2016, entitled "TRANSPARENT DISPLAYS BASED ON RESONANT NANOPARTICLES," which is hereby incorporated herein by reference in their entirety for all purposes.

GOVERNMENT SUPPORT

This invention was made with Government support under Contract No. W911NF-13-D-0001 awarded by the Army Research Office and Contract No. DMR-1419807 awarded by the National Science Foundation. The Government has certain rights in the invention.

BACKGROUND

Transparent displays are long sought-after by scientists and engineers. Two-dimensional (2D) transparent displays can create images that appear floating in the air, in contrast to traditional displays where images appear on a visible screen. Aside from creating special visual impressions, such displays can have a wide variety of applications. A glass window can be turned into the screen of a home theater. Eyeglasses can become a mini computer screen. The windshield of a vehicle can show information, such as maps, without blocking the driver's view. The display window of a store can show not only products but also their information.

The most common transparent displays, such as those used in some airplanes, cars, and Google Glass, are Heads-Up Displays (HUDs). An HUD creates images by projecting light onto glass, which reflects the light beam into the viewer's eyes via specular reflection. A drawback of these displays is that specular reflection typically occurs at only one angle. As a result, a viewer can only see the images from a limited range of angles, i.e., the viewing angle is small.

Another type of transparent display is the holographic screen (also referred to as a diffusion screen), which includes a diffractive element (also referred to as a holographic element) to scatter light. The viewing angle of a holographic screen is usually larger than that in HUDs but is still not satisfactory for a broad audience. In addition, the transmittance of holographic screens is typically very low and the laser writing process to fabricate the diffractive element is complex and costly.

SUMMARY

Embodiments of the present invention include apparatus, systems, and methods for transparent displays. In one example, a transparent display includes a thin film having a film thickness substantially equal to or less than 1 µm. At least one light source is in optical communication with the thin film to illuminate the thin film with light comprising a first spectral component at a first wavelength. The transparent display also includes at least one nanoparticle disposed within about 5 µm from the thin film. The at least one nanoparticle has a first resonant scattering peak at the first wavelength to scatter the first spectral component and to transmit light at other wavelengths in the visible spectrum.

In another example, a method of operating a transparent display is disclosed. The transparent display includes at least one nanoparticle disposed within about 5 µm from a thin film. The thin film has a film thickness substantially equal to or less than 1 µm and the at least one nanoparticle has a first resonant scattering peak at a first wavelength. The method includes illuminating the at least one nanoparticle with light having a first spectral component at the first wavelength. The at least one nanoparticle scatters at least a portion of the first spectral component towards a viewer and transmitting ambient light at other wavelengths in the visible spectrum.

In yet another example, a transparent display includes a metal film having a film thickness of about 3 nm to about 50 nm and a spacer film disposed on the metal film and having a spacer thickness substantially equal to or less than 30 nm. The transparent display also includes at least one light source, in optical communication with the metal film, to illuminate the metal film with light comprising a first spectral component at a first wavelength. The transparent display also includes at least one torus structure disposed on the spacer film. The at least one torus structure has wherein the torus structure has a major radius of about 10 nm to about 70 nm and a minor radius of about 5 nm to about 35 nm. The torus structure has a first resonant scattering peak at the first wavelength to scatter the first spectral component and to transmit light at other wavelengths in the visible spectrum.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4B-4D show scattering and absorption spectra of nanoparticles having a core-shell structure.

FIGS. 9A and 9B show the distribution of electric field along the z direction of two eigenmodes in the platform shown in FIG. 8.

FIGS. 11A-11C illustrate scattering of a silver torus disposed above a metal film as a function of the distance between the silver torus and the metal film.

FIGS. 12C and 12D illustrate angular dependence of the scattering cross section of the torus plasmon resonance with a 3.4 nm thick metal film under the excitation of TE and TM polarizations.

FIGS. 18A and 18B show radiative enhancement in the x-z plane as a function of dipole location in the structure shown in FIG. 17A with a 10 nm silver film and a 50 nm silver film, respectively.

FIGS. 18C and 18D show radiative efficiency in the x-z plane as a function of dipole location in the structure shown in FIG. 17A with a 10 nm silver film and a 50 nm silver film, respectively.

FIGS. 21A and 21B show normalized absorption per unit volume at normal incidence of the cylinder in the structure shown in FIG. 17A with a 10 nm silver film and a 50 nm thick silver film, respectively.

FIGS. 22A and 22B show normalized radiative decay rate in the x-z plane in the structure shown in FIG. 17A with a 10 nm thick epitaxial silver film and a 50 nm thick epitaxial silver film, respectively.

FIGS. 22C and 22D show quantum efficiency as a function of dipole location in the x-z plane in the structure shown in FIG. 17A with a 10 nm thick epitaxial silver film and a 50 nm thick epitaxial silver film, respectively.

FIG. 35 shows a schematic of a split-view screen based on photonic crystals.

FIGS. 36A-36C show schematics of split view 3D displays using laser beams having different wavelengths, different polarizations, and different incident angles, respectively.

FIGS. 37A-37F illustrate a method of fabricating transparent displays including nanoparticles.

FIGS. 38A-38B illustrate the effect of surface roughness on the content displayed on a transparent display.

DETAILED DESCRIPTION

Following below are more detailed descriptions of various concepts related to, and embodiments of, inventive systems, methods and apparatus for transparent displays with scattering nanoparticles. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Overview

To achieve both high brightness and high transparency, transparent displays described herein employ nanoparticles having wavelength-selective scattering (e.g., resonant scattering) to preferentially scatter light at one or more discrete wavelengths so as to create an image. The nanoparticles transmit light at other wavelengths to maintain a high transparency of the display. In addition, the nanoparticles are disposed in proximity to a thin film, which can enhance the scattering the process by, for example, reflecting light back to the nanoparticles for re-scattering or increasing the quality factor of the resonant scattering.

Figure 1:
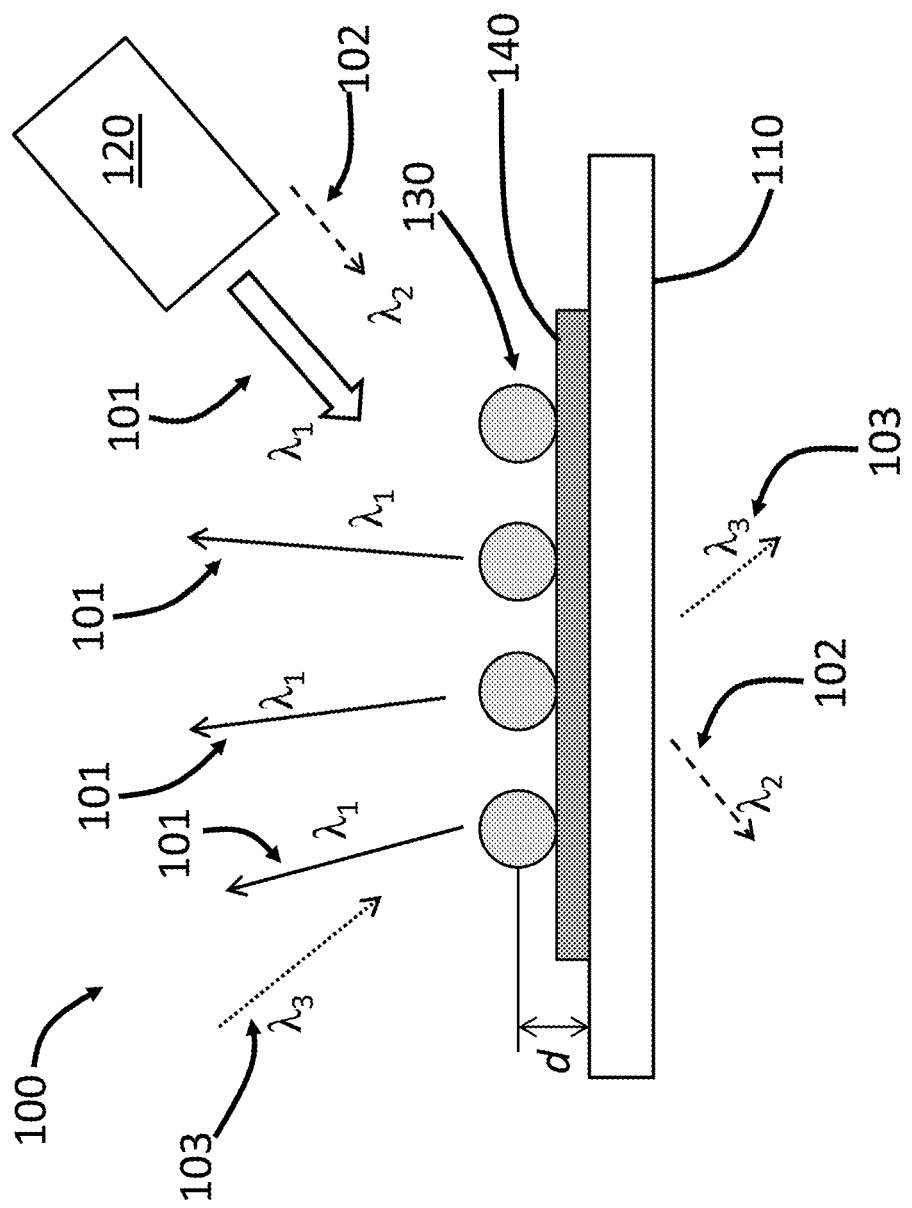
FIG. 1 shows a schematic of a transparent display including nanoparticles disposed near a thin film to create images.

FIG. 1 shows a schematic of a transparent display 100 including nanoparticles 130 disposed near a thin film 110 (e.g., within about 5 μm from the surface of the thin film 110). In some cases, an optional spacer layer 140 supports the nanoparticles 130 (see, e.g., FIG. 8). In other cases, the nanoparticles 130 are disposed directly on the thin film 110 (see, e.g., FIG. 5). The nanoparticles 130 can also be completely or partially embedded in the spacer layer 140, which may be formed of a resin or other suitable material that is transparent at visible wavelengths when cured. If completely or partially exposed, whether on the spacer layer 140 or the thin film 110, the nanoparticles 130 may be coated or covered with a transparent protective layer (not shown).

A light source 120 is in optical communication with the thin film 110 and the nanoparticles 130 to illuminate them with light 101 at wavelength $\lambda_1$. The thin film 110 and the nanoparticles 130 may also be illuminated by other light sources, such as ambient light 102 and 103 at wavelengths $\lambda_2$ and $\lambda_3$, respectively. All the wavelengths $\lambda_1$, $\lambda_2$, and $\lambda_3$ can be in the visible spectrum. The nanoparticles 130 are configured to scatter the light 101 at $\lambda_1$ via resonant scattering and transmit light at other wavelengths, such as the light 102 and 103. In other words, the nanoparticles 130 have a resonant scattering peak at the wavelength $\lambda_1$. A viewer can see images from the scattered light 101 while the transparent display 100 maintains a high degree of transparency due the transmission of other light (e.g., 102 and 103). More details about image formation via nanoparticle scattering can be found in U.S. Pat. No. 9,335,027, which is hereby incorporated herein by reference in their entirety for all purposes.

The thin film 110 can enhance the scattering of the nanoparticles 110 via various mechanisms. In one example, the thin film 110 is part of a notch filter (also referred to as a band stop filter), which reflects light at wavelength $\lambda_1$ and transmits light at other wavelengths. In this case, the light 101 that is not scattered by the nanoparticles 130 towards the viewer is reflected by the notch filter back to the nanoparticles 130 for re-scattering, thereby increasing the total scattering. More information about using a notch filter in a transparent display is discussed below with reference to FIGS. 5-7.

In another example, the thin film 110 includes a thin metal film (also referred to as a metal layer), which can induce thin film plasmonics with a high quality factor, thereby reducing optical losses on the nanoparticles 130. By squeezing optical modes mostly into the plasmonic modes inside the thin film 110, the transparent display 100 can have a high quality factor in the optical resonances of the nanoparticles 130 while maintaining a high degree of transparency. More details about this high-efficiency plasmonic scattering are described below with reference to FIGS. 8-23B.

The distance d between the nanoparticles 130 and the thin film 110 can be less than 5 μm (e.g., less than 5 μm, less than 4 μm, less than 3 μm, less than 2 μm, less than 1 μm, less than 500 nm, less than 200 nm, less than 100 nm, less than 50 nm, or less than 20 nm, including any values and sub ranges in between).

Depending on the implementation, the light source 120 may include one or more lasers, light-emitting diodes (LEDs), or other spectrally coherent sources configured to generate light at wavelengths scattered by one or more of the nanoparticles 130. For example, the light source 120 may include an array of laser diodes, each of which emits light at a distinct wavelength. A first laser diode emits a first beam at a wavelength of about 460 nm (blue), a second laser diode emits a second beam at a wavelength of about 530 nm (red), and a third laser diode emits a third beam at a wavelength of about 650 nm (red). Accordingly, the nanoparticles 130 can include nanoparticles that preferentially scatter these wavelengths (i.e., 460 nm, 530 nm, and 650 nm) so as to form a full color image.

Alternatively, the light source 120 may include a broadband light source (e.g., an ultra-high performance (UHP) lamp or household projector). One or more dichroic filters or bandpass filters selects the desired wavelength(s). One advantage of broadband light sources is that they can provide higher optical power than a laser diode at a relatively low cost.

Nanoparticles Made of Epitaxial Metal

Various types of nanoparticles 130 can be used in the transparent display 100 shown in FIG. 1. In one example, the nanoparticles 130 can include micro-spheres. In another example, the nanoparticles 130 can include oblate spheroids to achieve narrow plasmonic resonances.

The nanoparticles 130 can include metal nanoparticles (e.g., gold, silver, and aluminum, among others). Without being bound by any particular theory or mode of operation, the quality factor of localized surface plasmon resonance of a metal nanoparticle is usually bounded by the dielectric function of the metal material. For a given metal material, the dielectric function usually behaves differently in different crystalline forms, such as amorphous metal, multi-crystalline metal (also referred to as polycrystalline metal), and single-crystalline metal (also referred to as epitaxial metal).

Figure 2:
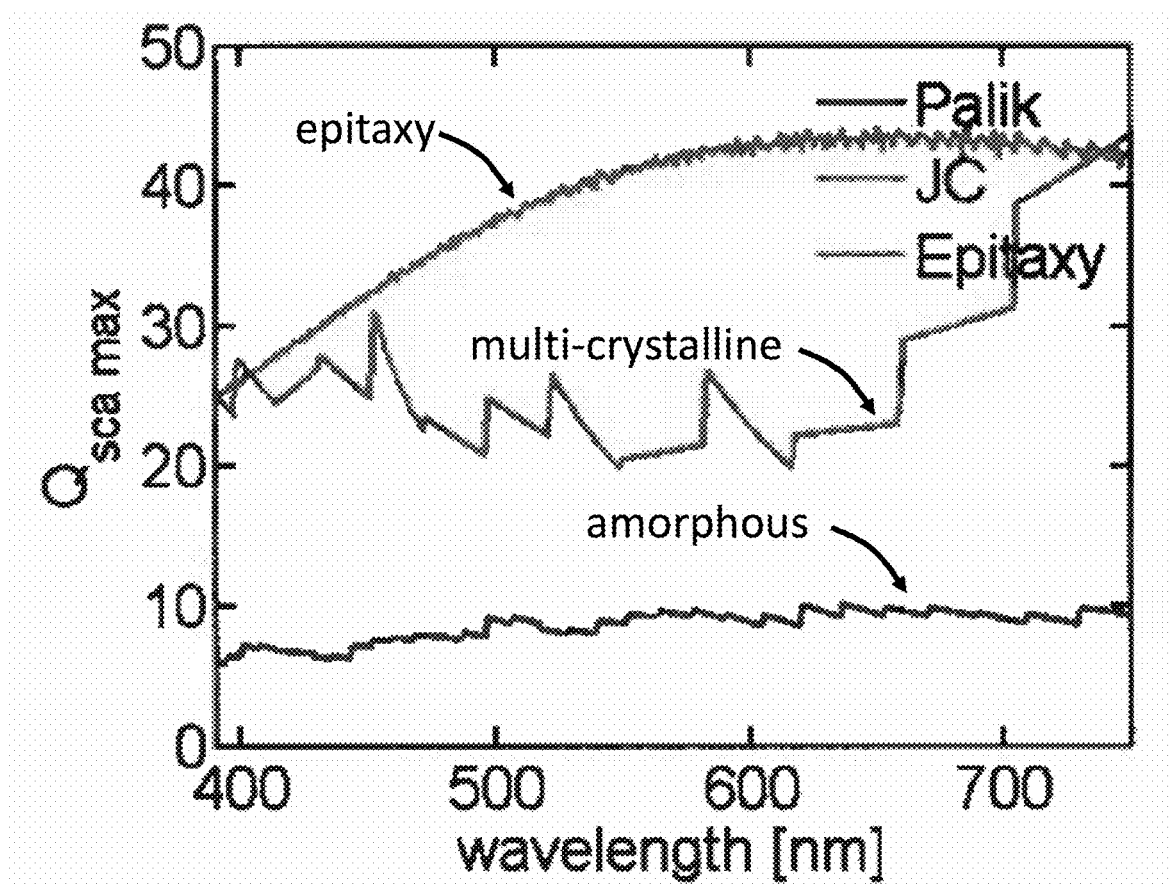
FIG. 2 shows maximal scattering quality factors of silver nanoparticles made of different crystalline forms of silver.

FIG. 2 shows maximal quality factors of silver nanoparticles made of different crystalline forms of silver. The quality factors are estimated with the approximation that scattering and absorption cross sections are equal. For amorphous silver, which can be approximated by the Palik database, the upper bound of quality factor is around 10. For multi-crystalline (JC data) and single-crystalline (epitaxial) silver, the upper limits are about two times to five times higher. Therefore, using epitaxial metal nanoparticles can build extremely high-quality transparent displays (i.e., high brightness of the resulting images).

Figure 3A:
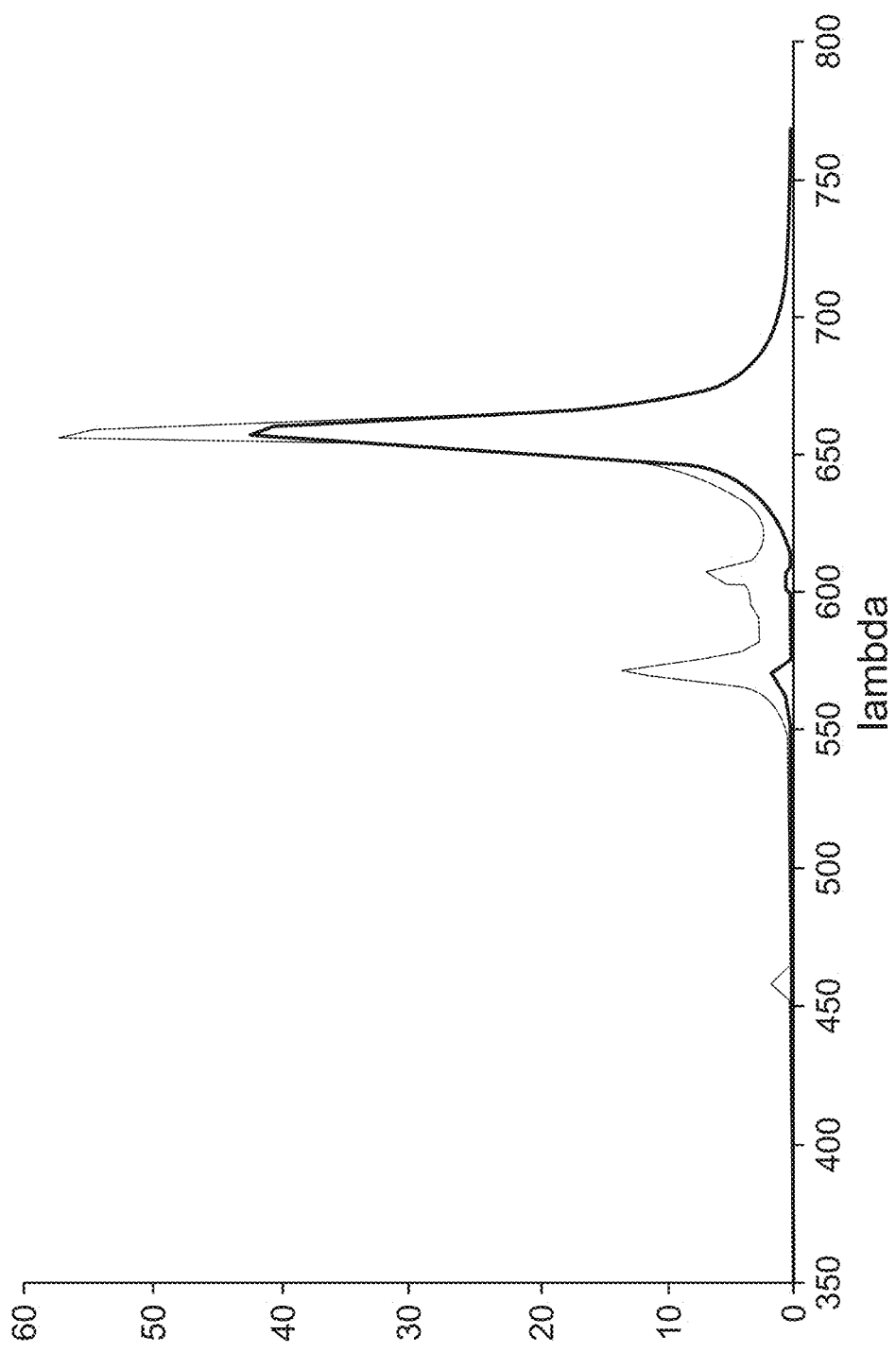
FIGS. 3A and 3B show measured scattering and absorption spectra of nanoparticles including epitaxial silver oblate spheroids.

FIG. 3A shows measured scattering and absorption spectra of nanoparticles including epitaxial silver oblate spheroids. The nanoparticles have a long axis of about 48 nm and a short axis of about 7 nm. These nanoparticles have a resonant peak at about 650 nm (i.e. red color), and the corresponding quality factor is about 47.

Figure 3B:
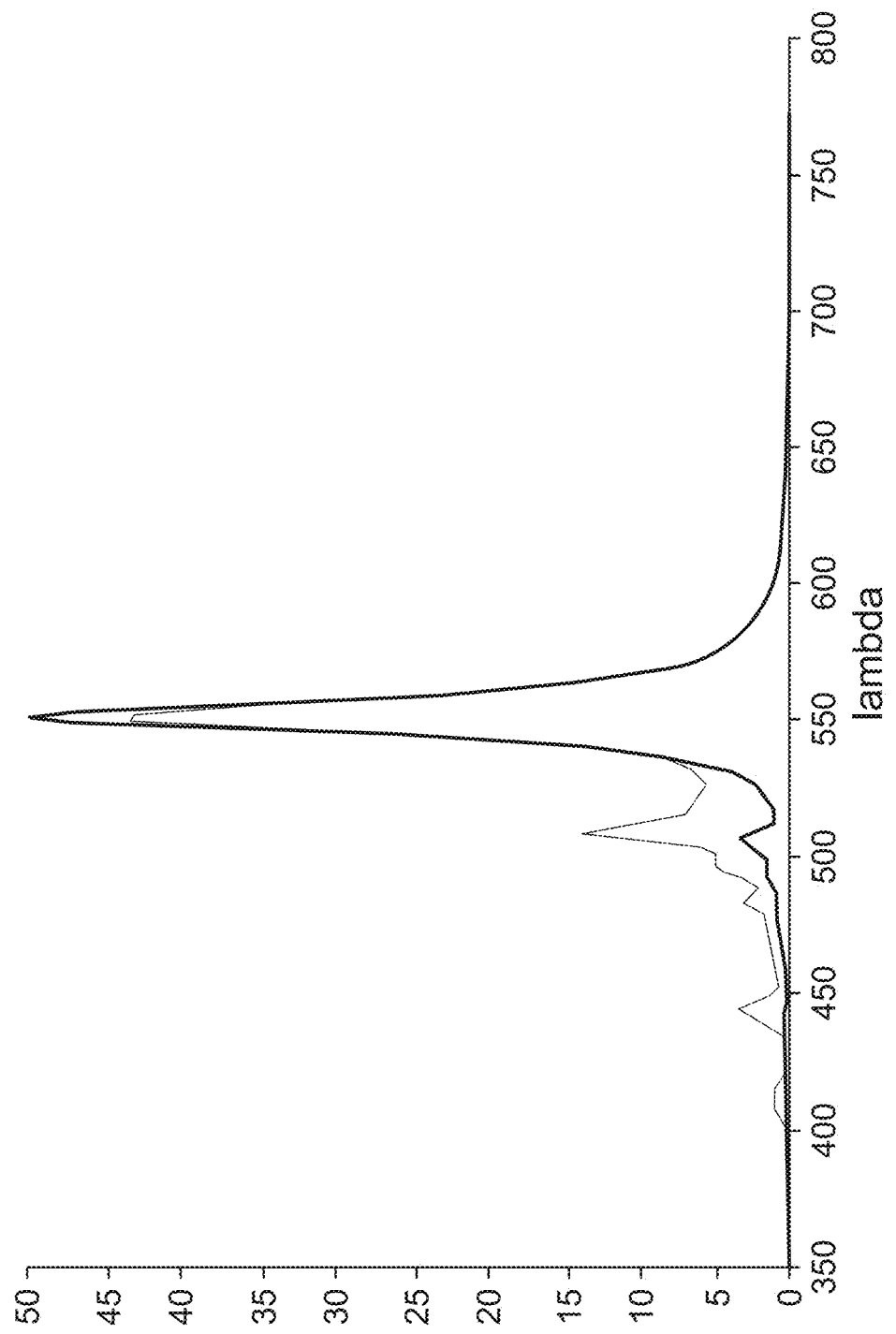

FIG. 3B shows measured scattering and absorption spectra of nanoparticles including epitaxial silver oblate spheroids having a different dimensions. These nanoparticles have a long axis of about 48 nm and a short axis of about 12 nm.

The spectra show a resonant peak at about 550 nm (i.e., green color), and the corresponding quality factor is about 31.

It can be seen from FIGS. 3A and 3B that adjusting the short axis of the epitaxial silver oblate spheroids can change the resonant wavelength of the resulting nanoparticles. For example, increasing the length of the short axis blue shifts the resonant wavelength. In addition, this approach can be used for other metal nanoparticles, such as gold nanoparticles and aluminum nanoparticles, among others.

Nanoparticles Having a Core-Shell Structure

Figure 4A:
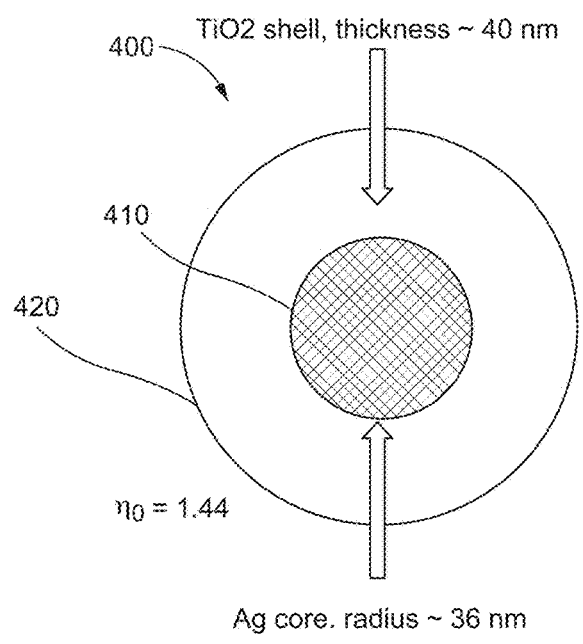
FIG. 4A shows a schematic of a nanoparticle having a core-shell structure that can be used in the transparent display shown in FIG. 1.

The nanoparticles 130 in the transparent display 100 can also have a core-shell structure whose parameters are selected to set their scattering properties, including the resonant scattering wavelength(s). FIG. 4A shows a schematic of a nanoparticle 400 including a core 410 surrounded by a shell 420. In one example, the core 410 is at the center of the shell 420. In another example, the core 410 can be non-concentric with respect to the shell 420. The core 410 can include a metal, such as gold and silver, and the shell 420 can include a dielectric material, such as $TiO_2$. In one example, the $TiO_2$ can be amorphous. In another example, the $TiO_2$ can be crystalline $TiO_2$, such as anatase, rutile, or brookite.

The diameter of the core 410 can be about 20 nm to about 100 nm (e.g., about 20 nm, about 30 nm, about 40 nm, about 50 nm, about 60 nm, about 70 nm, about 80 nm, about 90 nm, or about 100 nm, including any values and sub ranges in between). The thickness of the shell 420 can be about 10 nm to about 80 nm (e.g., about 10 nm, about 20 nm, about 30 nm, about 40 nm, about 50 nm, about 60 nm, about 70 nm, or about 80 nm, including any values and sub ranges in between).

The core-shell structure in the nanoparticle 400 can be used to make the nanoparticle 400 scatter light at more than one wavelength. For example, the nanoparticle 400 can be configured to scatter red (e.g., about 580 nm to about 760 nm), green (e.g., about 490 nm to about 580 nm), and blue (e.g., about 390 nm to about 490 nm) light with wide transparent windows between these scattering peaks. This nanoparticle 400 can be used to form a full-color transparent display.

Alternatively, as human eyes are most sensitive to the green color, a small amount of scattered green light can be sufficient to evoke a green vision. Therefore, the nanoparticle 400 may include only two scattering peaks at red and blue to create a full-color transparent display.

In yet another example, a full-color transparent display can be formed by stacking two layers of nanoparticles. In one example, the first layer includes nanoparticles resonating at a first wavelength in the red region and the second layer incudes nanoparticles resonating at a second wavelength in the blue region. Since the nanoparticles in each layer scatter light only at the corresponding resonant wavelength, this approach can be used towards a three dimensional transparent display, where different wavelength-resonant nanoparticles correspond to different "depths" in the display. In this display, the core-shell structure can be used to achieve the desired resonant wavelength in each layer. In addition, each layer can also include a host material (e.g., a polymer) to substantially contain the nanoparticles, i.e., nanoparticles are dispersed in the host material.

In yet another example, a full color display can be constructed by mixing nanoparticles at various resonant wavelengths into the same layer. For example, the display can be divided into a two-dimensional array of cells having an array size of n×m, where n is the number of columns and m is the number of rows in the array. Columns having an even column number can be filled with nanoparticles resonating at red wavelengths and columns having an odd column number can be filled with nanoparticles resonating at blue wavelengths. Alternatively, the nanoparticles can be distributed in a row-wise manner. In yet another example, nanoparticles resonating at blue and red can be randomly distributed onto the transparent display. Given the small size of the nanoparticles, human eyes can still view the resulting transparent display as a continuous medium.

Figure 4B:
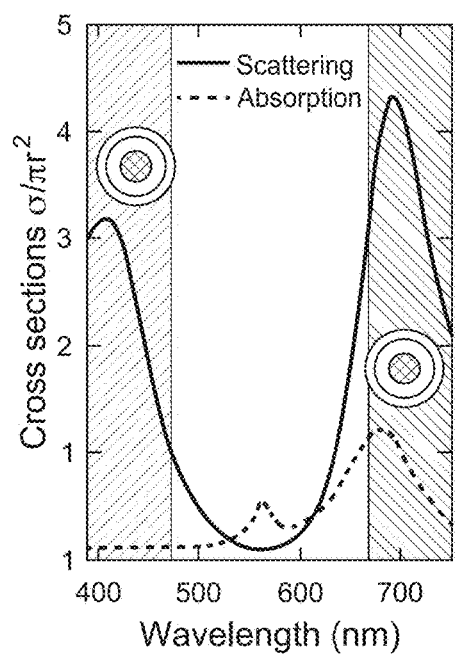

FIG. 4B shows scattering and absorption spectra of a nanoparticle having a core shell structure like the one shown in FIG. 4A. The core is made of silver and has a diameter of about 36 nm. The shell is made of $TiO_2$ and has a thickness of about 40 nm. The ambient index of refraction is set to be 1.44. Over the whole spectra, the scattering cross-section dominates over the absorption cross-section. The scattering spectrum shows two scattering peaks at wavelengths of about 410 nm (blue) and about 680 nm (red), respectively. Between these two scattering peaks is a wide transparent window, which means that light within this window can transmit through the nanoparticle with negligible optical losses. Combined with the response function of the human eye to colors, this nanoparticle can be used to construct high-quality full-color transparent display.

FIG. 4C shows scattering and absorption spectra of a nanoparticle having a gold core and a $TiO_2$ shell. The gold core has a radius of about 27.74 nm and the shell has a thickness of about 46.07 nm. The scattering cross section dominates most of the visible spectrum over the absorption cross section. Two scattering peaks at about 420 nm (blue) and about 700 nm (red) can be seen in the scattering section.

FIG. 4D shows scattering and absorption spectra of a nanoparticle having a silver core and a $TiO_2$ shell. The silver core has a radius of about 33.61 nm and the shell has a thickness of about 44.45 nm. Similar to the spectra in FIG. 4C, the scattering cross section in FIG. 4D also dominates most of the visible spectrum over the absorption cross section. Two scattering peaks at about 420 nm (blue) and about 700 nm (red) can be seen in the scattering section.

In some cases, multiple nanoparticles 400 can be dispersed in a substrate (e.g., polymer) and then disposed on the thin film 110 shown in FIG. 1. In this case, the nanoparticle 400 can be further coated with a layer of silica, which can enhance the stability of the nanoparticle 400 within the substrate as well as aid dispersion in the polymer. Other materials having a refractive index similar to the refractive index of the substrate can also be used for the coating. More examples of coating materials can be found in U.S. Pat. No. 9,139,737, which is hereby incorporated herein by reference in its entirety for all purposes.

The nanoparticle 400 can be fabricated by coating a $TiO_2$ shell on a pre-fabricated gold or silver core via a reagent. In one example, the reagent can include a reactive solution of $H_2O$ and hydroxypropyl cellulose (HPC). The solution can be stirred until the HPC completely dissolved, after which a solution of titanium tetrabutoxide (TBOT) in ethanol is injected. In another example, titanium-diisopropoxide bis (acetylacetonate) (TDAA) can be used to replace the TBOT. In yet another example, both TBOT and TDAA can be used in the reagent. More details of fabricating core-shell structures of nanoparticles can be found in James Goebl et al., "Synthesis of tailored Au@TiO2core-shell nanoparticles for photocatalytic reforming of ethanol," Catalysis Today, Volume 225, 15 Apr. 2014, Pages 90-95, which is hereby incorporated herein by reference in its entirety for all purposes.

Transparent Displays Including Nanoparticles Disposed on a Notch Filter

As described above, the quality factor of localized plasmonic resonances of a nanoparticle can be bounded by the dielectric function of nanoparticle material. This limitation may be independent of the size and shape of the nanoparticles. Therefore, further increase of the quality factor may be achieved by using external devices.

Figure 5:
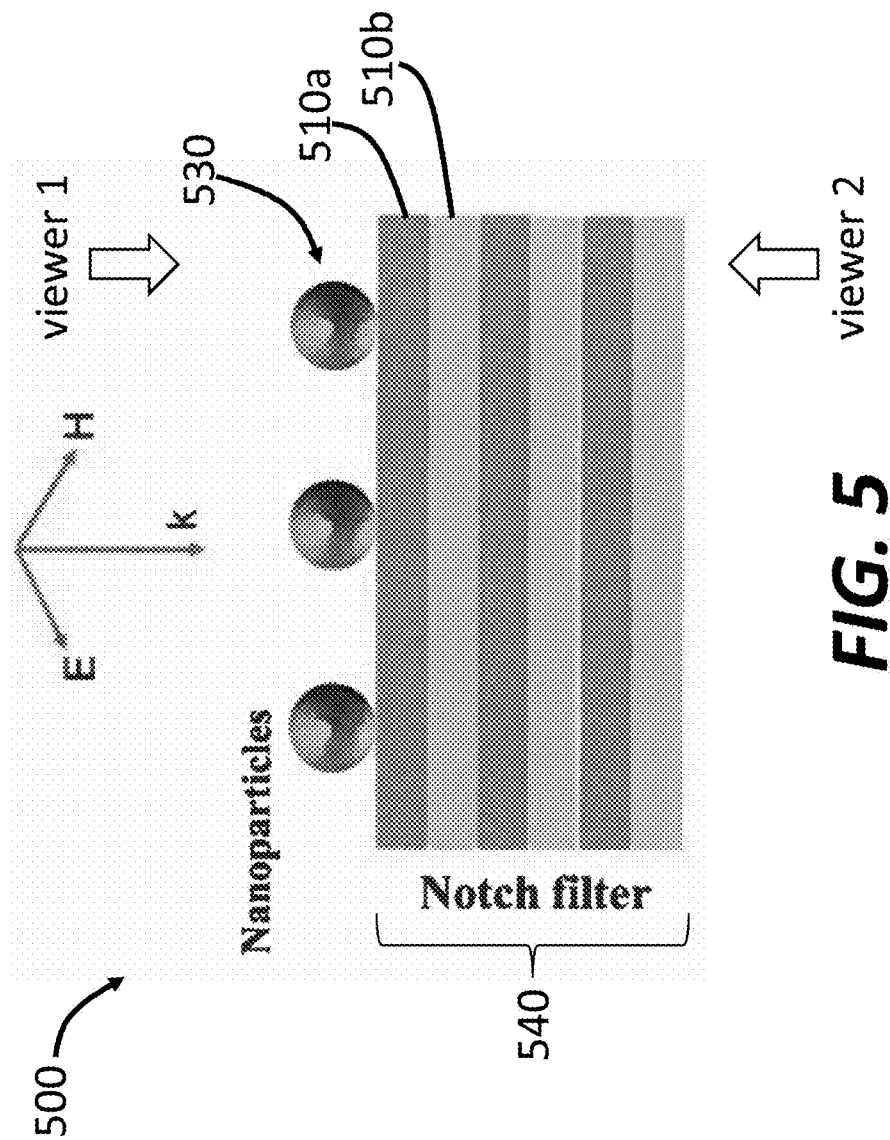
FIG. 5 shows a schematic of a transparent display including nanoparticles disposed on a notch filter.

FIG. 5 shows a schematic of a transparent display 500 including nanoparticles 530 disposed on a notch filter 540. The notch filter 540 includes alternating first layers 510a having a first refractive index and second layers 510b having a second refractive index. The peak(s) in the scattering spectrum of the nanoparticles 530 are aligned with the peak(s) in the reflectance spectrum of the notch filter 540. For example, the nanoparticles 530 can be configured to scatter light at wavelength $\lambda_1$, in which case the notch filter 540 can be configured to reflect light at wavelength $\lambda_1$ while transmitting light at other wavelengths. In another example, the nanoparticles can be configured to scatter light at wavelengths $\lambda_1$ and $\lambda_2$. Accordingly, the notch filter 540 can be configured to reflect light at wavelengths $\lambda_1$ and $\lambda_2$. In this case, the notch filter 540 can include two separate notch filters: one has a reflectance peak at $\lambda_1$ and the other has a reflectance peak at $\lambda_2$. Alternatively, the single notch filter 540 can be configured to have two reflectance peaks at $\lambda_1$ and $\lambda_2$, respectively.

The transparent display 500 has several advantages. First, the scattering cross section of the nanoparticles 530 at their resonant wavelength (e.g., $\lambda_1$) can be increased. Light at $\lambda_1$ that is not scattered by the nanoparticles 530 are reflected by the notch filter 540 back toward the nanoparticles 530, thereby inducing another scattering.

Second, the transparent display 500 can provide privacy protection to viewers. For example, viewer 1 as shown in FIG. 5 views the transparent display 500 from the side where the nanoparticles 530 are disposed. This viewer can see images via light scattered by the nanoparticles 530. However, another viewer (viewer 2), who views the transparent display 500 on the opposite side, may only see a transparent screen, because light scattered by the nanoparticles 530 does not transmit through the notch filter 540. In this case, the transparent display 500 can be configured as part of a spectacle lens or display, where the nanoparticles 530 are disposed to scatter light towards the wearer. People other than the wearer may see only the spectacle via the surface without the nanoparticles. Accordingly, the displayed content on the spectacle is protected from being seen by others.

The notch filter 540 shown in FIG. 5 has a multilayer structure for illustrative purposes. In practice, other types of notch filters, such as photonic crystal notch filters, can also be used.

Figure 6A:
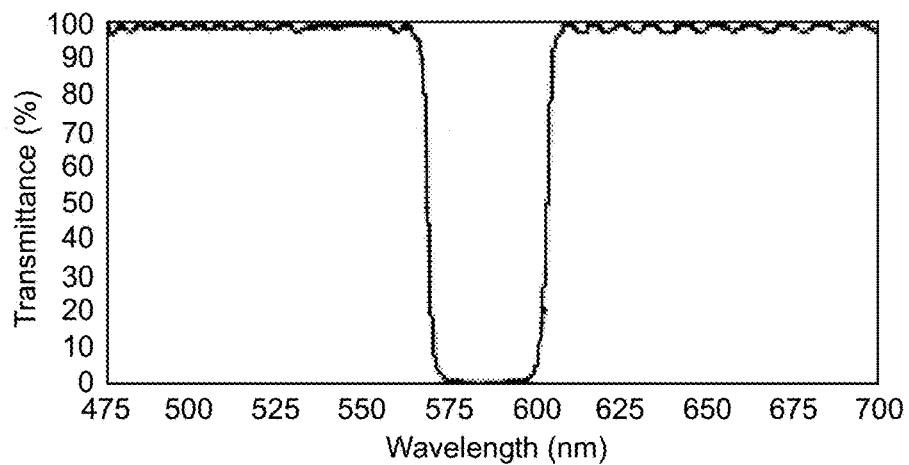
FIGS. 6A-6C show several examples of transmittance spectra of optical notch filters that can be used in the transparent display shown in FIG. 5.
Figure 6B:
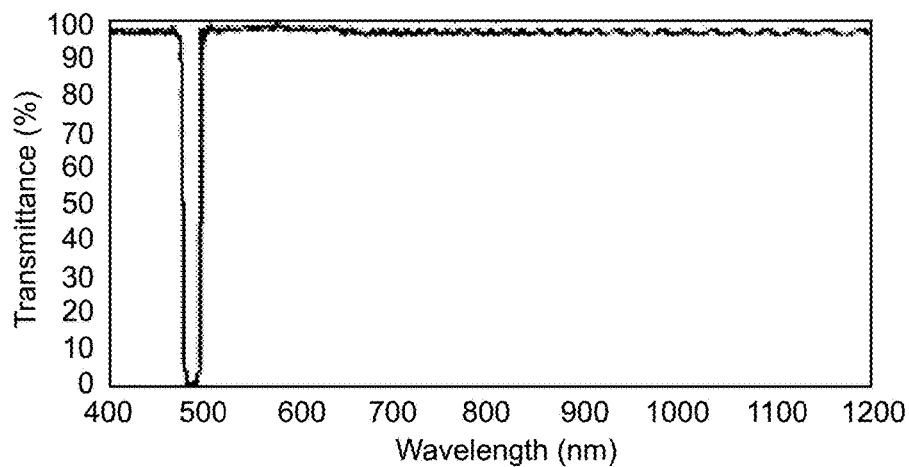
Figure 6C:
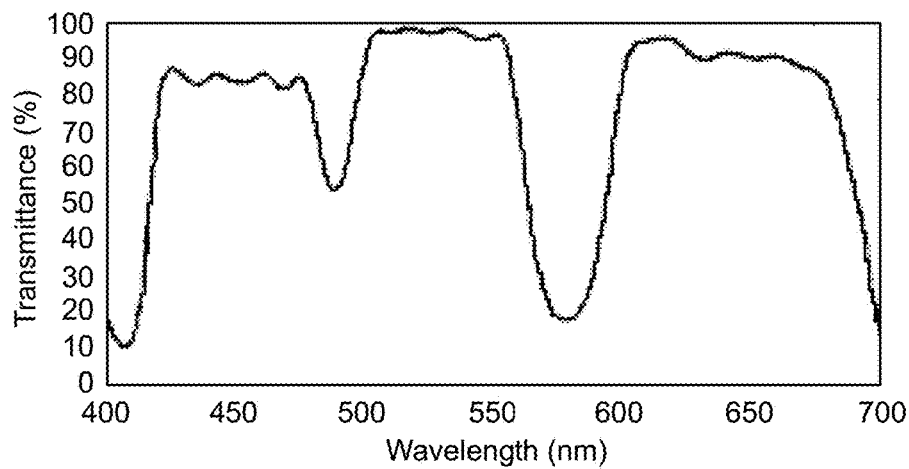

FIGS. 6A-6C show several examples of transmittance spectra of optical notch filters that can be used in the transparent display 500 shown in FIG. 5. FIG. 6A shows a transmittance spectrum of an optical notch filter reflecting light at about 575 nm to about 600 nm. The transmittance spectrum in FIG. 6B shows a transmittance valley (i.e., a reflectance peak) at about 500 nm. FIG. 6C shows a transmittance spectrum having three valleys at about 410 nm, about 490 nm, and about 550 nm. This notch filter can be used to form a full-color display, where nanoparticles having three resonant wavelengths can be used.

The full-width-at-half-maximum (FWHM) of the transmittance valleys can also be substantially identical to the FWHM of reflectance peaks in the scattering spectrum of the nanoparticles. For example, the FWHM of the transmittance valley can be less than 50 nm (e.g., less than 50 nm, less than 45 nm, less than 40 nm, less than 35 nm, less than 30 nm, less than 25 nm, less than 20 nm, less than 15 nm, or less than 10 nm, including any values and sub ranges in between).

Figure 7:
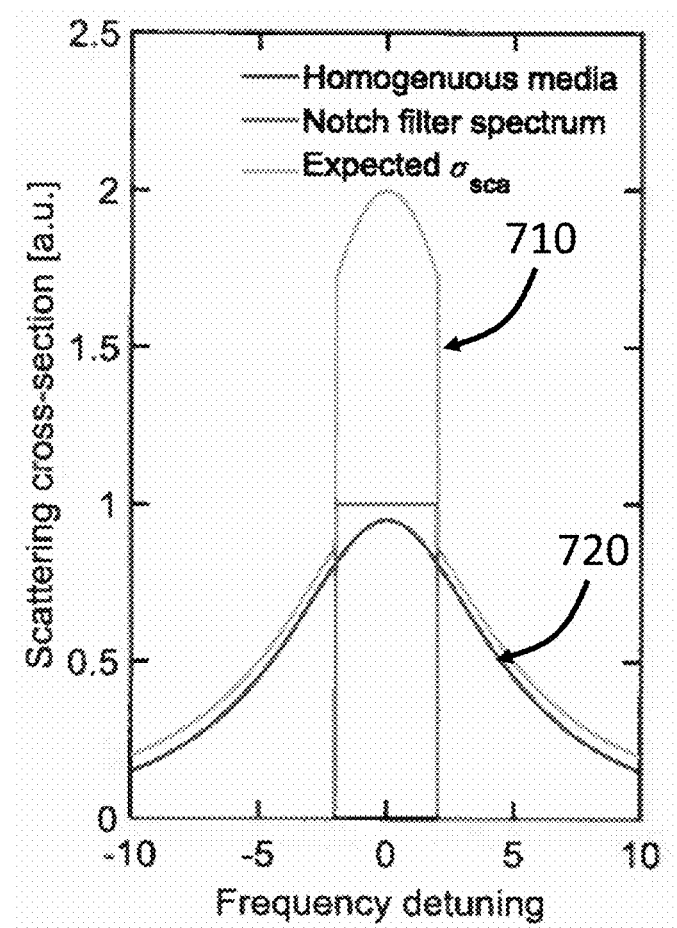
FIG. 7 shows a scattering cross section of a transparent display including nanoparticles disposed on a notch filter.

FIG. 7 shows a scattering cross section of a transparent display having a structure substantially similar to that shown in FIG. 5. Light is at normal incidence onto the nanoparticles. The nanoparticles can have a localized surface plasmon resonance at wavelength A, which is exactly the center wavelength of the reflection window of the notch filter. Light from the far field incident onto the nanoparticles is scattered by the nanoparticles for the first time and then reflected by the notch filter where the light is scattered by the nanoparticles for a second time. As a result, the effective scattering cross-section of the nanoparticle can be at least doubled, as seen from comparing the scattering cross section 720 from nanoparticles only with the scattering cross section 710 from the combination of the nanoparticles and the notch filter.

In addition to the improved scattering efficiency, the transparent display 500 can also have an enhanced quality factor. This is because usually the notch filter can have high quality optical surfaces. Therefore, the quality factor of localized surface plasmon resonances on the notch filter is higher than that of the nanoparticles, thereby increasing the overall quality factor of the system. This enhancement of quality factor can also be observed from the width of the cross section peak in FIG. 7.

To further improve the scattering efficiency, the surface of the notch filter (e.g., the first layer 510a in FIG. 5) can be roughened. The surface roughness of the layer 510a can be about 50 nm to about 1 mm (e.g., about 50 nm, about 100 nm, about 200 nm, about 500 nm, about 1 µm, about 2 µm, about 5 µm, about 10 µm, about 20 µm, about 50 µm, about 100 µm, about 200 µm, about 500 µm, or about 1 mm, including any values and sub ranges in between).

In some cases, a transparent display can be formed using a notch filter without nanoparticles. In this case, the surface of the notch filter can be roughened to increase scattering efficiency. In addition, notch filters having different reflectance wavelengths (e.g., red, green, and blue) can be stacked together to form a full-color transparent display. Alternatively, a single notch filter having more than one reflectance wavelength (e.g., the notch filter shown in FIG. 6B) can be used.

Transparent Displays Including Thin Metallic Films

Plasmonics can allow deep-subwavelength concentration of light and has become important for fundamental studies as well as real world applications. Two major existing platforms of plasmonics are metallic nanoparticles and metallic films. Metallic nanoparticles allow efficient coupling to far field radiation, but it is challenging for current synthesis techniques to fabricate nanoparticles having a perfect optical surface. In comparison, metallic films can offer substantially higher quality materials, but their coupling to radiation is typically limited due to the large momentum mismatch with free space.

To overcome the drawings backs in each platform, the combination of an optically thin metallic film and nanoparticles can be used for high-radiative-efficiency plasmonics. For far-field scattering, adding a thin high-quality metallic substrate enables a higher quality factor while maintaining the localization and tunability that the nanoparticle provides. For nearfield spontaneous emission, a thin metallic substrate, which can have a high quality surface, can improve the field overlap between the emitter environment and propagating surface plasmons, thereby generating high- Purcell enhancement (total enhancement >10⁴) and high-quantum-yield (>50%) spontaneous emission, even as the gap size vanishes (3-5 nm). The enhancement can be almost spatially independent and does not suffer from quenching effects that commonly exist in previous structures.

Ohmic loss in metals can be a major restriction for plasmonics. The restriction can be characterized by the radiative efficiency η, defined as the ratio between the radiative decay rate and the total decay rate, i.e., $\eta = \gamma_{rad}/\gamma_{tot}$. Two major existing platforms of plasmonics are metallic nanoparticles and metallic films, each of which has respective restrictions for achieving a high η. A major problem regarding nanoparticles is their poor material qualities due to the amorphous structures that arise from the colloidal synthesis processes. In comparison, single- or polycrystalline metallic films fabricated via temperature-controlled sputtering or epitaxial growth can achieve much higher material qualities and much lower material losses, but their coupling to radiation is typically jeopardized due to the large momentum mismatch with free space. When the two platforms are combined, the radiation of nanoparticles may be at risk of being quenched by a nearby bulk metallic film. These restrictions lead to compromises between η and other mode properties, such as quality factor (Q) and mode volume (V).

For plasmonic light scattering, it is often desirable to achieve high radiative efficiencies and high Q simultaneously. In biomedical sensing, for example, a high Q is helpful for high spectral resolution, whereas a high radiative efficiency (i.e., stronger scattering) can lead to a high signal-to-noise ratio (SNR). In another example, transparent displays based on resonant scattering can benefit from high Q to achieve high transparency and benefit from high radiative efficiencies to achieve high brightness.

Without being bound by any particular theory, it can be very challenging to achieve both goals at the same time for two reasons. First, Q, $\sigma_{ext}$, and $\sigma_{sca}$ are all bounded from above as functions of the permittivities of materials, primarily due to the intrinsic material loss. Second, there exists a physical contradiction between the two desired properties: higher radiative efficiencies is associated with higher radiative decay rates, which can reduce the total quality factors.

For plasmon-enhanced emission, another trade-off exists between achieving high quantum yield (QY) and large Purcell factors, even though both are typically desired. High spontaneous emission enhancement over a broad band using plasmonics can be achieved via small Vs. However, as V decreases, absorptive decay rates (proportional to V) can dominate over radiative decay rates (proportional to $V^2$), triggering a drastic drop in QY.

One way to enhance spontaneous emission uses gap plasmons created via the confinement of light within the dielectric gap between nanoparticles and an optically thick metallic substrate. Compared with other types of resonances, the gap plasmon resonance achieves high total enhancement as it offers more reliable control of the dielectric gap thinness. However, these gap plasmon resonances may not circumvent the trade-off between QY and V. For example, when the gap size is reduced to 5 nm or smaller for a nanocube, despite a higher total decay rate, the efficiency (defined as the sum of photon and plasmon radiative efficiency) drops below 20%. Moreover, the efficiency can be strongly dependent on the location of emitters. QY reaches maximum if the emitter is placed at the center of the gap but decreases immensely when the emitter is in the proximity of the metal.

An optically thin metallic film can be a suitable platform for high radiative-efficiency plasmonics, demonstrated by two examples: high-Q scattering and enhanced emission. For scattering, a high-quality thin metallic film facilitates a high-Q, high radiative-efficiency Mie plasmon resonance, whose Q can exceed the quasistatic Q of the nanoparticle material. For enhanced emission, gap plasmons can still be well supported and are better mode-overlapped with external radiation using an optically thin metallic substrate. A high-Purcell (total enhancement >10⁴), spatially independent-efficiency (>50%) spontaneous emission enhancement can be achieved with vanishing gap size (3-5 nm), even if the substrate has the same material properties as the nanoparticles. This platform can also be extended to other applications (for example, nonlinear frequency generation and multiplexing) because of the enhanced efficiencies of high order plasmonic modes. Moreover, the ratio between photon and plasmon radiation can be easily tailored by altering the shape of the nanoparticles, making this platform versatile for both fluorescence and plasmon circuits.

In plasmonic optical scattering, the quasistatic Q of a deep subwavelength nanoparticles can be exceeded with an optically thin high-quality metal film while maintaining considerably high radiative efficiencies η (also known as the scattering quantum yield or the albedo). For a subwavelength scattering process, based on temporal coupled-mode theory, the radiative efficiency η and the total quality factor $Q_{tot}$ for a single resonance are given by $$\eta \equiv \frac{\gamma_{rad}}{\gamma_{tot}} = \frac{\sigma_{sca}}{\sigma_{ext}}\bigg|_{on\ resonance} \quad (1)$$

$$Q_{tot} = \frac{\omega_0}{2\gamma_{tot}} \quad (2)$$

where $\omega_0$ is the resonant frequency, $\gamma_{tot}=\gamma_{rad}+\gamma_{abs}$ is the total decay rate, and $\sigma_{ext}=\sigma_{sca}+\sigma_{abs}$ is the extinction cross-section. As $\gamma_{abs}$ is mostly dictated by material absorption, a high η can be achieved by increasing $\gamma_{rad}$. This may compromise the quality factor as seen in Equation (2), which reveals the trade-off between η and $Q_{tot}$.

Because simultaneously achieving a high Q and a high η can be desirable for many applications, such as in biomedical sensing and transparent displays, a figure of merit (FOM) can be defined for scattering as:

$$FOM_{sca} = \frac{Q_{tot}}{1-\eta} \quad (3)$$

It follows that this FOM reduces to the quasistatic quality factor $Q_{qs}$:

$$FOM_{sca} = \frac{\omega_0}{2\gamma_{abs}} = Q_{abs} \cong Q_{qs} = \frac{\omega \frac{d\epsilon'}{d\omega}}{2\epsilon''} \quad (4)$$

which only depends on the material property of the nanoparticle. Here, ε' and ε'' are real and imaginary parts of the complex permittivity, respectively. For subwavelength metallic nanoparticles (i.e., dimension <<λ), the plasmon properties are typically dominated by quasistatic considerations, and thus, the approximation $Q_{abs} \cong Q_{qs}$ holds, which also indicates that the material loss inside the metallic nanoparticle may not be further reduced. Therefore, the strategy is to squeeze parts of the resonant mode into a high-quality metallic film with much lower loss while maintaining efficient radiation rates.

Figure 8:
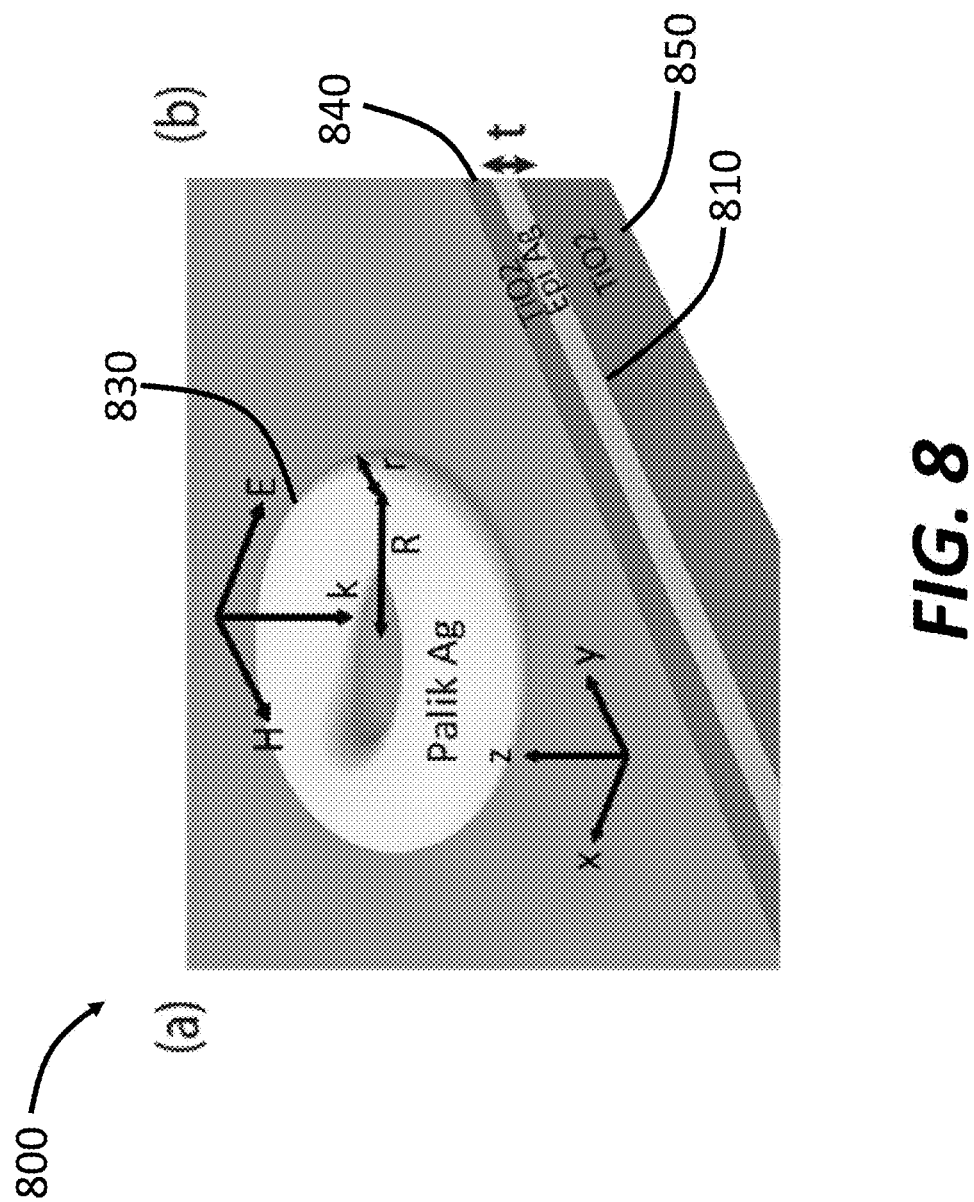
FIG. 8 shows a schematic of a platform including a nanoparticle disposed above a thin metal film that can be used for transparent displays.

FIG. 8 shows a schematic of a platform 800 including a torus nanoparticle 830 (e.g., gold or silver) disposed on a thin metal film 810 (e.g., epitaxy silver) for high-efficiency plasmonics. The thin metal film 810 is disposed between two dielectric layers 840 and 850 (e.g., $TiO_2$ layers). The dielectric layer 840 also functions as a spacer layer between the thin metal film 810 and the nanoparticle 830.

The torus nanoparticle 830 has a major radius R and a minor radius r. The major radius R can be about 10 nm to about 70 nm (e.g., about 10 nm, about 20 nm, about 30 nm, about 40 nm, about 50 nm, about 60 nm, or about 70 nm, including any values and sub ranges in between). The minor radius r can be about 5 nm to about 35 nm (e.g., about 5 nm, about 10 nm, about 15 nm, about 20 nm, about 25 nm, about 30 nm, or about 35 nm, including any values and sub ranges in between).

The thickness of the metal film 810 can be substantially equal to or less than 50 nm (e.g., less than 50 nm, less than 45 nm, less than 40 nm, less than 35 nm, less than 30 nm, less than 25 nm, less than 20 nm, less than 15 nm, less than 10 nm, or less than 5 nm, including any values and sub ranges in between).

In one example, the thickness of the spacer layer 840 can be substantially equal to or less than 30 nm (e.g., less than 30 nm, less than 25 nm, less than 20 nm, less than 15 nm, less than 10 nm, less than 5 nm, or less than 2 nm, including any values and sub ranges in between). This thickness can be used to facilitate near-field coupling between the nanoparticle 530 and the thin metal film 810. In another example, the thickness of the spacer layer 840 can be greater than 1 μm, in which case standing wave effects can be used to couple modes between the nanoparticle 830 and the thin metal film 810. Since the incident waves can be reflected by the metal film 810, the incident wave and the reflected wave can interfere with each other. At certain positions, these two waves can be in-phase and the amplitude of light adds up on that position. At some other positions, these two waves can be out-of-phase and the amplitudes of light cancel out at those positions.

Other than a torus structures, several other shapes can also be used for the nanoparticle 830. In one example, the nanoparticle 830 can include a hollow cylinder structure. The major radius if the hollow cylinder can be about 30 nm to about 50 nm (e.g., about 30 nm, about 35 nm, about 40 nm, about 45 nm, or about 50 nm, including any values and sub ranges in between). The minor radius of the hollow cylinder can be about 10 nm to about 30 nm (e.g., about 10 nm, about 15 nm, about 20 nm, about 25 nm, or about 30 nm, including any values and sub ranges in between). The height of the hollow cylinder can be about 20 nm to about 60 nm (e.g., about 20 nm, about 30 nm, about 40 nm, about 50 nm, or about 60 nm, including any values and sub ranges in between).

In another example, the nanoparticle 830 can include a nano-disk. In yet another example, the nanoparticle 830 can include a nano-rod. In yet another example, the nanoparticle 830 can include a hollow-core nano-disk. These nano structures can have dimensions similar to the dimensions of the torus structure.

In the platform 800, the metal film 810 has substantially lower loss compared to the nanoparticle 830 because the metal film 810 can be fabricated epitaxially. The refractive index of the amorphous $TiO_2$ in the dielectric layers 840 and 850 is about 2.5 in the visible and near-infrared spectra. The material absorption in $TiO_2$ can be negligible compared with the absorption in silver, as $Im(\varepsilon_{TiO2})$ is several orders of magnitude lower than that of $Im(\varepsilon_{Ag})$ within the wavelength range of interest, where $Im(\varepsilon_{TiO2})$ and $Im(\varepsilon_{Ag})$ are the imaginary parts of the permittivity of $TiO_2$ and silver, respectively. Thus, the absorption in $TiO_2$ can be neglected in calculating the plasmonic efficiency. The ambient index of refraction can be about 1.38 (near the refractive index of water, tissue fluids, and various polymers). The structure is probed with normally incident plane waves, in which case only the m=1 (m is the azimuthal index of the modes because the structure is axially symmetric) modes of the structure can be excited.

FIGS. 9A and 9B show the distribution of electric field along the z direction (i.e., Ez profile) of two eigenmodes when t=3.4 nm in the x-z (left) and x-y (right) planes. The resonance shown in FIG. 9A (referred to as resonance A) is a gap plasmon resonance, whose field is mostly confined in the upper $TiO_2$ layer. The resonance illustrated in FIG. 9B (referred to as resonance B) is a torus (Mie) plasmon resonance, which maintains a nodal line (dashed line in FIG. 9B) along z=r (r is the minor radius of the torus), This nodal line is typically a feature of the torus resonance in free space.

Figures 10A, 10B:
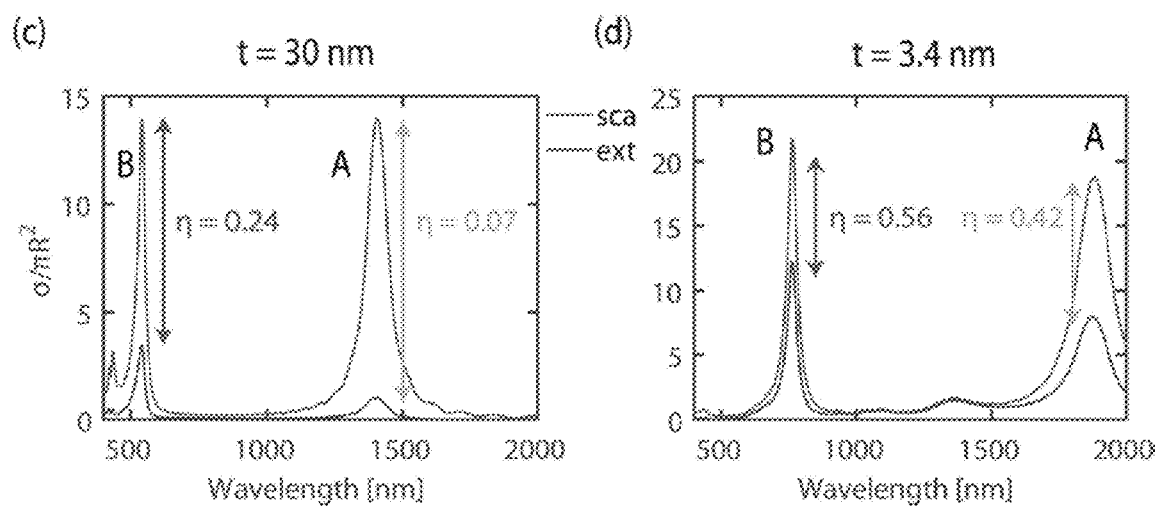
FIGS. 10A and 10B show calculated scattering cross sections ($\sigma_{sca}$) and extinction cross sections ($\sigma_{ext}$) of platforms including a torus nanoparticle disposed on above a metal film having a thickness of about 3.4 nm and 30 nm, respectively.

FIGS. 10A and 10B show calculated scattering cross sections ($\sigma_{sca}$) and extinction cross sections ($\sigma_{ext}$) of platforms including a torus nanoparticle disposed on above a metal film having a thickness of about 3.4 nm and 30 nm, respectively. In general, the radiative efficiency η increases significantly when metal thickness is reduced. For both resonances, the radiative efficiency in the thin-film case (FIG. 10A) is much higher than that in the thick-film case (FIG. 10B).

FIGS. 11A-11C illustrate scattering of a silver torus having different distances from a metal film. FIG. 11A shows a side view of a platform 1100 including a silver torus 1130 disposed above a metal film 1130 sandwiched between two $TiO_2$ layers 1140 and 1150. The first $TiO_2$ layer has a thickness of about 5 nm and the second $TiO_2$ layer has a thickness of about 20 nm. The distance between the silver torus 1130 and the first $TiO_2$ layer 1140 is adjusted to study the effect of torus-film distance on the scattering of the silver torus 1130.

FIGS. 11B and 11C show calculated scattering cross sections ($\sigma_{sca}$) of the platform 1100 as a function of the torus-film distance with a 3.4 nm thick metal film and a 30 nm thick metal film, respectively. A and B in FIGS. 11B and C denote the gap and torus plasmon resonances of the composite structure, respectively. F denotes the Mie resonance of the torus in free space.

When the torus is far away from the film, the near field interaction between the two is weak. As shown from the right sides in FIGS. 11B and 11C, both the thin-film and thick-film case demonstrate the Mie plasmon resonance as in free space, denoted by F. When the torus approaches the metallic multifilm, however, the evolution of $\sigma_{sca}$ becomes very different. For the thin-film case, F converges to B with a stable resonant wavelength and narrowed linewidth. For the thick-film case, F converges to A with a red-shifting resonant wavelength and decreasing $\sigma_{sca}$.

Figure 12A:
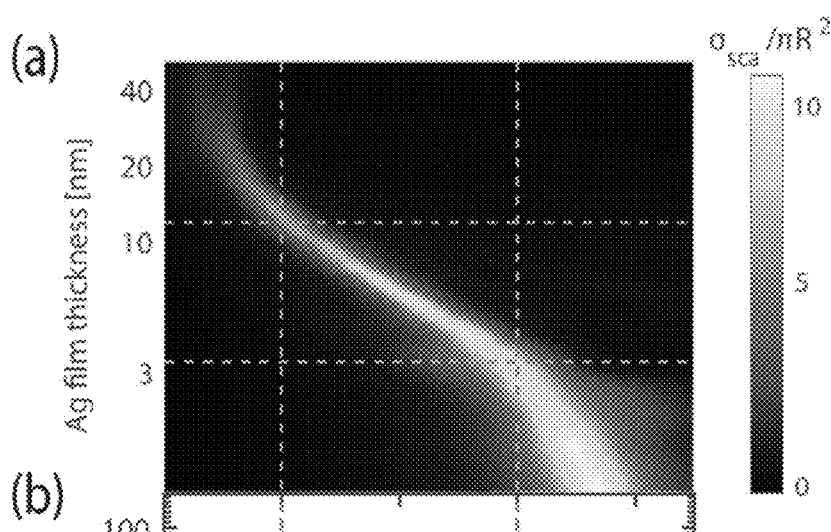
FIG. 12A shows the calculated scattering cross section $\sigma_{sca}$ of a torus plasmon resonance as a function of the thickness of the silver film in the platform shown in FIG. 8.

FIG. 12A shows calculated scattering cross section $\sigma_{sca}$ of torus plasmon resonance as a function of the thickness of the silver film in the platform shown in FIG. 8. In general, the cross section decreases as the silver film thickness t increases.

Figure 12B:
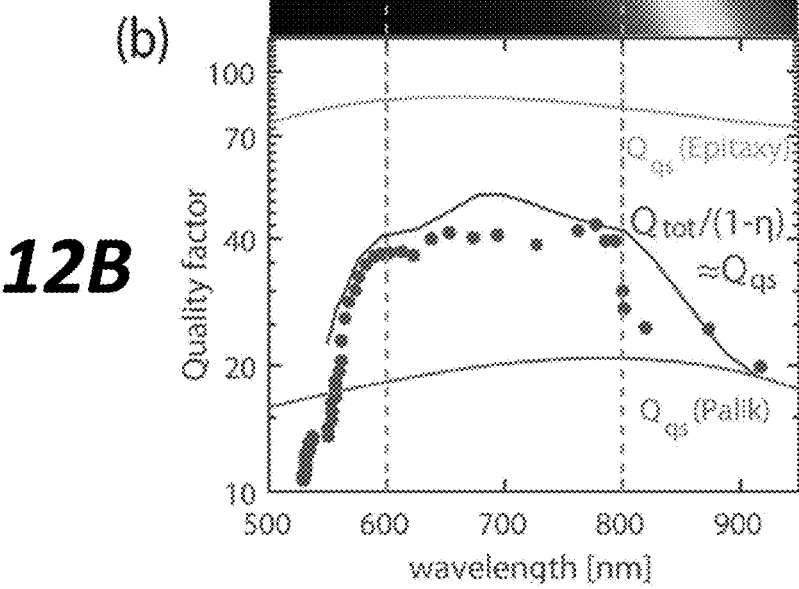
FIG. 12B shows calculated quality factors as a function of wavelength of the platform shown in FIG. 8.

FIG. 12B shows the calculated quality factor as a function of wavelength of the platform shown in FIG. 8. $FOM_{sca}=Q_{tot}/(1-\eta)\simeq Q_{qs}$ shows that the platform shown in FIG. 8 can exceed the quasistatic limits for the Palik silver used in the nanoparticle. When the silver film is optically thin (e.g., t=3-10 nm), a plateau of $FOM_{sca}$ at about 40 exceeding the quasistatic limit of the Palik silver is achieved for resonant wavelengths at 600-800 nm, as denoted by the dashed lines. The dots in FIG. 12B are calculated via Equation (3) from the time-domain scattering simulation. The $Q_{tot}$ curve is calculated via Equation (7) (see below) from the frequency-domain eigenmode simulation.

FIGS. 12C and 12D illustrate angular dependence of the scattering cross section of the torus plasmon resonance with a 3.4 nm thick metal film under the excitation of TE and TM polarizations.

Figure 13A:
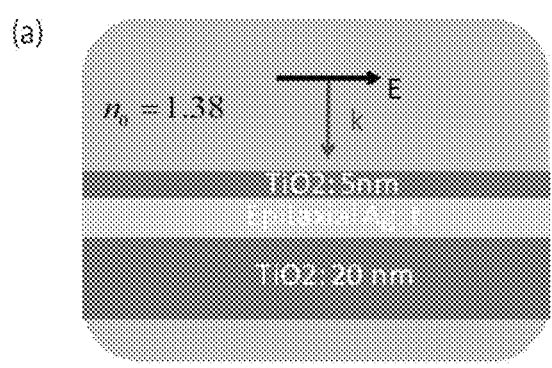
FIGS. 13A and 13B illustrate transmission at normal incidence as a function of silver film thickness in the platform shown in FIG. 8.
Figure 13B:
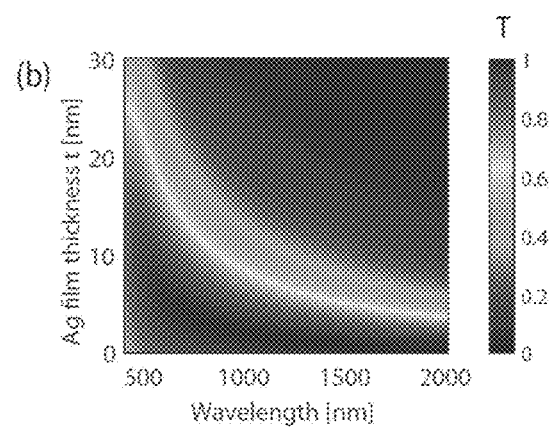

FIGS. 13A and 13B illustrate transmission at normal incidence as a function of silver film thickness. FIG. 13A shows a side view of the platform that is substantially identical to the platform shown in FIG. 11A and FIG. 8. FIG. 13B shows the calculated transmission spectrum. Broadband high transmission is shown when the thickness of silver film is less than 10 nm.

By changing the thickness t of the silver from 0 nm to about 50 nm while keeping other parameters unchanged (t=0 nm corresponds to a single 25 nm $TiO_2$ layer), the torus plasmon resonance B can be tracked and the corresponding $FOM_{sca}$ can be estimated, as shown in FIGS. 12A-12D. As t increases, the resonance blue-shifts, along with a reduced line width (see FIG. 12A).

In FIG. 12B, the $FOM_{sca}$ in the platform is compared with the quasistatic limit $Q_{qs}$ for different materials in the platform. These materials include the Palik silver that is used for the torus and the epitaxial silver that is used for the substrate ($FOM_{sca}$ and $Q_{qs}$ are directly comparable; see Equations (3) and (4)). There exists a plateau of higher $FOM_{sca}$ at t=3-10 nm. At these thicknesses, the multifilm structure (i.e., including the metal film and the dielectric layers surrounding the metal film) still has very high transmission >80% (see FIGS. 13A and 13B). The $FOM_{sca}$ of the torus plasmon resonance exceeds and becomes twice as high as the $Q_{qs}$ of the torus material (Palik silver). When the silver layer is either very thin (e.g., less than 3 nm) or very thick (e.g., greater than 20 nm), the $FOM_{sca}$ drops considerably and $FOM_{sca} \lesssim Q_{qs}(Palik)$, the quasistatic quality factor of the torus material. FIGS. 12C and 12D show that the high $FOM_{sca}$ can be maintained for both polarizations over a wide range of incident angles.

Figures 14A, 14B:
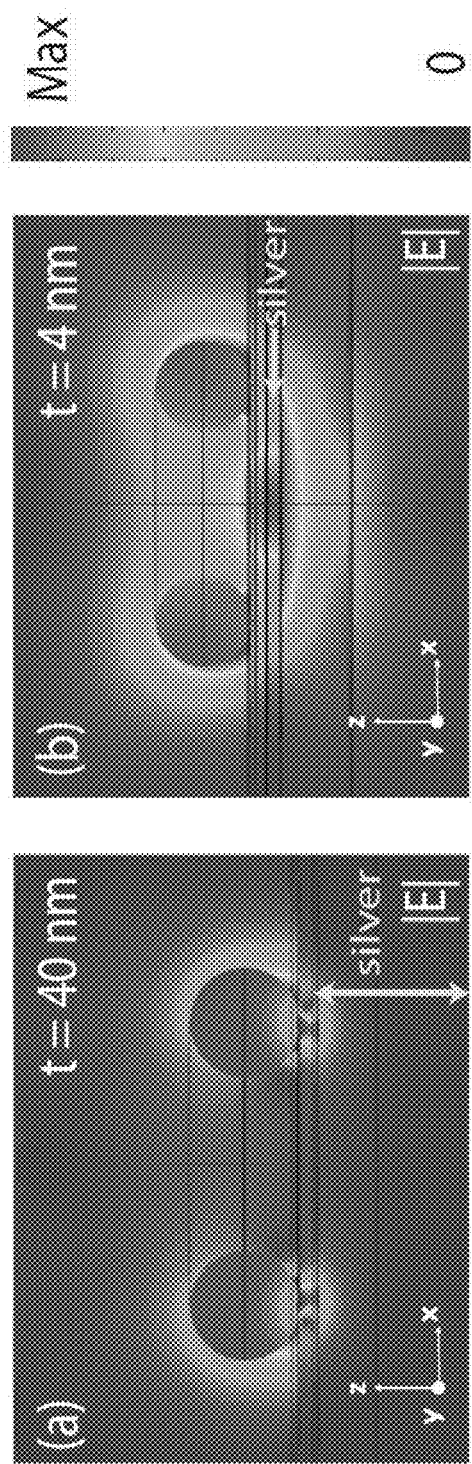
FIGS. 14A and 14B illustrate the coupling of optical modes into the silver film in the platform shown in FIG. 8.

FIGS. 14A and 14B illustrate the coupling of optical modes into the silver film in the platform shown in FIG. 8. A better mode squeezing into the silver film (thickness denoted by t) is realized when the silver film is optically thin (e.g., less than 10 nm). This can be seen by comparing the |E| field of the film coupled Mie resonance when t=40 nm (FIG. 14A) and t=4 nm (FIG. 14B). The arrow indicates the silver film thickness in the multilayer.

The effective mode squeezing shown in FIG. 14A can increase the quality factor of the platform. The mode squeezing mechanism can be quantitatively demonstrated by calculating the energy density integral of the eigenmode. The energy density u in lossy media is generally defined as: $u = \varepsilon_0(\varepsilon' + (2\omega\varepsilon''/\gamma))|E|^2/2$, where $\varepsilon'$ and $\varepsilon''$ are real and imaginary parts of permittivity respectively, and $\gamma$ is the damping of the metal. In this analysis, $\gamma = 1.4 \times 10^{14}$ rad/s for the Palik silver and $\gamma = 3.14 \times 10^{13}$ rad/s for the epitaxial silver are adopted.

Because the metallic objects (e.g., Palik silver torus and epitaxial silver film) usually dominate the absorption loss in this system, the energy concentration coefficients in the torus and the film can be defined as:

$$c_{torus} = \frac{\int_{torus} u dV}{\int_{torus} u dV + \int_{film} u dV} \quad (5)$$

$$c_{film} = \frac{\int_{film} u dV}{\int_{torus} u dV + \int_{film} u dV} \quad (6)$$

Thus, the $Q_{qs}$ of the system can be estimated as:

$$\frac{1}{Q_{qs}} = \frac{c_{torus}}{Q_{qs}(Palik)} + \frac{c_{film}}{Q_{qs}(Epitaxy)} \quad (7)$$

As shown in FIG. 12B, the $Q_{qs}$ of the system, calculated from the scattering (blue dots) and eigenmode (blue curve) simulations respectively, match each other well.

Figure 15:
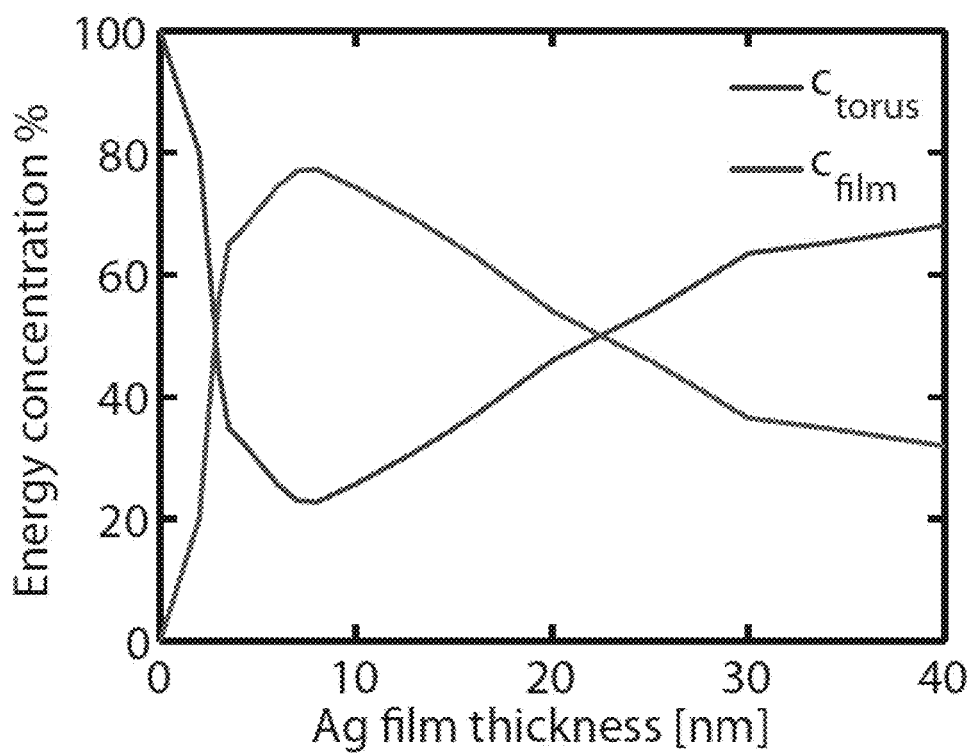
FIG. 15 shows calculated energy concentration coefficients as a function of silver film thickness in the platform shown in FIG. 8.

FIG. 15 shows calculated energy concentration coefficients as a function of silver film thickness. The calculation shows the high energy concentration in the film occurs when the film is optically thin. Near the maximum of the $Q_{qs}$ (wavelength at about 700 nm, silver film thickness at about 7 nm), the energy concentrated in the film is three times higher than that in the torus ($c_{film} \sim 3c_{torus}$). It is also noted that the $Q_{qs}$ curves of the two materials are quite flat within the wavelength region of interest. Thus, it is the effective mode squeezing into a high-quality film, rather than the dispersion of an individual material, that contributes to the improved quality factor of the system.

The aforementioned enhanced Q is different from the linewidth narrowing that is based on the interference between multiple resonances. For coupled resonances, as the trace of the full Hamiltonian is conserved, the line width reduction of one resonance necessarily implies the broadening of the others. This coupling also typically renders the spectrum Fano-like with dark states in the middle of the spectrum.

In contrast, here the line width reduction is realized via effectively squeezing a single Mie plasmon mode into an optically thin metallic film. The scattering spectrum maintains the single-Lorentzian shape, which is favorable for many applications, as it maintains a high resolution and SNR. Moreover, as the resonance for scattering uses the Mie plasmon and the ambient environment is the perturbed free space, most of the reradiated energy goes into the far field with weak plasmon excitation. In addition, optically thin metallic films are not restricted to high-Q applications shown above. Applications based on broadband strong scattering (like solar cells requiring longer optical path) can also be implemented on this platform, utilizing its high radiative efficiency.

Antennas work equally well as receivers and as transmitters; in the context of nanoparticles, the radiative efficiency $\eta$ can be equally important, whether nanoparticles are used to scatter light from the far field or serve as external cavities to enhance spontaneous emission in the near field. The quantum yield (QY) of an emitter (whose total decay rate is $\Gamma_0$ in free space) enhanced by a plasmonic nanoparticle can be approximated as $QY \simeq \eta \Gamma_g / \Gamma_{tot}$ under the assumption that the decay rate is dominated by the plasmonic resonance (note that $\Gamma$ and $\gamma$ are used to denote the emission and scattering processes, respectively).

Here, $\gamma_{tot} = \Gamma_g + \Gamma_0' + \Gamma_{nr}^{em} + \Gamma_q$, $\Gamma_0'$ is the radiative decay rate of the emitter not coupled to the cavity, $\Gamma_g \simeq \Gamma_{rad} + \Gamma_{abs}$ is the modified emission rate in the presence of the cavity, $\Gamma_{rad}$ and $\Gamma_{abs}$ are radiative and absorptive decay rates of the cavity, respectively, $\Gamma_{nr}^{em}$ is the intrinsic nonradiative decay rate of the emitter, and $\Gamma_q$ is the quenching rate that refers to the loss induced by the direct heating of the metal from the emitter without coupling to optical resonances. In most cases, $\Gamma_g$ is dominant over all other components of $\Gamma_{tot}$ and $\Gamma_{rad}$ is much larger than $\Gamma_0'$. Therefore, QY can be approximated as the radiative efficiency of the nanoparticle, i.e. QY≃η. For enhanced emission, it is often desired to simultaneously achieve high quantum yield and high decay rates, so the FOM for enhanced emission can be defined as below:

$$FOM_{emit} = \eta \cdot F_p \propto \frac{\eta}{V} \quad (8)$$

where $F_p = \Gamma_{tot}/\Gamma_0$ is the Purcell factor and V is the mode volume. Note that Q does not show explicitly in Equation (8) because the broadband plasmonic enhancement relies on V much more than on Q. It follows that FOMemit reduces to the radiative enhancement $\Gamma_{rad}/\Gamma_0$.

Gap plasmons show their advantage in spontaneous emission enhancement for the corresponding more reliable control of the dielectric gap thinness. An optically thick metallic substrate is commonly used to obtain the highly confined metal-insulator-metal (MIM) SPP within the dielectric gap. However, the thick film can also induce large mode absorption, when the dielectric gap vanishes. Moreover, the QY of an emitter inside the gap is especially sensitive to its vertical position. The maximum QY is usually achieved when the emitter is placed at the center of the gap but can become extremely low if the emitter is placed near metal.

To begin with, it is helpful to show that optically thin metallic substrates can facilitate high-Purcell and high radiative-efficiency plasmonics via a mode-overlap analysis. Film-coupled nanoparticles can be understood as Fabry-Perot cavities of gap plasmons, with two radiative channels: one into propagating surface plasmon polaritons (SPPs), and another into photons via adiabatic tapering effect using nanoparticle edges.

Figure 16A:
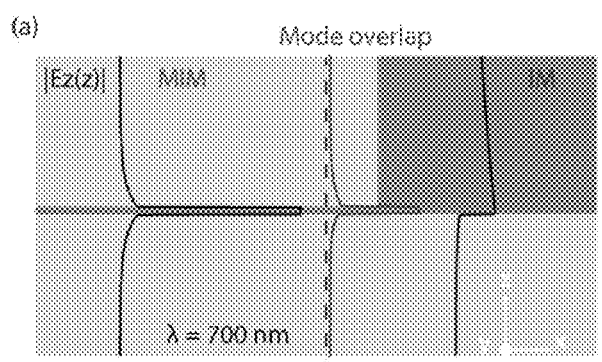
FIGS. 16A-16D show mode-overlap analysis illustrating the advantage of using optically thin substrates for gap plasmon emission enhancement.
Figure 16B:
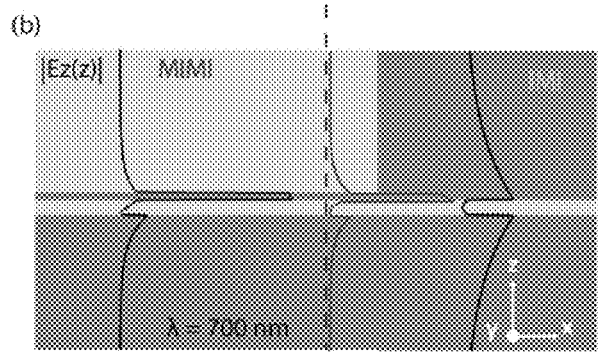
Figure 16C:
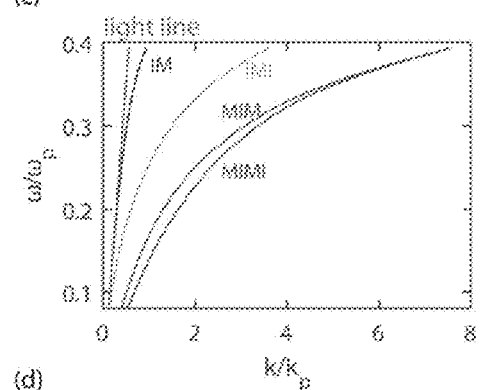
Figure 16D:
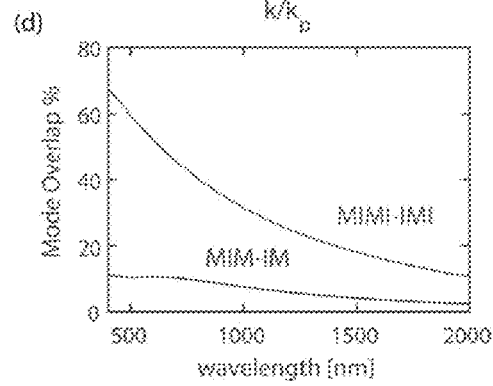

FIGS. 16A-16D shows mode-overlap analysis illustrating the advantage of using optically thin substrates for gap plasmon emission enhancement. FIG. 16A shows the conventionally used metal-insulator-metal (MIM) SPP for emission enhancement, where 12% overlap can be achieved at the metal-insulator-metal and insulator-metal (MIM-IM) interface. FIG. 16B shows improved mode matching of surface plasmon polaritons (SPPs) the metal-insulator-metal-insulator and insulator-metal-insulator (MIMI-IMI) interface with a 41% overlap. The black solid curves show |Ez| mode profiles of different SPPs. For these calculations, Palik silver was used for the metallic layers and refractive index of 1.4 was used for the insulator layers. The dielectric gap sizes are about 5 nm, and the thickness of the metallic substrate is semi-infinite for FIG. 16A and 10 nm for FIG. 16B. FIG. 16C shows dispersion relations of SPPs and FIG. 16D shows mode overlap dispersion in the MIM-IM and MIMI-IMI interfaces.

FIG. 16A shows the conventionally used metal-insulator-metal (MIM) SPP for emission enhancement. If the thickness of metal substrate is less than the skin depth of MIM SPP, the lower dielectric half space starts to have a decaying tail. This new type of SPP can be referred to as the metal-insulator-metal-insulator (MIMI) SPP (see FIG. 16B). Although less metal is used, the MIMI SPP achieves better light confinement (smaller ∂ω/∂k) than the MIM SPP given the same frequency, as shown in the dispersion diagram in FIG. 16C. This indicates that the on-resonance local density of states of the MIMI SPP can be higher than that of the MIM SPP, if the top metal layer is replaced with a nanoparticle as a frequency-selecting cavity.

A better mode overlap (middle of FIGS. 16A and 16B) between the gap plasmon with the corresponding propagating SPP implies a larger radiative decay rate into propagating SPP than that in the case using an optically thick film. FIG. 16D shows that the MIMI-IMI overlap is much larger than the MIM-IM overlap over a wide wavelength range, from near-infrared to the entire visible spectrum. Although the above analysis only discusses the mode matching between gap and propagating SPPs, the photon decay rate can be greatly enhanced via tapering the SPPs into photons using the momenta provided by nanoparticle edges (see details below).

Figure 17A:
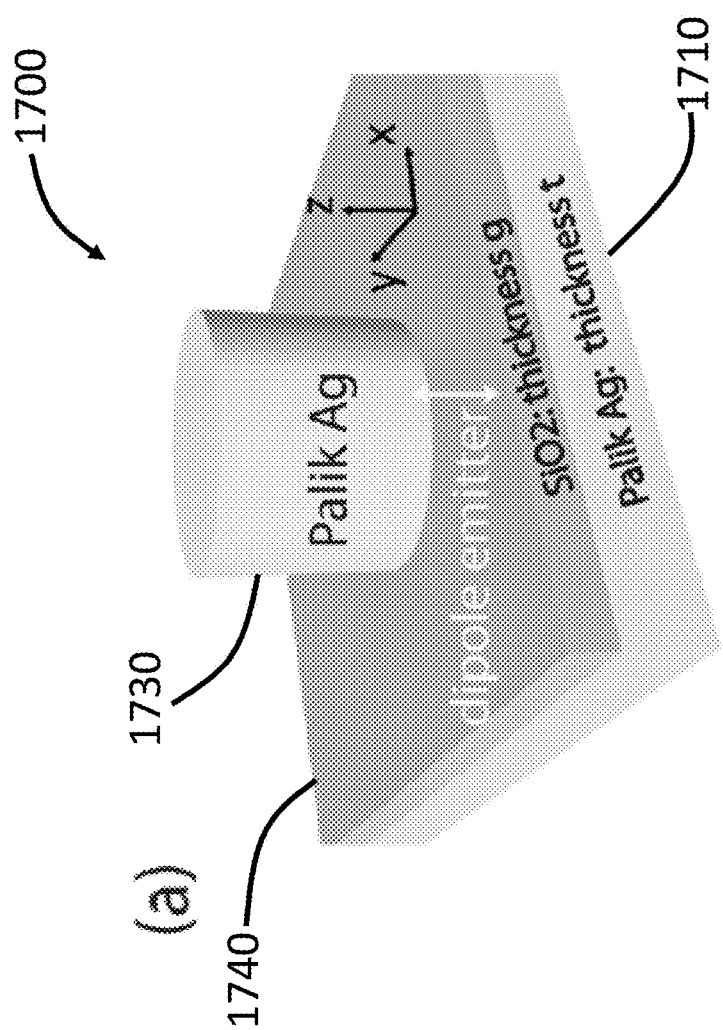
FIG. 17A shows a schematic of a structure including a metal cylinder disposed above a metal film for spontaneous emission enhancement.

FIG. 17A shows a schematic of a structure 1700 for spontaneous emission enhancement. The structure 1700 includes a silver cylinder 1730 disposed on top of a silver substrate 1710 and a dielectric layer 1740 (e.g., SiO$_2$, n=1.4). The silver cylinder 1730 can have a diameter of about 30 nm to about 70 nm (e.g., about 30 nm, about 40 nm, about 50 nm, about 60 nm, or about 70 nm, including any values and sub ranges in between). The height of the silver cylinder 1730 can be about 30 nm to about 70 nm (e.g., about 30 nm, about 40 nm, about 50 nm, about 60 nm, or about 70 nm, including any values and sub ranges in between). In one example, the diameter and the height can be the same. In another example, the diameter and the height can be different.

Figure 17B:
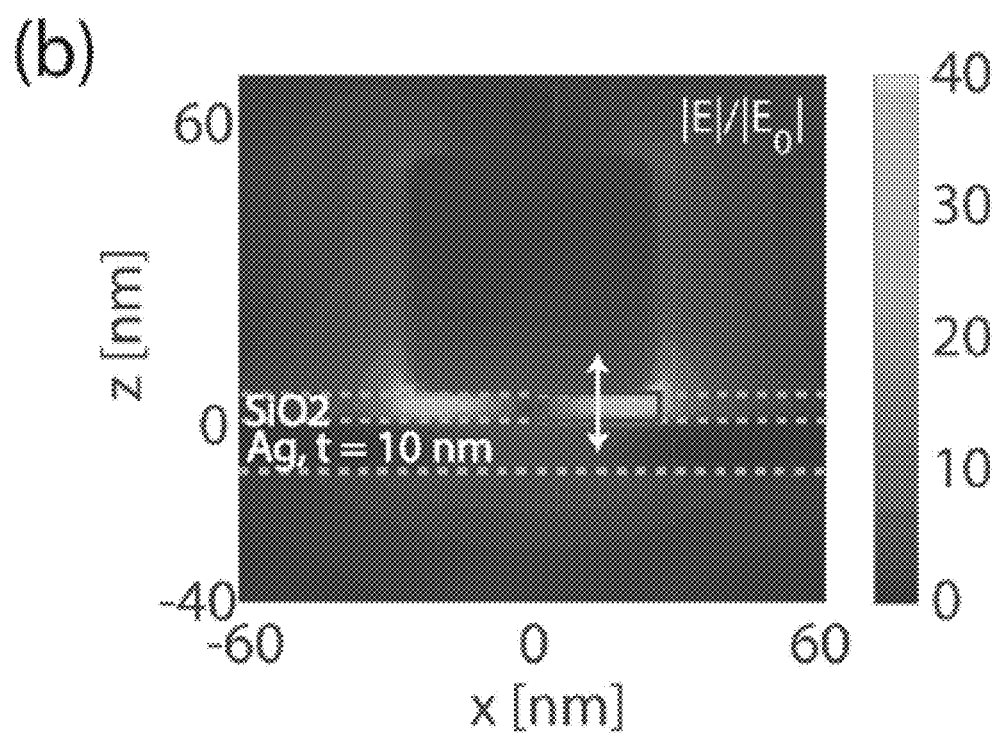
FIG. 17B shows calculated normalized electric field $|E|/|E_0|$ of the gap plasmon resonance in the structure shown in FIG. 17A.

FIG. 17B shows calculated normalized electric field |E|/|E$_0$| of the gap plasmon resonance with t=10 nm and g=5 nm. The electric field is mostly confined within the dielectric gap. The white arrow denotes a z-polarized dipole emitter and the solid box defines the sweeping area of the dipole location. The dashed lines outline the interfaces between different layers.

FIGS. 18A and 18B show radiative enhancement in the x-z plane as a function of dipole location with 10 nm silver film and 50 nm silver film, respectively. The thickness g of the dielectric layer 1740 is about 5 nm. FIGS. 18C and 18D show radiative efficiency in the x-z plane as a function of dipole location with 10 nm silver film and 50 nm silver film, respectively.

Figure 19A:
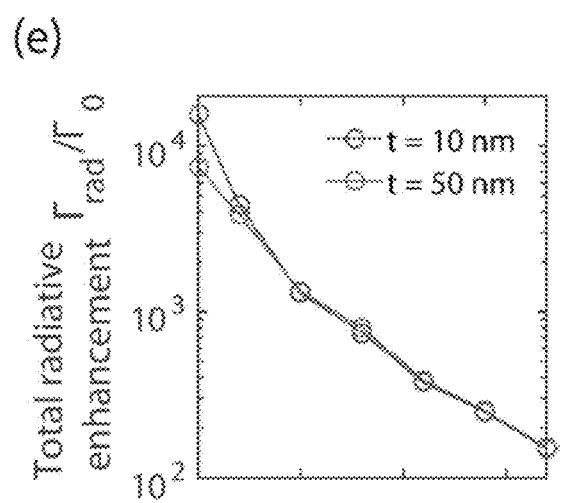
FIGS. 19A and 19B show evolution of radiative enhancement and efficiency, respectively, as a function of dielectric gap size in the structure shown in FIG. 17A.
Figure 19B:
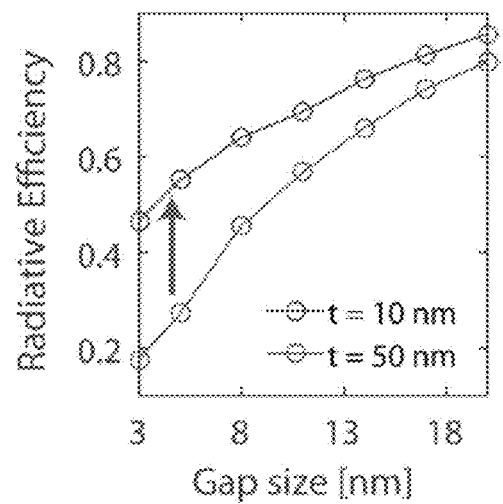

FIGS. 19A and 19B show evolution of radiative enhancement and efficiency, respectively, as a function of dielectric gap size g. In each figure, silver films of both 10 nm and 50 nm are used. The arrow indicates the increase of efficiency by decreasing substrate thickness. The size of the cylinder changes accordingly with different g to maintain the resonance at about 700 nm. The dipole stays at the center of the gap, and under the edge of the cylinder.

Figures 20A, 20B:
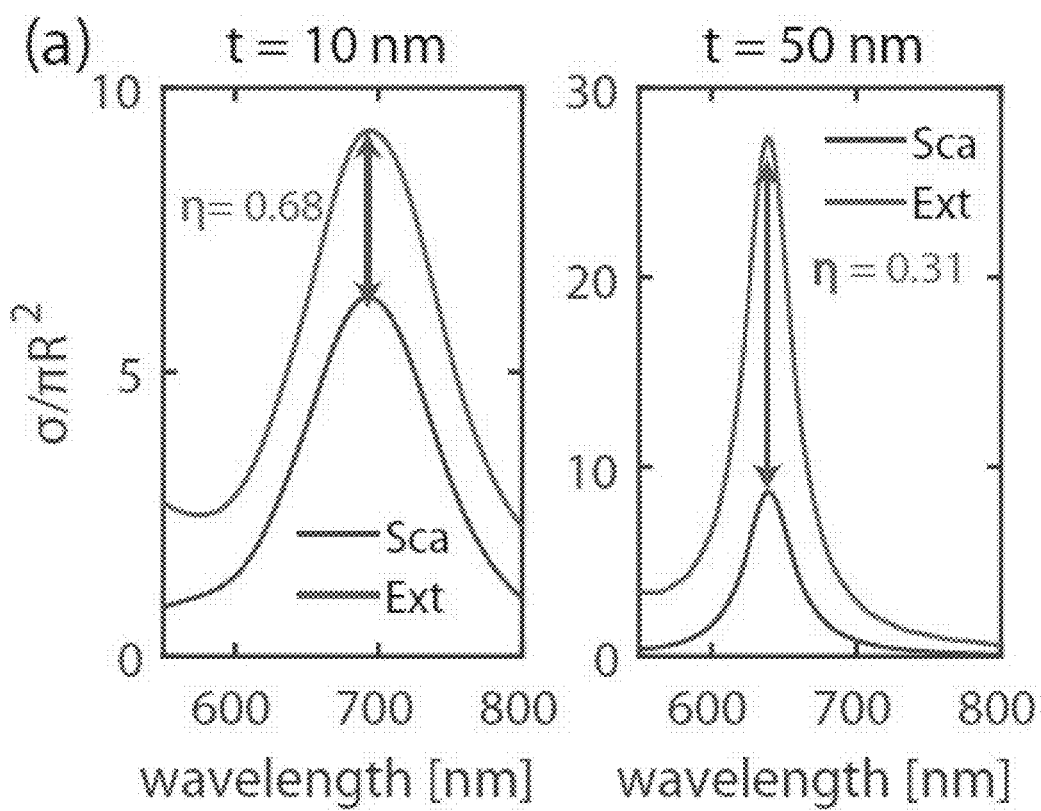
FIGS. 20A and 20B show calculated scattering and extinction cross-sections of the cylinder in the structure shown in FIG. 17A with a 10 nm thick silver film and a 50 nm thick silver film, respectively.

FIGS. 20A and 20B show calculated scattering and extinction cross-sections of the cylinder with a 10 nm thick silver film and a 50 nm thick silver film, respectively. FIGS. 21A and 21B show normalized absorption per unit volume at normal incidence of the cylinder with a 10 nm thick silver film and a 50 nm thick silver film, respectively. The scattering cross-sections of the two cases are about the same, yet along with a six-fold enhancement of absorption for the t=50 case. Correspondingly, the radiative efficiency drops by half. The efficiency contrast is also implied from the absorption per unit volume, which is greatly reduced inside the film as well as inside the cylinder by reducing the thickness of the metallic layer.

In FIG. 17A, the permittivities of the cylinder 1730 and the film 1710 can be made of Palik silver to offer a worst-case scenario analysis. For this structure, the radiative (photon+plasmon) efficiency η can be about 60% for a 10 nm thick film 1710 and about 30% for a 50 nm thick film 1710, as seen in FIGS. 20A and 20B. As the electric field is dominated by Ez, a z-polarized dipole (marked by the white arrow) is placed within the gap to probe the enhancement (see FIG. 17B). A sweeping analysis of dipole location in the x-z plane (marked by the solid box) provides all the information about the enhancement due to the rotational symmetry of the structure.

As shown in FIGS. 18A and 18B, the radiative decay rate $\Gamma_{rad}/\Gamma_0$ is generally higher with the thin film (t=10 nm) than that with the thick film (t=50 nm). More surprisingly, η in the t=10 nm case remains almost uniformly high in the x-z plane with an average of about 60%, while that in the t=50 case drops to about 30% (see FIGS. 18C and 18D). Both results are consistent with their scattering-extinction ratio shown in FIGS. 20A and 20B.

FIGS. 22A-22D illustrate spontaneous emission enhancement using the epitaxial silver film, instead of the Palik silver film used in FIGS. 18A-18D. FIGS. 22A and 22B show normalized radiative decay rate in the x-z plane with a 10 nm thick silver film and a 50 nm thick silver film, respectively. FIGS. 22C and 22D show quantum efficiency as a function of dipole location in the x-z plane with a 10 nm thick silver film and a 50 nm thick silver film, respectively. Comparing FIGS. 18A-18D with FIGS. 22A-22D, it can be seen that a higher radiative efficiency can be achieved with epitaxial silver film.

In the t=10 nm case, $\Gamma_{rad}/\Gamma_0$ remains high even for dipole locations within 1 nm distance from the metal surface, where absorption is always considered dominant. If epitaxial silver is used for the metal substrate, similar results are obtained with even higher η. FIGS. 19A and 19B compare $\Gamma_{rad}/\Gamma_0$ and η as a function of dielectric gap size for t=10 and t=50 nm cases, with a fixed emitter at the center of the gap, and under the edge of the cylinder. The trends of $\Gamma_{rad}/\Gamma_0$ are similar. For η, in the t=10 nm case it remains higher for all gap sizes. The advantage becomes more striking with vanishing gap size (3-8 nm), where the thin substrate achieves a much higher enhancement and efficiency simultaneously.

The optically thin metallic substrates have two main advantages compared to the thick ones. First, the cavity mode becomes less absorptive as shown by the loss per volume (smaller $\Gamma_{abs}$, see FIGS. 20A-21B). Second, the radiative decay rate is enhanced (larger $\Gamma_{rad}$) because of the improved mode overlap condition (see, FIGS. 16A-16D).

Figures 23A, 23B:
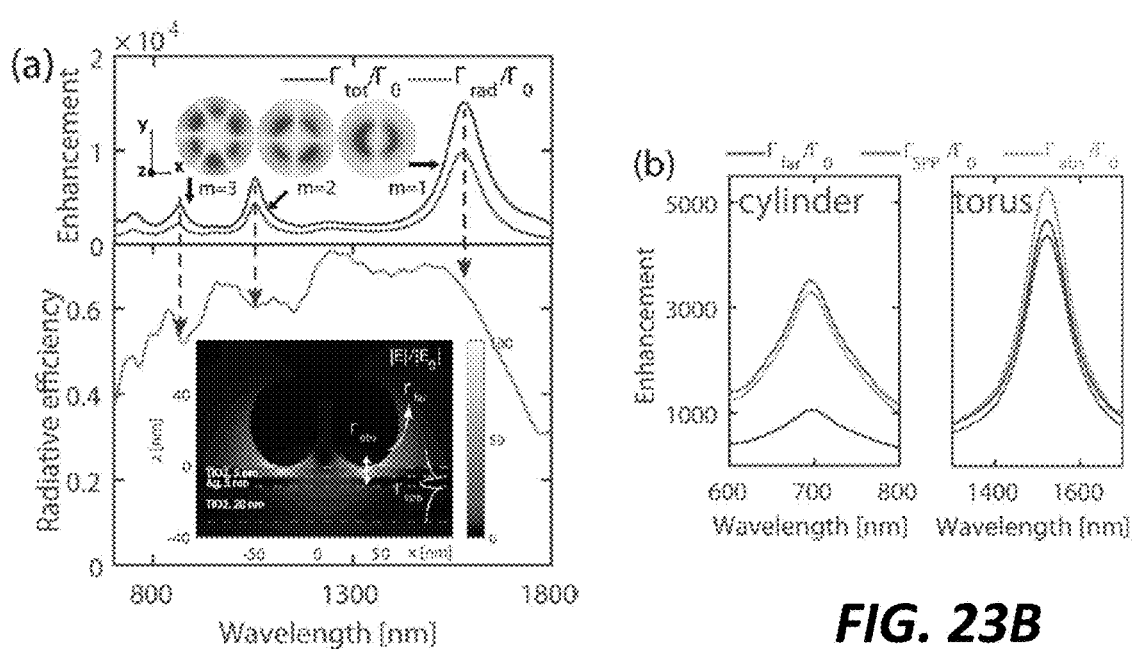
FIG. 23A shows calculated emission enhancement and radiative efficiency of the torus-multifilm structure shown in FIG. 8 for high-order modes.
FIG. 23B shows calculated enhancement for m=1 modes for a torus-multifilm structure similar to that shown in FIG. 8 (left) and a cylinder-multifilm structure similar to that shown in FIG. 17A (right).

FIG. 23A shows calculated emission enhancement and radiative efficiency of the torus-multifilm structure shown in FIG. 17A for high-order modes. FIG. 23B shows calculated enhancement of m=1 modes for torus-multifilm structure and cylinder-multifilm structure. These two figures show that optically thin metal films can also enable high radiative efficiencies even for high-order (large-azimuthal-index, m) modes, which are typically less efficient in plasmonics. Emission enhancement and radiative efficiency of the torus-multifilm structure (R=28 nm, r=24 nm, and t=5 nm) are shown in FIG. 23A. The upper inset shows the Ez profiles in the middle of the dielectric gap of the m=1, 2, 3 gap plasmon modes. The lower inset shows the normalized electric field of the gap plasmon resonance of the torus with illustrated major decaying channels. The white two-sided arrow indicates the location of the z-polarized dipole. The dash lines denote the interfaces of different layers. The radiation into surface plasmons can be converted to radiation in the far field by altering the nanoparticle shape, for example, from a cylinder to a torus. One way to achieve the large total ($\Gamma_{far}+\Gamma_{spp}$) radiative emission, in either case, is the use of a thin-film metallic substrate.

As there are two radiative channels in the gap plasmon structure (i.e., free space radiation into the far field $\Gamma_{far}$ and SPP excitation $\Gamma_{spp}$), it is helpful to separate the total radiative decay rate $\Gamma_{rad}$ into the two channels and tailor their relative ratio. It has been shown that tapered antennas (particles like spheres and tori) can have higher radiative efficiencies than rigid antennas (particles like cubes and cylinders). Here, it is shown that the ratio of $\Gamma_{far}$ and $\Gamma_{spp}$ in the entire radiation can be tailored via the shape of nanoparticles.

In FIG. 23A, there are multiple orders of gap plasmon resonances (e.g., whispering gallery modes with the dielectric gap) in this structure. Usually the decay of high-order resonances of a plasmonic nanoantenna is dominated by absorption and thus are not very efficient for excitation or radiation. However, with a thin metal substrate, the first three gap plasmon resonances of the structure (denoted by their azimuthal index m) all achieve considerably high enhancement while maintaining high efficiencies (see FIG. 23A). This result reveals the potential for high-efficiency harmonic generation and wave multiplexing.

For the cylinder, $\Gamma_{spp}$ is the dominant radiative channel (FIG. 23B, left), making this structure an ideal candidate for a high excitation-efficiency plasmon source. Although for the torus, $\Gamma_{far}$ is greatly boosted, which is useful for fluorescence applications (FIG. 23B, right). Note that although the photon and plasmon excitation ratio is different in the two nanoparticles, it is the thin metallic substrate that gives rise to the high total radiative enhancement. The aforementioned high-Q scattering and high-QY emission are deeply connected via the radiative efficiency η but differ from each other. For scattering, $FOM_{sca}=Q/(1-\eta)$. For plasmon-enhanced emission, $FOM_{emit} \propto \eta/V$. Thus, two applications focus on Q and V, respectively. What they have in common is a higher η for either stronger scattering or higher quantum yield. Another difference is that a high-quality metallic substrate is not essential for high-efficiency (e.g., greater than 50%) emission, as the improved mode matching does not rely on low-absoprtion materials.

It is also useful to consider the feasibility of fabricating such high-quality thin films, and whether the material can be approximated with a local (bulk) permittivity. Nonlocal effects can induce additional loss when the dimension of plasmonic structures becomes small. Specifically for multi-films, the nonlocal effects are typically insignificant with geometrical sizes larger than 1-2 nm (or >λp/100, where λp is the plasma wavelength) in the gap plasmon resonances. In addition, the nanoparticles discussed herein are generally large enough (sizes greater than 20 nm) such that the nonlocal effects are negligible, yet small enough (sizes less than λ/10) such that the quasistatic approximation still holds. Overall, the local response approximation is still valid in the above analysis. Practically, the low-temperature epitaxial growth technique can provide a low growth rate (typically 1 Å/min) while maintaining high film quality, making this technique ideal for the fabrication of low-loss ultrathin film (e.g., substantially equal to or less than 10 nm).

Static Transparent Displays Based on Nanoparticles

Figure 24:
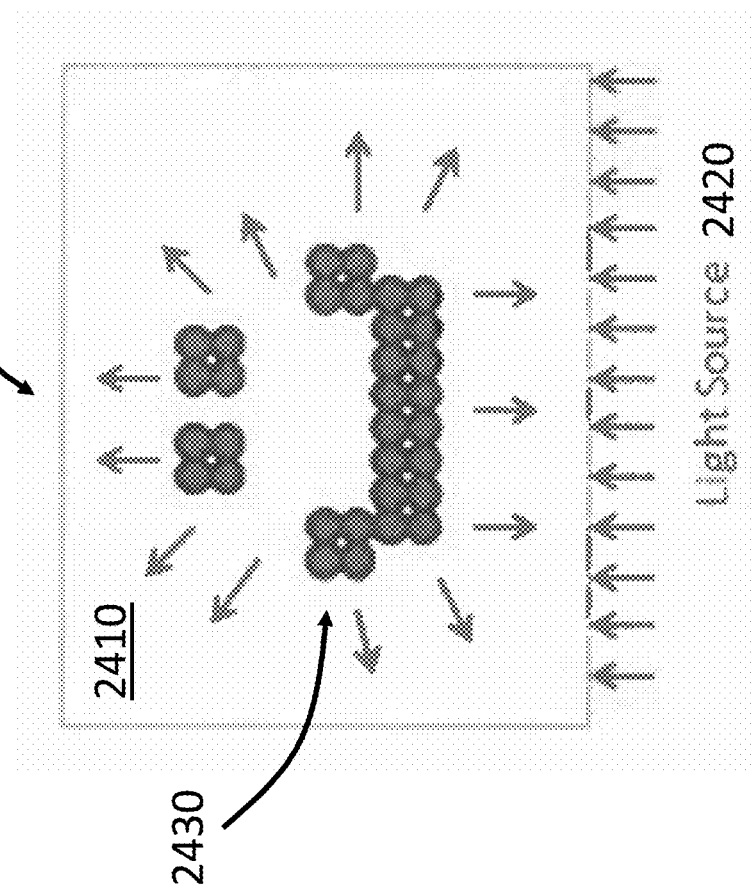
FIG. 24 shows a schematic of a static transparent display including nanoparticles disposed in a predetermined pattern.

The nanoparticles described herein can also be used to make static transparent displays by disposing the nanoparticles into a desired pattern. FIG. 24 shows a schematic of a static transparent display 2400, which includes a transparent substrate 2410 and nanoparticles 2430 disposed on or into the transparent substrate 2410. The nanoparticles 2430 are disposed in a pattern substantially identical to the desired content to be displayed. In this manner, when illuminated by a light source 2420, the nanoparticles 2430 scatter the light while other parts of the transparent substrate 2410 pass the light, thereby creating the desired image.

Figure 25:
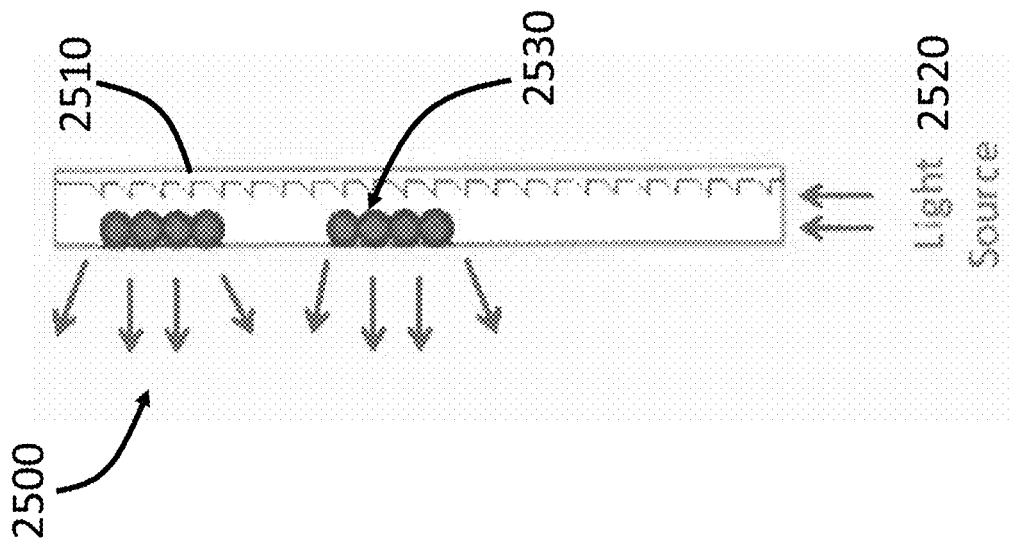
FIG. 25 shows a schematic of a static transparent display including nanoparticles disposed in proximity to a notch filter.

FIG. 25 shows a schematic of a static transparent display 2500 using a notch filter 2510 as the substrate. Nanoparticles 2530 are disposed on one side of the notch filter 2510. The reflectance wavelength(s) of the notch filter 2510 are substantially equal to the scattering wavelength(s) of the nanoparticles 2530. A light source 2520 is employed to illuminate the nanoparticles 2530 from the bottom of the notch filter 2510. Upon illumination, the nanoparticles 2530 scatter light toward all directions, but those scattered light toward the right side of the notch filter 2510 is reflected back by the notch filter 2510. Therefore, a viewer to the left of the transparent display 2500 can see the image, but a viewer to the right of the transparent display may not be able to see any image.

Narrow-Wavelength Projection From Broadband Sources

Figure 26:
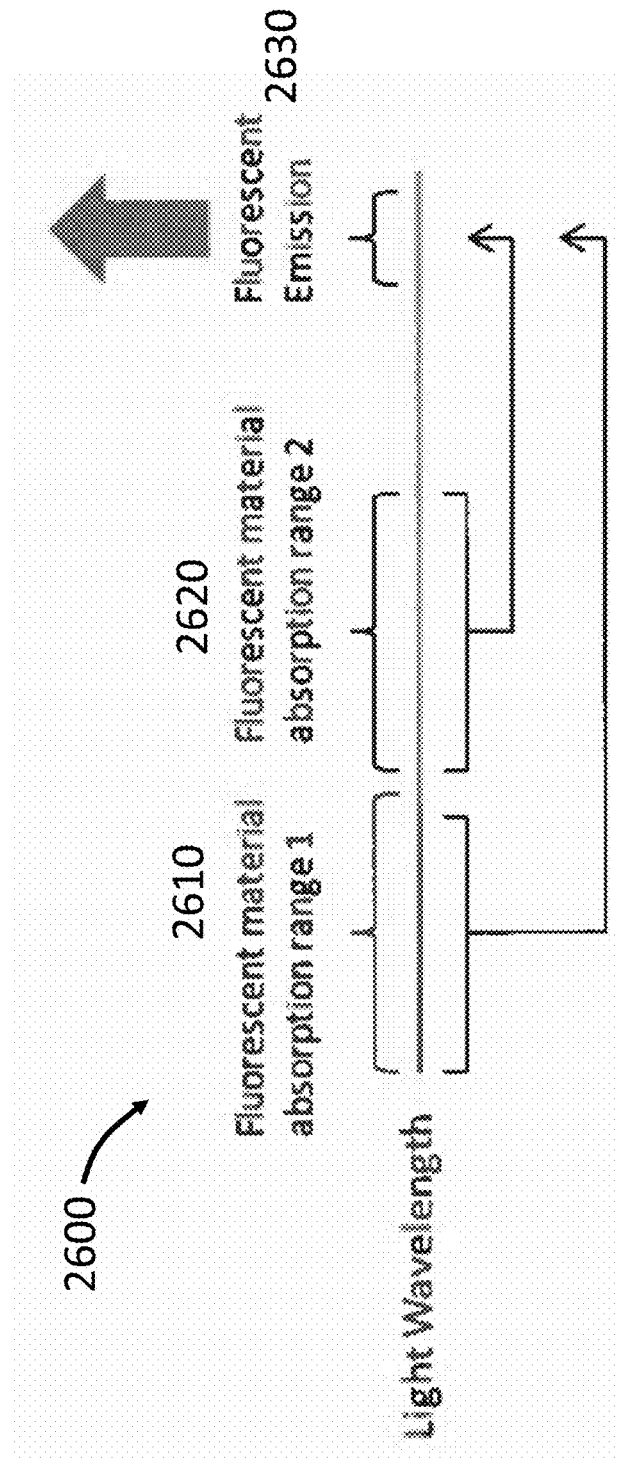
FIG. 26 illustrates a method of emitting narrow-band light using a broadband light source and a light conversion material.

The light sources described above (e.g., light sources 120, 2420, or 2520) can use a broadband light source combined with fluorescent dyes or nanoparticles (e.g., quantum dots) with high quantum yield to emit narrow-band light beams. FIG. 26 illustrates a method of emitting narrow-band light. In this method, a light conversion material has absorption bands in a first spectral region 2610 and a second spectral region 2620. The light conversion material also has an emission band in a third spectral region 2630. In operation, the light conversion material absorbs light at wavelengths in the regions 2610 and 2620, and emits light at wavelengths in the region 2630. The third spectral region 2630 can be a narrow region that emits narrow-band, single-color light beams.

In some cases, the light conversion material can include more than one emission band. For example, the light conversion material can include a first emission band in the red region (e.g., about 580 nm to about 680 nm) and a second emission band in the blue region (e.g., about 390 nm to about 480 nm). In this case, a light source including the light conversion material can emit two colors for a full-color transparent display.

Figure 27:
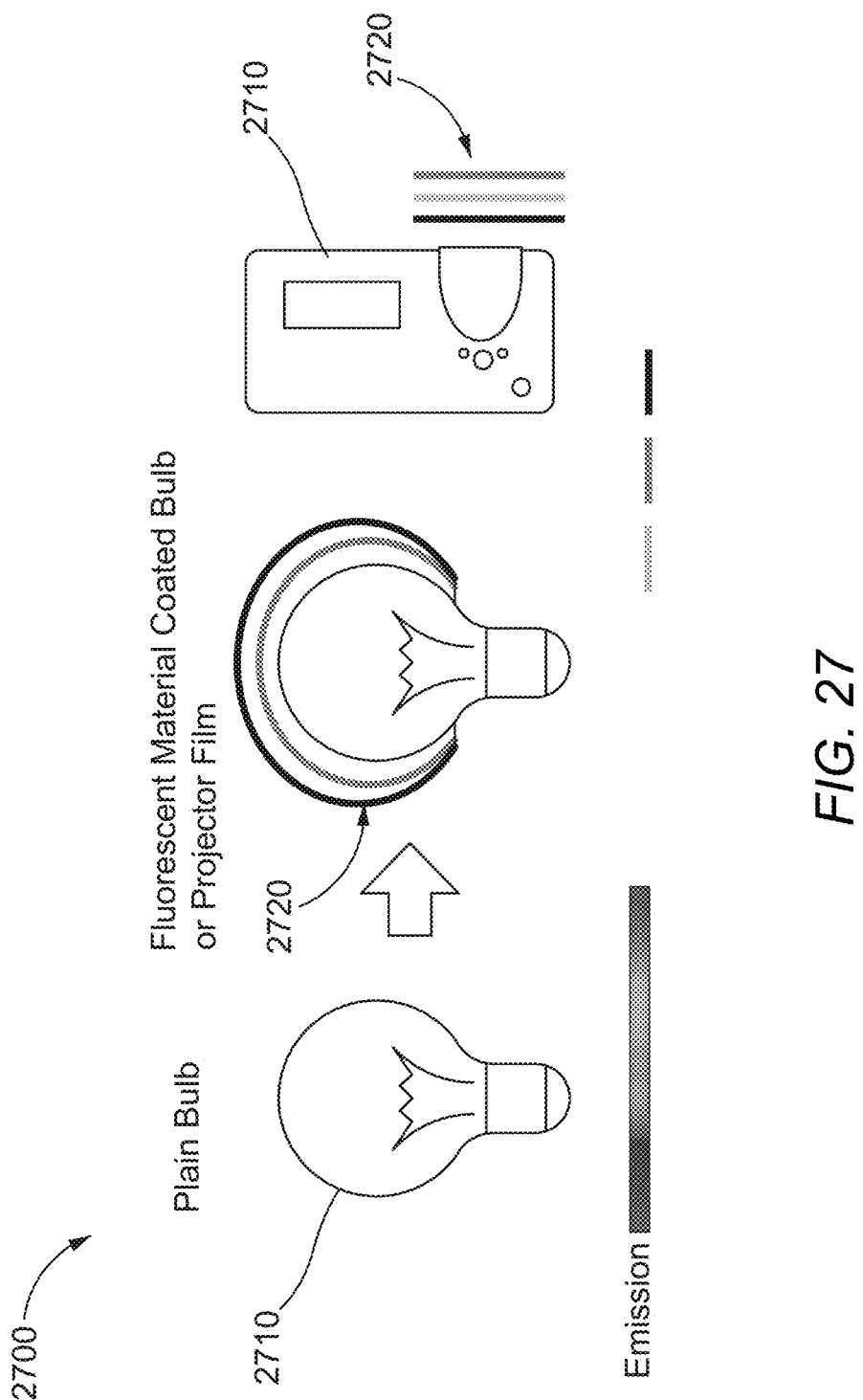
FIG. 27 show schematics of light sources using light conversion materials to emit narrow-band light beams.

FIG. 27 shows schematics of light sources 2700 using a light conversion material to emit narrow-band light beams. The light sources 2700 includes broadband light sources 2710 and 2730. The first broadband light source 2710 can be a light bulb and the second broadband light source 2730 can be a projector or a flashlight. Light conversion layers 2720 are coated on the outputs of broadband light sources 2710 and 2730 to convert the broadband light outputs into narrow-band light beams. In one example, the light conversion material includes a narrow emitter, such as a lasing dye (e.g., perchlorates-based dyes, rhodamine-based dyes, and coumarin-based dyes, among others). In another example, the light conversion material includes quantum dots, such as ZnS or CdSeS based particles.

Zero-Index Medium for Transparent Displays

Without being bound by any particular theory or mode of operation, the maximum extinction cross section for a single microscopic particle with size smaller the wavelength of light $\lambda_0$ can be given by:

$$\sigma_0 = 3\lambda_0^2/(2\pi n^2) \quad (9)$$

where n is the medium in which the microscopic particle is embedded.

Equation (9) indicates that the extinction cross section $\sigma_0$ can be suppressed when the particle is embedded in a higher-index region (e.g., n>1). On the other hand, the extinction cross section $\sigma_0$ can also be enhanced with a low-index material to surround the nanoparticle. Therefore, one approach to enhance scattering cross section of nanoparticles and to produce a more efficient transparent display is to embed the scattering nanoparticles (or other scattering defects) in an effective medium that has small index (e.g., n<1) or even zero index (i.e. n=0). The scatterers can be defined in a general form, including dielectric particles (e.g., silicon, silica, $TiO_2$. etc), metallic particles (gold, silver, aluminium, graphene. etc), and generic fabrication errors and surface roughness.

Embedding scatterers in a low-index medium can benefit the application of transparent displays in multiple ways. First, the scattering cross section of the scatterers can be dramatically enhanced at the projection wavelength. Second, the index n is typically a function of wavelength A, i.e. $n=n(\lambda)$. As a result, the amplification of $1/(n(\lambda)^2)$ can also be a function of wavelength $\lambda$. A transparent display can include a medium having a large slope near $\lambda_0$, i.e., $dn/d\lambda$ at $\lambda_0$ is very large. In this case, the scattering cross section at the projection wavelength $\lambda_0$ is strongly enhanced (giving strong signals), while the scattering cross sections at other wavelengths are less enhanced (therefore remaining transparent).

Figures 28A, 28B:
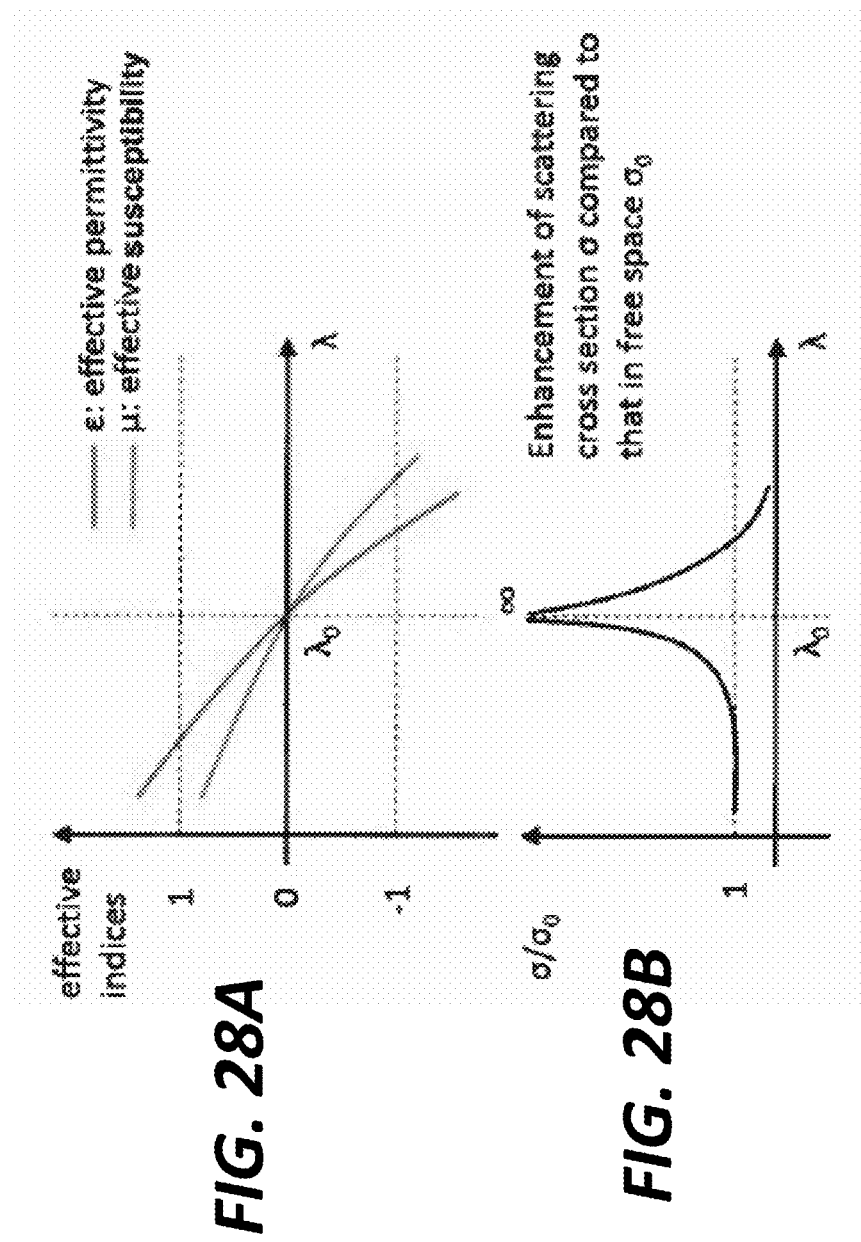
FIG. 28A shows the effective permittivity and susceptibility of a low-index medium having a large slope near a wavelength $\lambda_0$.
FIG. 28B shows enhancement of the nanoparticles' scattering cross section using the medium illustrated in FIG. 28A to surround scattering nanoparticles to form a transparent display.

FIG. 28A shows the effective permittivity and susceptibility of a low-index medium having a large slope near wavelength $\lambda_0$. FIG. 28B shows enhancement of scattering cross section using this medium to surround scattering nanoparticles. These two figures show that the enhancement of scattering cross section is most pronounced near the wavelength $\lambda_0$.

There are various methods to realize a zero index medium. One example uses a hybridization of dielectrics and metals. The dielectrics have positive dielectric constants $\varepsilon>0$ and the metals have negative dielectric constants $\varepsilon<0$. Therefore, the hybridization of these two materials can have a zero index.

In another example, zero-index or low-index medium can be achieved by using the cut-off wavelength $\lambda_c$ of a waveguide. The waveguide can propagate light at wavelengths substantially equal to or shorter than $\lambda_c$ and block light at wavelengths longer than $\lambda_c$. This essential creates an index profile which has a large slope near $\lambda_c$.

Figure 29:
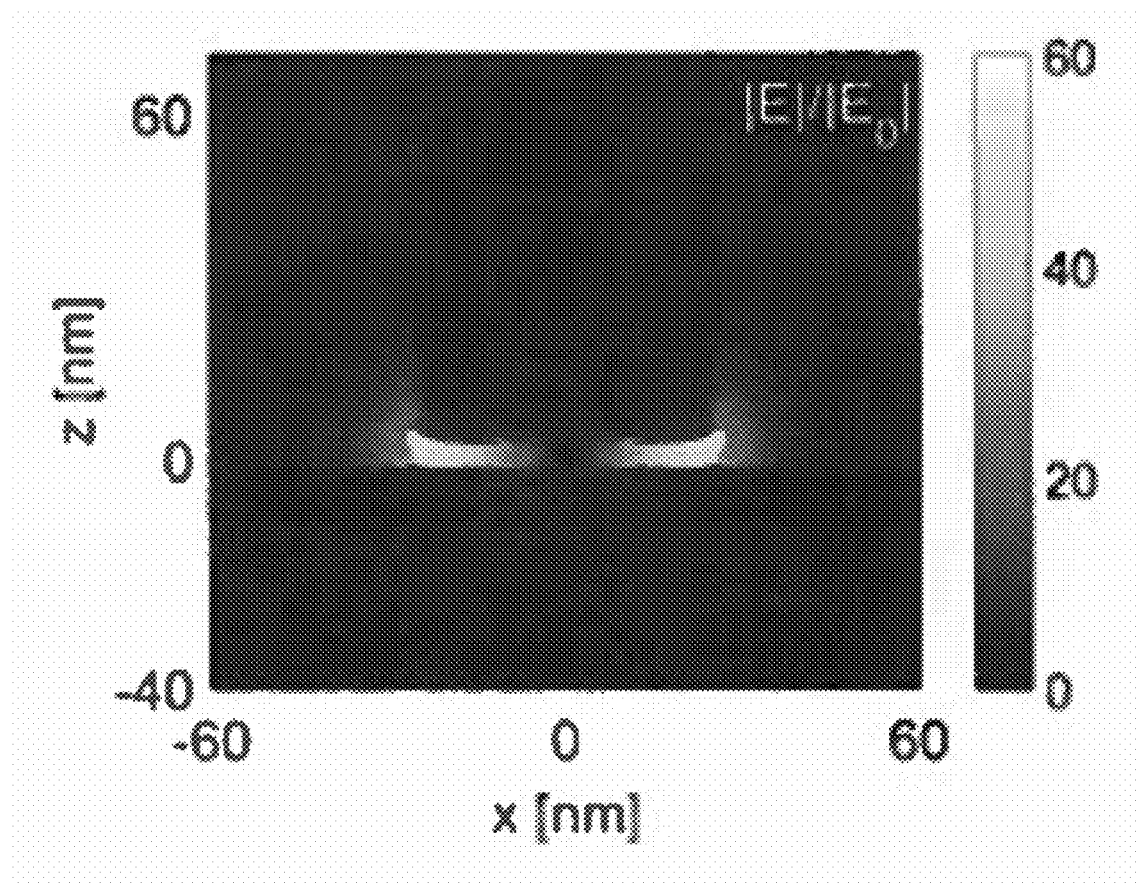
FIG. 29 shows an electric field of a gap plasmon resonance that can be used to make transparent displays.

In yet another example, a zero-index or low-index medium can be achieved using the special property of an accidental Dirac point, or Dirac-like points, which can be realized in optical frequencies using accidental degeneracy. More details can be found in Liberal, Iñigo, and Nader Engheta, "Near-zero refractive index photonics," *Nature Photonics* 11.3 (2017): 149-158; Huang, Xueqin, et al. "Dirac cones induced by accidental degeneracy in photonic crystals and zero-refractive-index materials," *Nature materials* 10.8 (2011): 582-586; and Zhou, Ming, et al. "Extraordinarily large optical cross section for localized single nanoresonator," *Physical review letters* 115.2 (2015): 023903, each of which is hereby incorporated herein by reference in their entirety for all purposes Transparent Displays Based on Gap-Plasmon Resonances A gap plasmon resonance is a resonance residing within the gap between a metallic surface and metallic/dielectric nanoparticles. FIG. 29 shows an electric field of a gap plasmon resonance that can be used to make transparent displays. By controlling the material/size of the particle and/or the thickness of the gap, one can readily tune the resonance across the entire visible and infrared spectrum.

Static transparent displays and structural color can be realized by this type of resonance, since the gap plasmon resonances scatter light only within a narrow bandwidth. Compared to conventional methods, this approach using gap-plasmon resonance has higher scattering cross sections and higher transparency at the same time.

Under external forces, this static transparent display and structural color can become tunable. When no external force acts on the metasurface, the nanoparticles scatter light at certain given wavelengths (e.g., $\lambda_1$). When external forces act upon the surface (e.g., fingerprints), the size of the gap can change, thereby changing the resonant wavelength. For example, a decrease in the gap size can increase the resonant wavelength (i.e., red shift) and an increase in the gap size can decrease the resonant wavelength (i.e., blue shift). Accordingly, the luminescence has a different color display under external forces. The range of tunability can also be very broad, because a 1-2 nm change of gap size can produce a resonance shift of over one hundred nanometers.

There are various methods to implement the external force on a gap. In one example, the external force can be applied by pressure from fingerprints. In another example, the external force can be generated by a uniform stretching of a part of or the whole surface. In yet another example, a biasing voltage can be applied to the metallic substrate to induce a force to pull the nanoparticle closer to the metallic surface.

In yet another example, the gap size can be changed using piezoelectric materials as the gap material. Applying external voltage to the gap material can change its thickness. A transparent projection screen can also be built this way: by controlling the voltage applied to each pixel, the RGB color appearing on each pixel can be controlled explicitly. This technique is compatible with CMOS and the electrodes can be integrated on a chip.

The above methods can also be employed to construct devices such as fingerprint readers, fingerprint identifiers, tunable frequency filters, active or adaptive military camouflage fabrics, and optical transistors, among others.

Furthermore, this resonance can also be used for sensing applications based on the large resonance shift with regard to a 1-2 nm spacer thickness change. In this way, a 1-2 nm mechanical/molecular shift can be detected using this plasmonic ruler. For active devices, similarly, this technique can also be used for tunable lasing. Lasing can be achieved using gap plasmons and the lasing wavelength can then be tuned either locally or globally, using the above mentioned tuning mechanisms.

Another application is full-color electronic paper. Electronic paper is a new kind of glare- and environmentally-friendly reading medium. It does not produce light, but scatters light upon external illumination to show the content displayed on the paper. Therefore electronic paper is more energy efficient and lighter than LED/LCD displays.

Gap plasmonics can be used to create full-color electronic paper. As discussed above, a 1-2 nm shift of the gap size can cause the scattering wavelength to shift more than 100 nm. To achieve a full-color display, a tuning range of the gap size by 4-8 nm can be sufficient. One way to achieve this tunabilty can come from the local voltage bias applied on the metallic substrate: locally accumulated charges can induce redistribution of charges on the nanoparticles, which pulls the nanoparticle closer to the substrate and changes the "color" of the pixel.

Transparent Displays Based on Photonic Crystal Defects

In addition to using scattering nanoparticles, transparent displays can also use photonic crystals in a transparent dielectric medium to selectively scatter incident light. The dielectric transparent medium can include, for example, $SiO_2$, SiN, or any other material known in the art. Based on the nano structure of the material, wavelength-specific and angle-specific photonic resonances are generated that trap incoming light from a specific incident angle.

Incorporating nanoparticles, gas molecules, surface roughness, or other small debris into the photonic nanostructure can further increase scattering (either in both forward and backward directions or just backwards. depending on design). The incident light can be divided into two scattering channels based on choice of crystal structure: one is a uniform scattering of trapped light into all directions (broad viewing angle) and the other scatters trapped light into specific directions that can be pre-designed (limited viewing angle). Since the typical range of incident angle that can induce trapping and scattering is limited in either case, ambient light coming from random directions can go through without much scattering. As a result, the screen can be visually transparent.

Figures 30A, 30B:
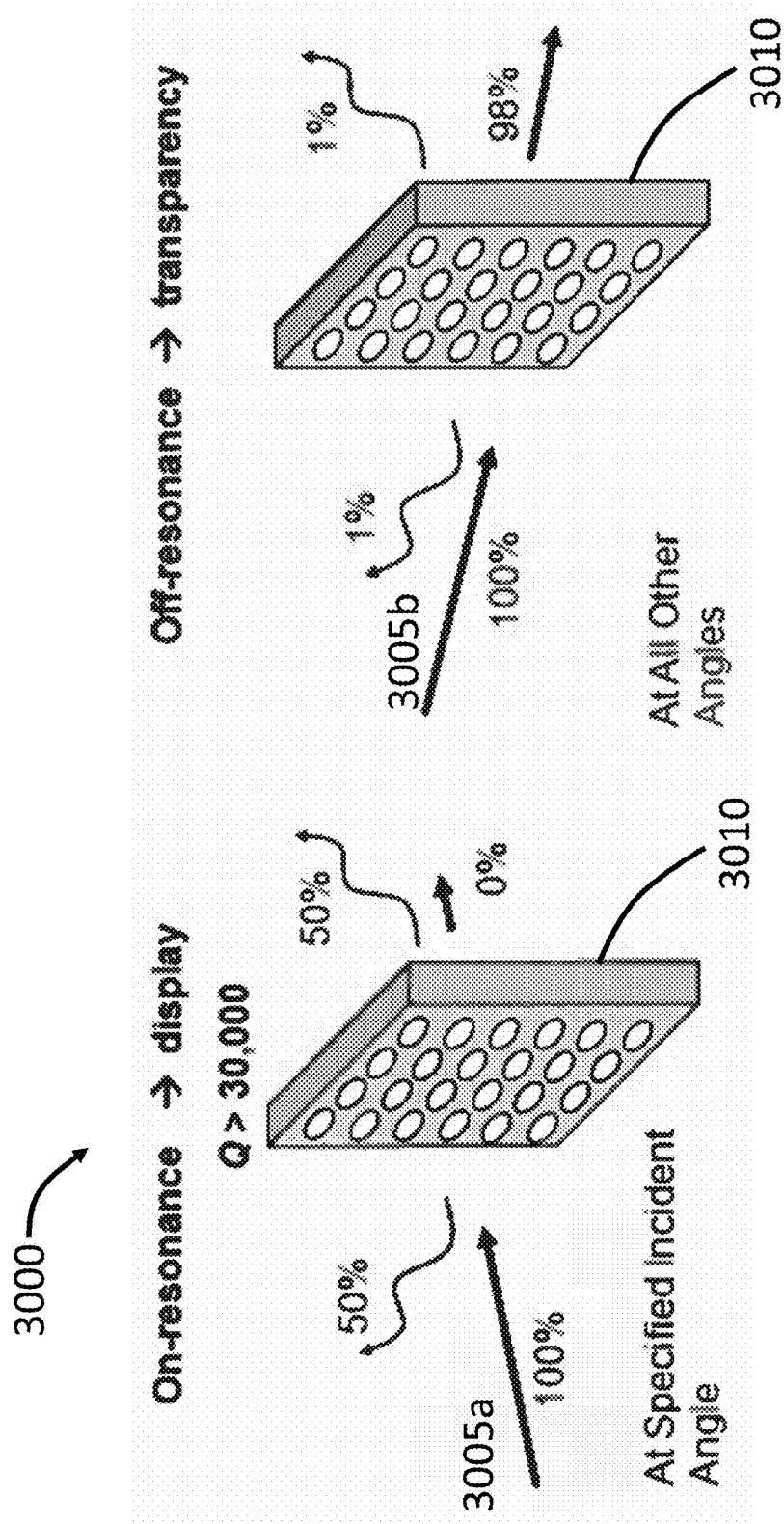
FIGS. 30A and 30B show a schematic of a transparent display based on photonic crystals with angular selective scattering.

FIGS. 30A and 30B show a schematic of a transparent display 3000 based on photonic crystals with angular selective scattering. The transparent display 3000 includes a substrate 3010 defining a photonic crystal (e.g., an array of holes in the substrate 3010) that scatters light at a predetermined incident angle and transmit light at other incident angles. In FIG. 30A, incident light 3005a is at the predetermined incident angle and the photonic crystal scatters the incident light along both forward and backward directions. In FIG. 30B, however, incident light 3005b is not at the predetermined incident angle and the photonic crystal transmits through the incident light 3005b, with negligible scattering (e.g., 1% or less).

Based on the above approach, a single color display can be achieved by using a monochromatic beam at the proper angle to project images onto the corresponding photonic crystal structure. To achieve a full color display it is also possible to produce a structure that selectively scatters all three colors at the same incident angle. A full color display can also be realized by layering monochromatic photonic crystals on top of each other, one corresponding to each beam wavelength.

The approach based on photonic, resonance-selective light scattering is different from existing electronic photonic bandgap crystal display technology, which relies on electrical signals to distort the photonic bandgap structure of a polymer to produce, so far, only very simple color changes. In contrast, the photonic crystal described here does not require complex structural changes to operate. The fixed photonic structure serves as an enhanced substrate for a dynamic projection display that can reflect highly detailed, multicolor images and video limited only by the resolution of the incoming laser projector.

Color 3D Display (Single Color or Full Color)

A two-color 3D display can be fabricated by picking two resonances in the same structure that correspond to different wavelengths, which are projected at different correlated incoming angles. This can produce a two-color display where different images are projected via each wavelength. The 3D effect is accomplished by the viewer wearing corresponding wavelength filtering two-tone glasses that separate each image into a different eye, creating a 3D optical illusion.

Figure 31:
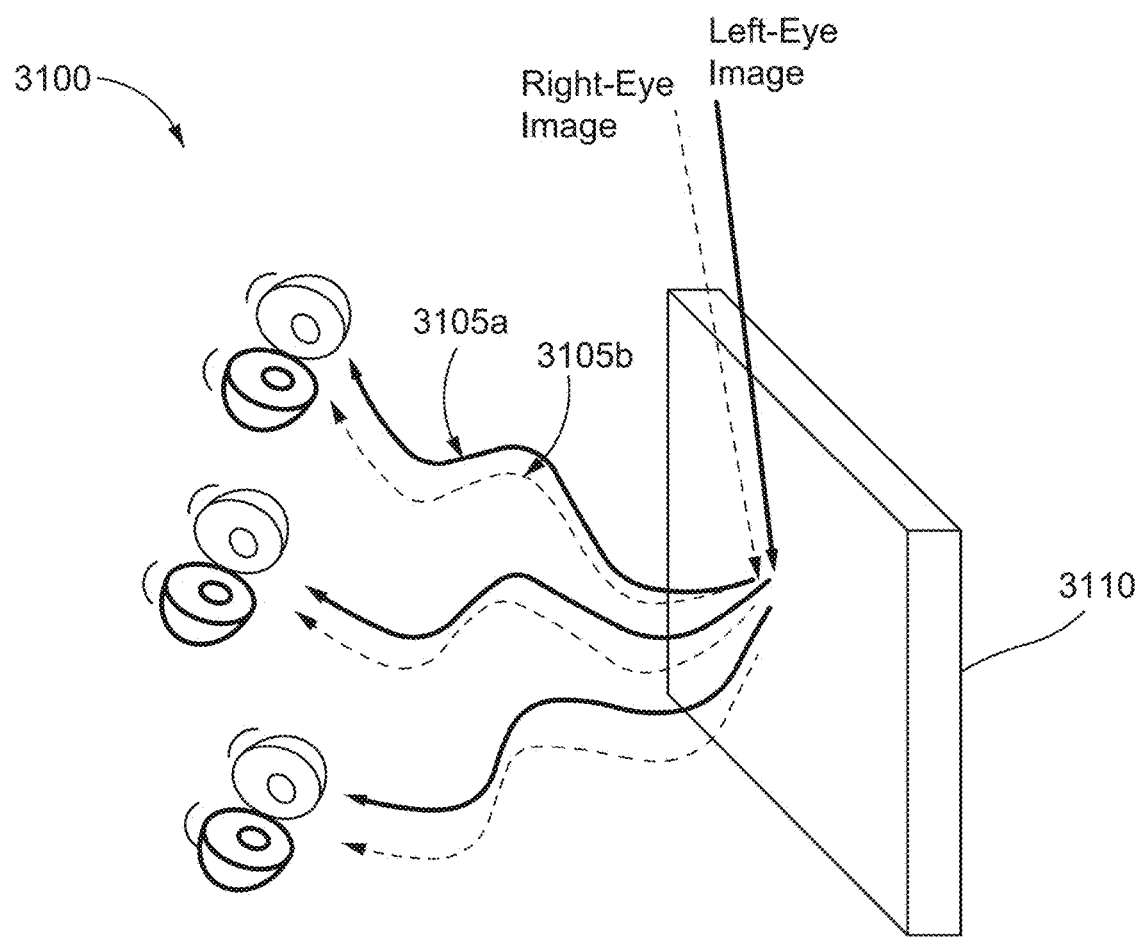
FIG. 31 shows a schematic of a color 3D display based on photonic crystals.

FIG. 31 shows a schematic of a color 3D display 3100 based on photonic crystals. The transparent display 3100 includes a substrate 3110 defining a photonic crystal that resonantly scatters light at two different wavelengths (towards all directions in FIG. 31). Light beams 3105a and 3105b at these two wavelengths are then scattered by the photonic crystal to the eyes of a viewer. Spectacles with complementary scattering displays can be used by the viewer to view one color on the left eye and the other color on the right eye, thereby generating 3D effects.

In one example, the two wavelengths of the beams 3105a and 3105b can be at two different colors, such as red and green. This can enhance the 3D effect as well as reduce the complexity of the spectacles for filtering. In another example, the two wavelengths of the beams 3105a and 3105b can be close to each other. For example, the beam 3105a can have a wavelength at about 455 nm and the beam 3105b can have a wavelength at about 465 nanometers (both presenting blue). In this case, the resulting 3D images can also have a blue color. In yet another example, the transparent display 3100 can include three pair of beams (like the pair 3105a and 3105b) and each pair of beams has one color. For example, the first pair of beams are red (although they have slightly different wavelengths), the second pair of beams are green, and the third pair of beams are blue. In this case, a full color 3D display can be formed.

Polarization 3D Display (Single Color or Full Color)

Projecting incoming light of different polarization states (e.g., different linear polarizations, different circular polarizations, different elliptical polarizations) of the same wavelength at the same corresponding incident angle can also form a 3D transparent display. Instead of using filters to filter out different colors, a viewer can use filters to filter out different polarization states to create 3D effects.

Figure 32:
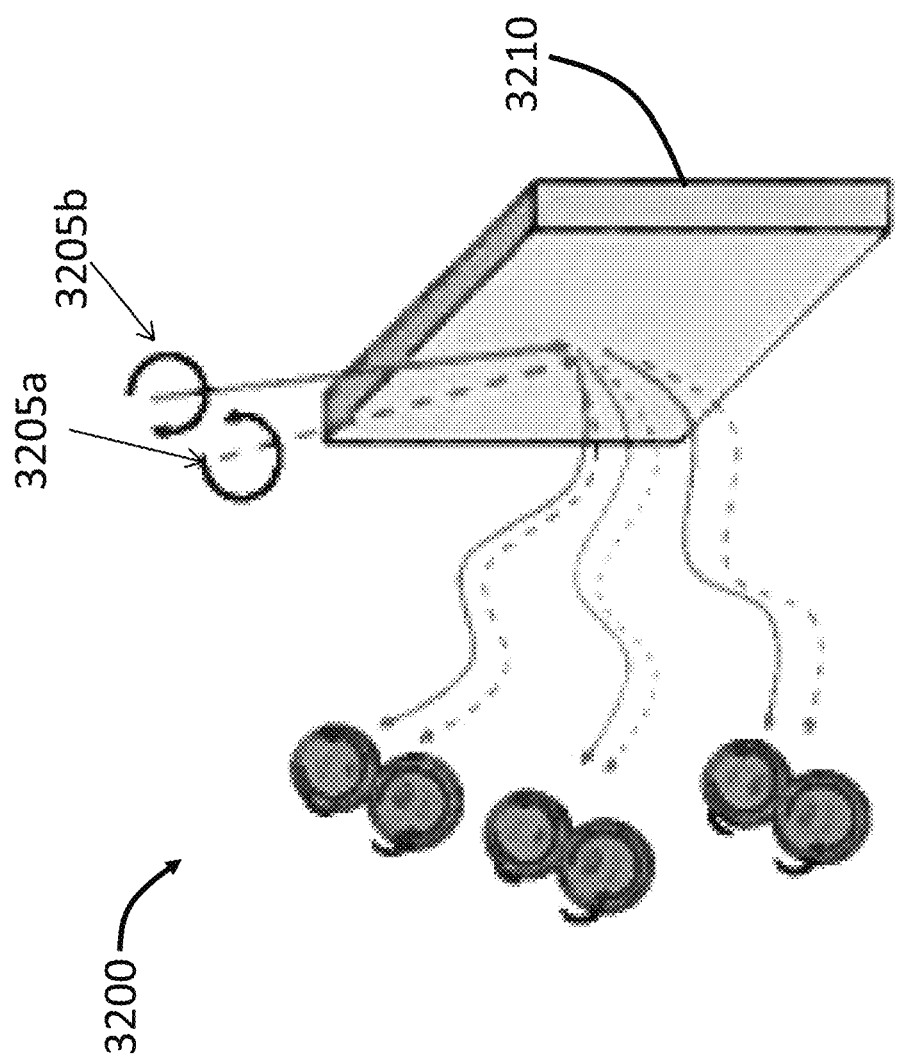
FIG. 32 shows a schematic of a polarization 3D display based on photonic crystals.

FIG. 32 shows a schematic of a polarization 3D display 3200 based on photonic crystals. The transparent display 3200 includes a substrate 3210 defining a photonic crystal that resonantly scatters light at wavelength $\lambda_0$ at any polarization state. Light beams 3205a and 3205b have different polarizations and are scattered by the photonic crystal to the eyes of a viewer. A spectacle can be used by the viewer to view one polarization on the left eye and the other polarization on the right eye, thereby generating 3D effects. One can also combine polarization-based 3D (FIG. 32) with color-based 3D (FIG. 31) using beams of different colors and of different polarization states for 3D effects.

Glasses-Free 3D

The devices and methods described above mostly focus on the first scattering channel: specified incident light is scattered uniformly into all directions for broad viewing. Transparent displays can also be constructed from a second scattering channel, i.e., into the specific direction(s) that can be predetermined based on photonic crystal band structure calculations and engineering.

Viewer-angular-specific 3D transparent displays can be realized without the need for any kind of specialized viewing glasses. This is accomplished by retaining the angularly-selective light scattering achieved in the debris-free crystal and selecting two separate wavelength resonances to project at. The projection display can also incorporate a tracker that constantly monitors the relative positions of the left and the right eyes of a viewer. This information then dictates the corresponding wavelengths at which different images are projected into different eyes of the viewer or viewers, leading to a 3D effect.

Figure 33:
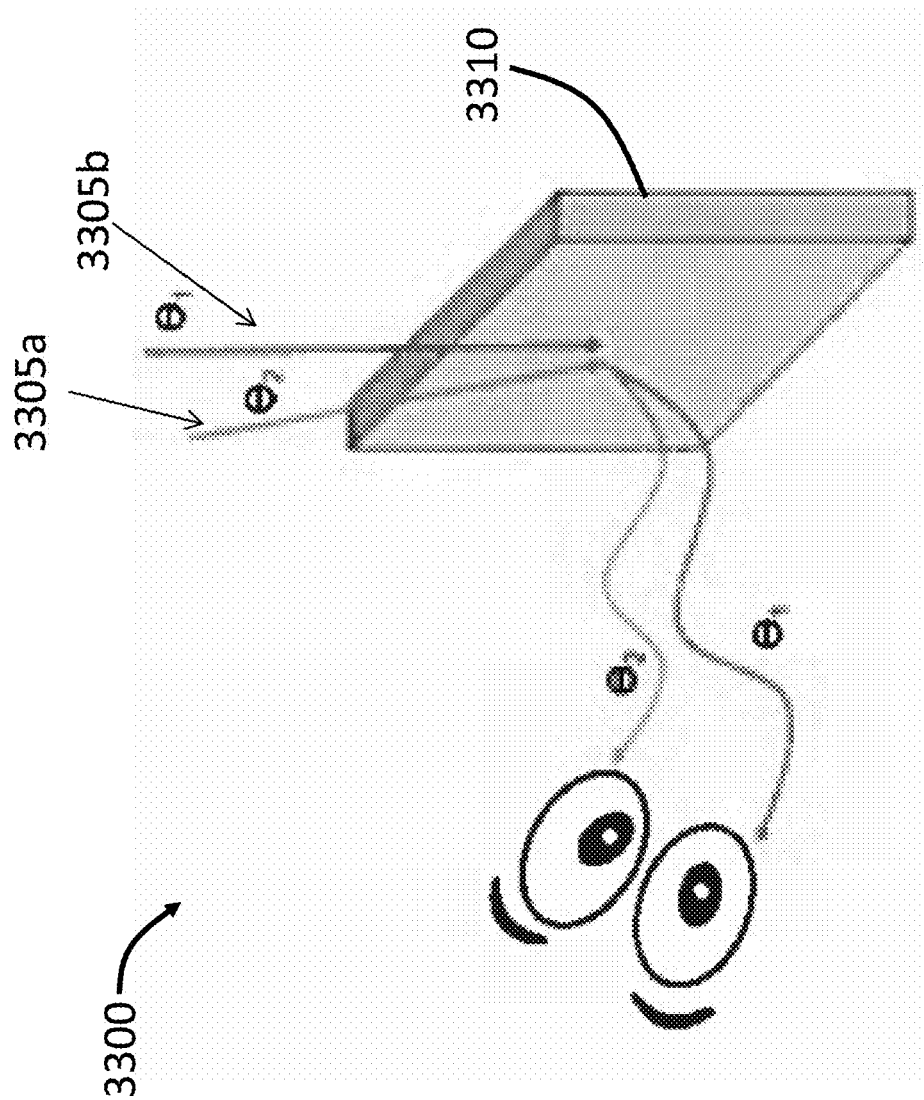
FIG. 33 shows a schematic of a viewer-angular-specific 3D transparent display based on angle-selective scattering of photonic crystals.

FIG. 33 shows a schematic of a viewer-angular-specific 3D transparent display 3300 including a substrate 3310 defining a photonic crystal. The photonic crystal scatters incident light at a predetermined angle (also referred to as a scattering incident angle) and transmits light at other incident angles. In addition, light beams having different wavelengths can also have different scattering incident angles. Accordingly, a first light beam 3305a at a first wavelength is scattered to one eye of a viewer and a second light beam 3305b at a second wavelength is scattered into the other eye of a viewer, thereby generating a 3D effect.

Transparent Privacy Screen

Figure 34:
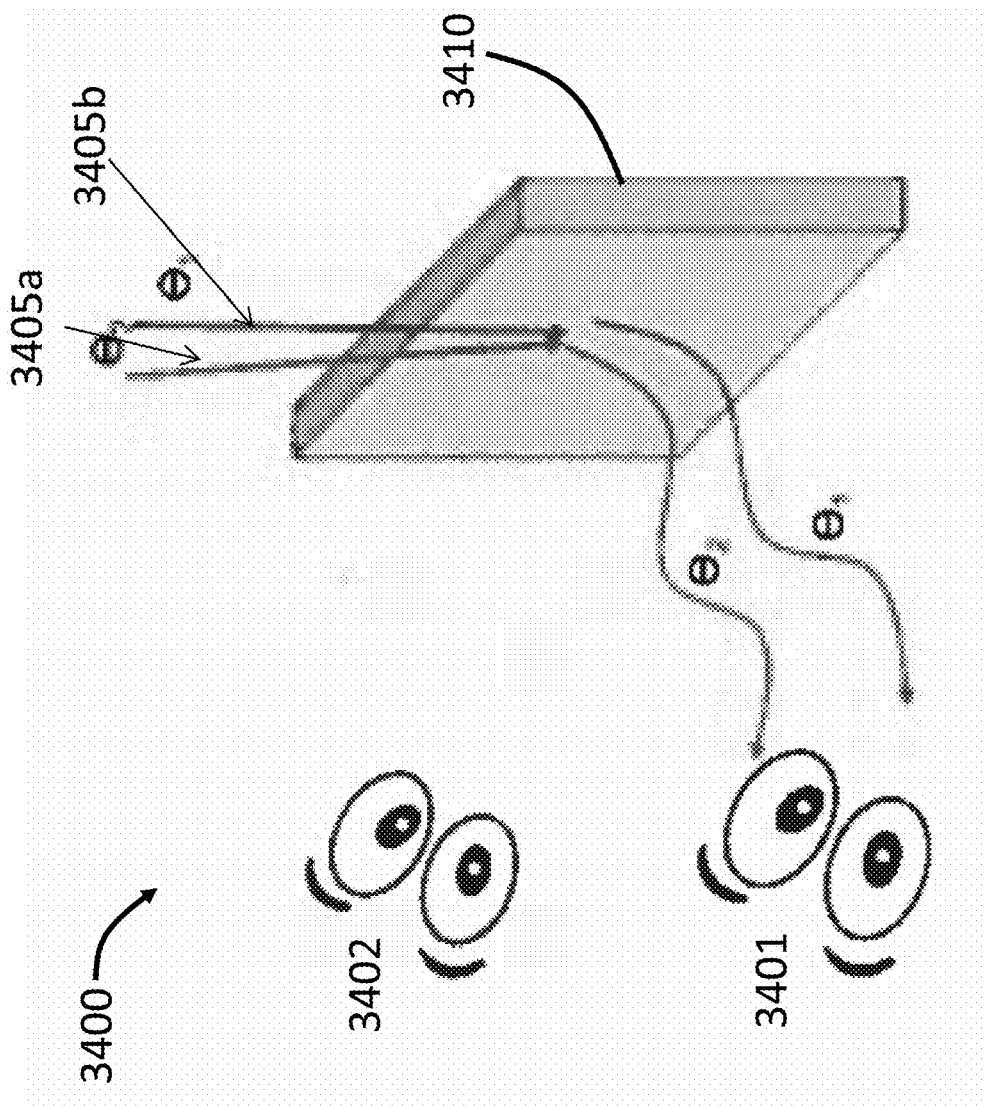
FIG. 34 shows a schematic of a transparent privacy display based on photonic crystals.

The scattering into one or more particular directions in the second scattering channel can be much stronger than the scattering into other directions. This effect can be used to construct a transparent privacy screen, as shown in FIG. 34. The transparent privacy screen 3400 includes a substrate 3410 defining a photonic crystal. Light beams 3405a and 3405b are scattered by the photonic crystal toward a predetermined angle but not toward other angles. Therefore, a first viewer 3401 at the predetermined scattering angle see images on the screen 3400 via the light beams 3405a and 3405b, while another viewer 3402 off the predetermined scattering angle may not see anything.

This transparent privacy screen can be realized in a single color (using one monochromatic beam) or in full color (if using three beams of different colors and tuning the photonic crystal band structure such that the scattering angles of these different colors coincide). 3D viewing effects for the viewer(s) at the specified direction(s) can also be realized. For example, one can combine the ideas described above (e.g., FIGS. 31-33), including using different colors, using different wavelengths representing similar colors, using light of different polarization states, or projecting different images into the viewer's left and right eyes.

Split-View Screens

Since different images (monochromatic, at different wavelengths, or at different polarizations) can be projected and viewed only from different angles on the same screen, a display can be realized where different projected images are projected on the same screen and simultaneously viewed separately by viewers in different locations.

FIG. 35 shows a schematic of a split-view screen 3500, which includes a substrate 3510 defining a photonic crystal that scatters light at different wavelengths toward different predetermined angles. For example, a first light beam 3405a at a first wavelength is scattered along a first angle towards a first viewer, a second light beam 3405b at a second wavelength is scattered along a second angle towards a second viewer, and a third light beam 3405c at a third wavelength is scattered along a third angle towards a third viewer. In this manner, the three viewers can share the same screen 3500 while viewing different contents.

The screen 3500 can also be used to allow one viewer or multiple viewers to see different images when this viewer changes position with respect to the screen 3500. The latter can also allow for a 3D effect similar to viewing a holograph. This method is fundamentally different from some previously presented ideas towards dual view screen technology. Split-View, backlit LCD screens have been demonstrated using a special pixel masking layer to enable angular-specific viewing, but they are based on LCD technology and not transparent.

Based on the same principles described above, split view 3D displays can also be achieved, with or without requiring special viewer glasses. This can be accomplished with two incoming lasers (of either varying wavelength, polarization, or viewing angle) for each location viewer in each location. This method can be realized for single color displays (using one pair of wavelengths) or multiple colors (using multiple pairs of wavelengths).

FIG. 36A shows a schematic of a split view 3D display 3601 using laser beams having different wavelengths. The display 3601 incudes a substrate 3611 defining a photonic crystal that scatters light at different wavelengths toward different angles. In this case, light beams 3621a viewed by a first viewer have a first pair of wavelengths (see details at, e.g., FIG. 31) and light beams 3621b viewed by a second viewer have a second pair of wavelengths.

FIG. 36B shows a schematic of a split view 3D display 3602 using laser beams having different polarizations. The display 3602 incudes a substrate 3612 defining a photonic crystal that scatters light at different polarizations toward different angles. In this case, light beams 3622a viewed by a first viewer have a first pair of polarizations and light beams 3622b viewed by a second viewer have a second pair of polarizations.

FIG. 36C shows a schematic of a split view 3D display 3603 using laser beams having different incident angles. The display 3603 incudes a substrate 3613 defining a photonic crystal that scatters light at different incident angles toward different scattering angles. In this case, light beams 3623a viewed by a first viewer have a first pair of incident angles and light beams 3623b viewed by a second viewer have a second pair of incident angles.

Methods of Manufacturing Transparent Displays

Controllable Metallic Nanoparticle Dispersion in Poly-Methyl-Methacrylate

FIGS. 37A-37C illustrate a method of fabricating transparent displays with optically smooth surfaces suitable for window like applications. FIG. 37A shows a resin mixture 3710 including concentrated nanoparticle colloid dispersed in methyl methacrylate (MMA) casting resin. Manual stirring can be performed to facilitation the dispersion of nanoparticles. In FIG. 37B, Methyl Ethyl Ketone Peroxide (MEKP) catalyst 3720 is added to the resin mixture 3710 and briefly stirred to form a new resin mixture 3730. FIG. 37C shows that the mixture 3730 is poured into a clear, acrylic mold 3740. In FIG. 37D, after the resin mixture 3730 has gelled (e.g., for about 20 minutes), a mylar film 3750 is carefully applied to the surface of the resin 3730. The MMA continues to polymerize into solid, chemically-lined PMMA. This process may take a few days, as shown in FIG. 37E. In FIG. 37F, the mylar film 3750 easily peels off, leaving an optically smooth and durable acrylic cast of the resin 3730, which includes a dispersion of nanoparticles for transparent display.

Manually stirring a highly concentrated ethanol colloid with the MMA precursor does not interfere with polymerization at up to 6.5% by volume of colloid in resin. UV-Vis spectra of the resulting displays indicate little change in plasmon peak wavelength, and per-particle extinction ability is not reduced (even though a small reduction could be expected theoretically), signifying an even dispersion with no significant particle aggregation.

FIGS. 38A-38B illustrate the effect of surface roughness of transparent displays on the displayed content. FIG. 38A shows a transparent display 3801 having a smooth surface 3811. This surface 3811 does not distort ambient light 3831, eliminating haze and allowing the non-scattered wavelengths to pass through unaffected. Accordingly, the displayed content 3821 is clear. In contrast, FIG. 38B shows a transparent display 3802 having a rough surface 3812 that distorts ambient light 3832. As a result, the displayed content 3822 is blurred.

Controllable Dielectric Nanoparticle Dispersion in Polymethyl-methacrylate

In addition to engineering metallic nanoparticles with strong, wavelength-specific scattering peaks, the approach can also be used in dispersing dielectric nanoparticles dispersed in polymers. Titanium Dioxide dielectric particles at the scattering size of about 200 nm can strongly and equally scatter visible light at all wavelengths. Dispersing these dielectric nanoparticles (in powder or in solution) in the same manner yields a full color transparent display.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A transparent display comprising:
 a thin film having a film thickness substantially equal to or less than 1 µm;
 at least one light source, in optical communication with the thin film, to illuminate the thin film with light comprising a first spectral component at a first wavelength; and
 at least one nanoparticle disposed within about 5 µm from the thin film, the at least one nanoparticle having a first resonant scattering peak at the first wavelength to scatter the first spectral component and to transmit light at other wavelengths in the visible spectrum.

2. The transparent display of claim 1, wherein the at least one light source comprises:
 a broadband light source to emit broadband light; and
 a fluorescent material in optical communication with the broadband light source, the fluorescent material having a broadband absorption spectrum to absorb the broadband light and to emit the first spectral component in response to absorption of the broadband light.

3. The transparent display of claim 2, wherein the fluorescent material comprises at least one of a lasing dye or a quantum dot.

4. The transparent display of claim 1, wherein the at least one nanoparticle comprises a metallic core and a dielectric shell surrounding the metallic core.

5. The transparent display of claim 4, wherein the metallic core comprises at least one of gold or silver and the dielectric shell comprises $TiO_2$.

6. The transparent display of claim 4, wherein the metallic core has a diameter of about 20 nm to about 100 nm and the dielectric shell has a thickness of about 10 nm to about 80 nm.

7. The transparent display of claim 1, wherein the first wavelength is about 390 nm to about 490 nm and the at least one nanoparticle has a second resonant scattering peak at a second wavelength of about 580 nm to about 760 nm.

8. The transparent display of claim 1, wherein the at least one nanoparticle comprises a single crystalline metal.

9. The transparent display of claim 1, wherein the thin film is a first thin film having a first refractive index and the transparent display further comprises:
 a second thin film disposed on the first thin film and having a second refractive index different from the first refractive index, the first thin film and the second thin film forming at least a portion of a first notch filter having a first reflectance peak at the first wavelength.

10. The transparent display of claim 9, wherein the first reflectance peak of the first notch filter has a full-width-at-half-maximum (FWHM) substantially equal to or less than 50 nm.

11. The transparent display of claim 9, the at least one nanoparticle has a second resonant scattering peak at a second wavelength and the first notch filter has a second reflectance peak at the second wavelength.

12. The transparent display of claim 9, wherein the at least one nanoparticle has a second resonant scattering peak at a second wavelength, and the transparent display further comprises:
 a second notch filter in optical communication with the first notch filter, the second notch filter having a second reflectance peak at the second wavelength.

13. The transparent display of claim 9, wherein the first thin film has a roughened surface.

14. The transparent display of claim 13, wherein a surface roughness of the roughened surface is about 50 nm to about 1 mm.

15. The transparent display of claim 1, wherein the at least one nanoparticle comprises a torus structure and the thin film comprises a metal layer.

16. The transparent display of claim 15, wherein the torus structure has a major radius of about 10 nm to about 70 nm and a minor radius of about 5 nm to about 35 nm.

17. The transparent display of claim 15, wherein the metallic layer has a thickness substantially equal to or less than 50 nm.

18. The transparent display of claim 15, further comprising:
 a spacer layer disposed between the at least one nanoparticle and the metal layer, the spacer layer having a thickness substantially equal to or less than 30 nm.

19. The transparent display of claim 18, wherein the at least one nanoparticle comprises silver, the spacer layer comprises TiO$_2$, and the metal layer comprises silver.

20. The transparent display of claim 15, further comprising:
   a spacer layer disposed between the at least one nanoparticle and the metal layer, the spacer layer having a thickness substantially equal to or greater than 1000 nm.

21. A method of operating a transparent display comprising at least one nanoparticle disposed within about 5 µm from a thin film, the thin film having a thickness substantially equal to or less than 1 µm, the at least one nanoparticle having a first resonant scattering peak at a first wavelength, the method comprising:
   illuminating the at least one nanoparticle with light having a first spectral component at the first wavelength, the at least one nanoparticle scattering at least a portion of the first spectral component towards a viewer and transmitting ambient light at other wavelengths in the visible spectrum.

22. The method of claim 21, wherein illuminating the at least one nanoparticle comprises:
   illuminating a fluorescent material with broadband light, the fluorescent material absorbing the broadband light and emitting the first spectral component in response to absorbing the broadband light.

23. The method of claim 22, wherein transmitting the broadband light comprises transmitting the broadband light through at least one of a lasing dye or an inorganic quantum dot.

24. The method of claim 21, wherein illuminating the at least one nanoparticle comprises illuminating a metallic core surrounded by a dielectric shell.

25. The method of claim 21, wherein illuminating the at least one nanoparticle comprises:
   illuminating the at least one nanoparticle with the first spectral component at about 390 nm to about 490 nm; and
   illuminating the at least one nanoparticle with a second spectral component at a second wavelength of about 580 nm to about 760 nm, the at least one nanoparticle scattering at least a portion of the second spectral component.

26. The method of claim 21, further comprising:
   reflecting a first portion of the first spectral component with a notch filter comprising the thin film.

27. The method of claim 26, wherein reflecting the first portion of the first spectral component comprises reflecting at least 95% of the first spectral component propagating toward the notch filter.

28. The method of claim 26, further comprising:
   illuminating the at least one nanoparticle with a second spectral component at a second wavelength; and
   reflecting at least some of the second spectral component with the notch filter.

29. The method of claim 21, wherein illuminating the at least one nanoparticle comprises illuminating a torus disposed above a metal film.

30. The method of claim 29, wherein illuminating the torus structure comprises:
   exciting at least one whispering gallery mode in the torus.

31. The method of claim 29, wherein illuminating the torus structure comprises:
   exciting a gap plasmonic mode in a gap between the torus and the metal film, the gap having a width substantially equal to or less than 30 nm.

32. A transparent display, comprising:
   a metal film having a thickness of about 3 nm to about 50 nm;
   a spacer film disposed on the metal film and having a spacer thickness substantially equal to or less than 30 nm;
   at least one light source, in optical communication with the metal film, to illuminate the metal film with light comprising a first spectral component at a first wavelength; and
   at least one torus structure disposed on the spacer film, the at least one torus structure having a major radius of about 30 nm to about 50 nm and a minor radius of about 10 nm to about 20 nm, the torus structure having a first resonant scattering peak at the first wavelength to scatter the first spectral component and to transmit light at other wavelengths in the visible spectrum.

* * * * *